United States Patent
Fujita et al.

(10) Patent No.: US 8,639,022 B2
(45) Date of Patent: Jan. 28, 2014

(54) IMAGE SYNTHESIS APPARATUS, IMAGE SYNTHESIS METHOD AND PROGRAM

(75) Inventors: Shinichi Fujita, Kanagawa (JP); Sensaburo Nakamura, Shizuoka (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 13/075,763

(22) Filed: Mar. 30, 2011

(65) Prior Publication Data

US 2011/0249887 A1 Oct. 13, 2011

(30) Foreign Application Priority Data

Apr. 7, 2010 (JP) ............................... P2010-088465
Apr. 7, 2010 (JP) ............................... P2010-088466

(51) Int. Cl.
*G06K 9/00* (2006.01)
(52) U.S. Cl.
USPC .......................................................... 382/154
(58) Field of Classification Search
None
See application file for complete search history.

(56) References Cited

U.S. PATENT DOCUMENTS

2007/0237386 A1* 10/2007 Berrill ........................... 382/154

FOREIGN PATENT DOCUMENTS

| JP | 8 321992 | 12/1996 |
| JP | 11 164328 | 6/1999 |

* cited by examiner

*Primary Examiner* — Claire X Wang
*Assistant Examiner* — Thomas A James
(74) *Attorney, Agent, or Firm* — Frommer Lawrence & Haug LLP; William S. Frommer; Paul A. Levy

(57) ABSTRACT

An image synthesis apparatus includes: an image selection section adapted to select two or more three-dimensional images to be synthesized from among a plurality of three-dimensional images; an order determination section adapted to determine, based on parallax amounts of the selected three-dimensional images, a synthesis order representative of an order in which the selected three-dimensional images are to be synthesized; an image synthesis section adapted to synthesize the selected three-dimensional images in accordance with the synthesis order; and a control section adapted to control the image selection section, the order determination section and the image synthesis section in response to an operation of a user.

16 Claims, 32 Drawing Sheets

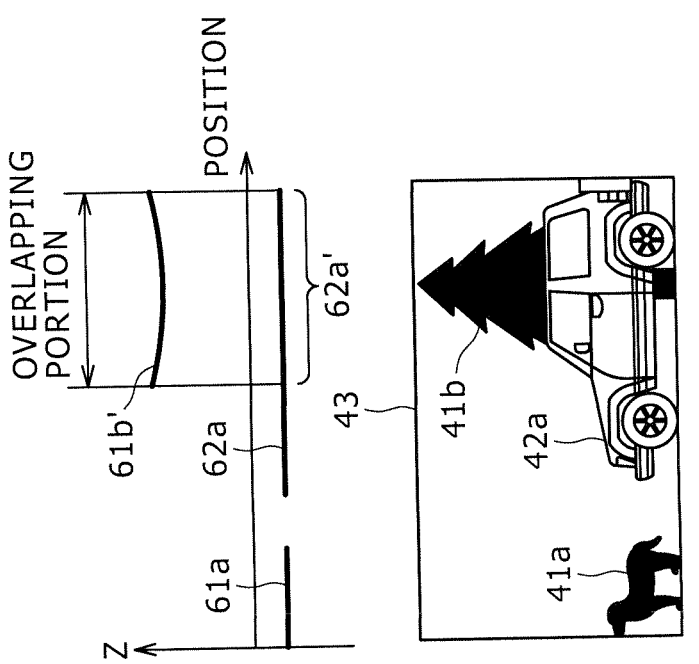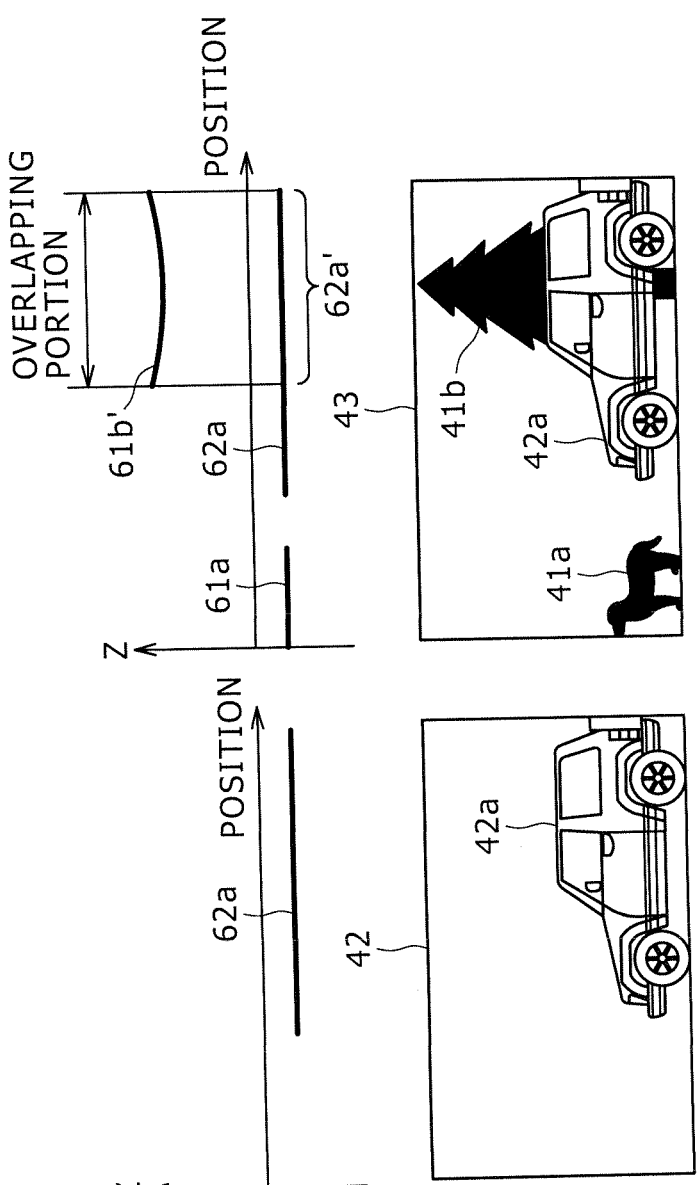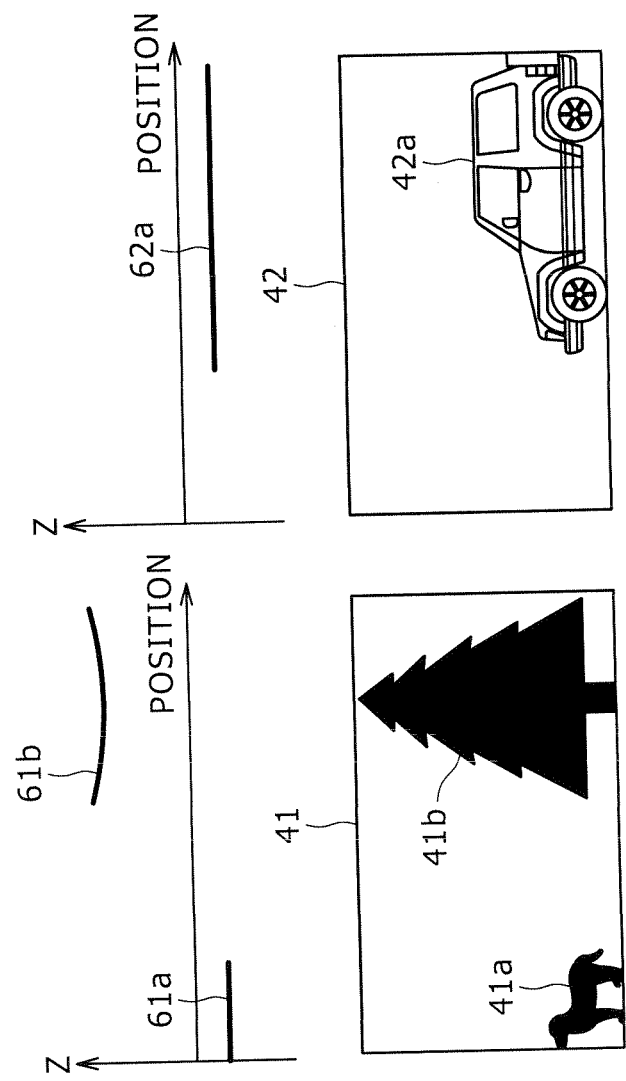

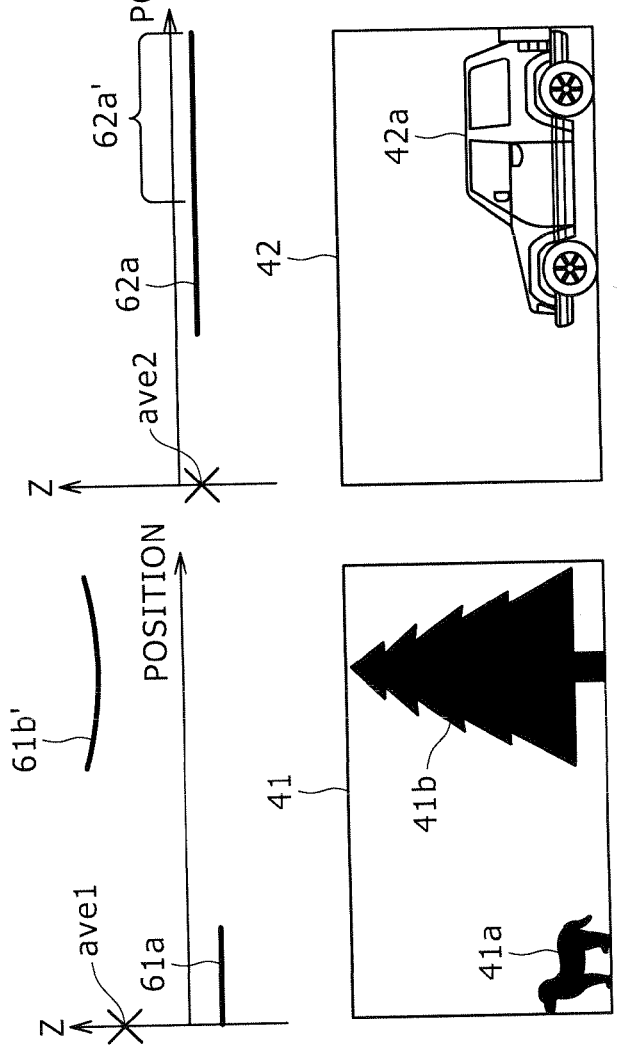

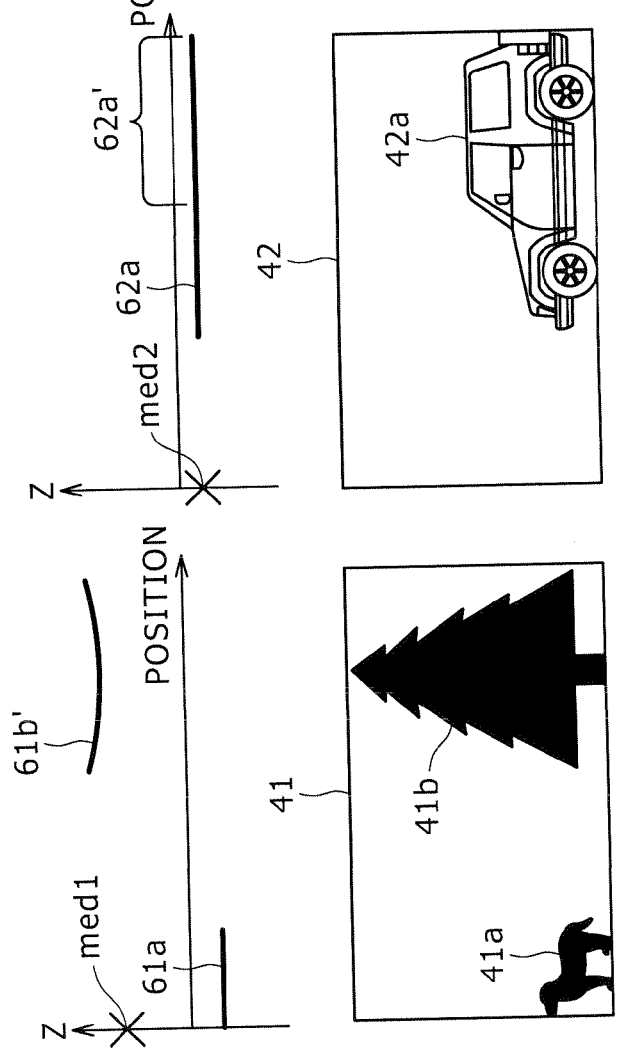

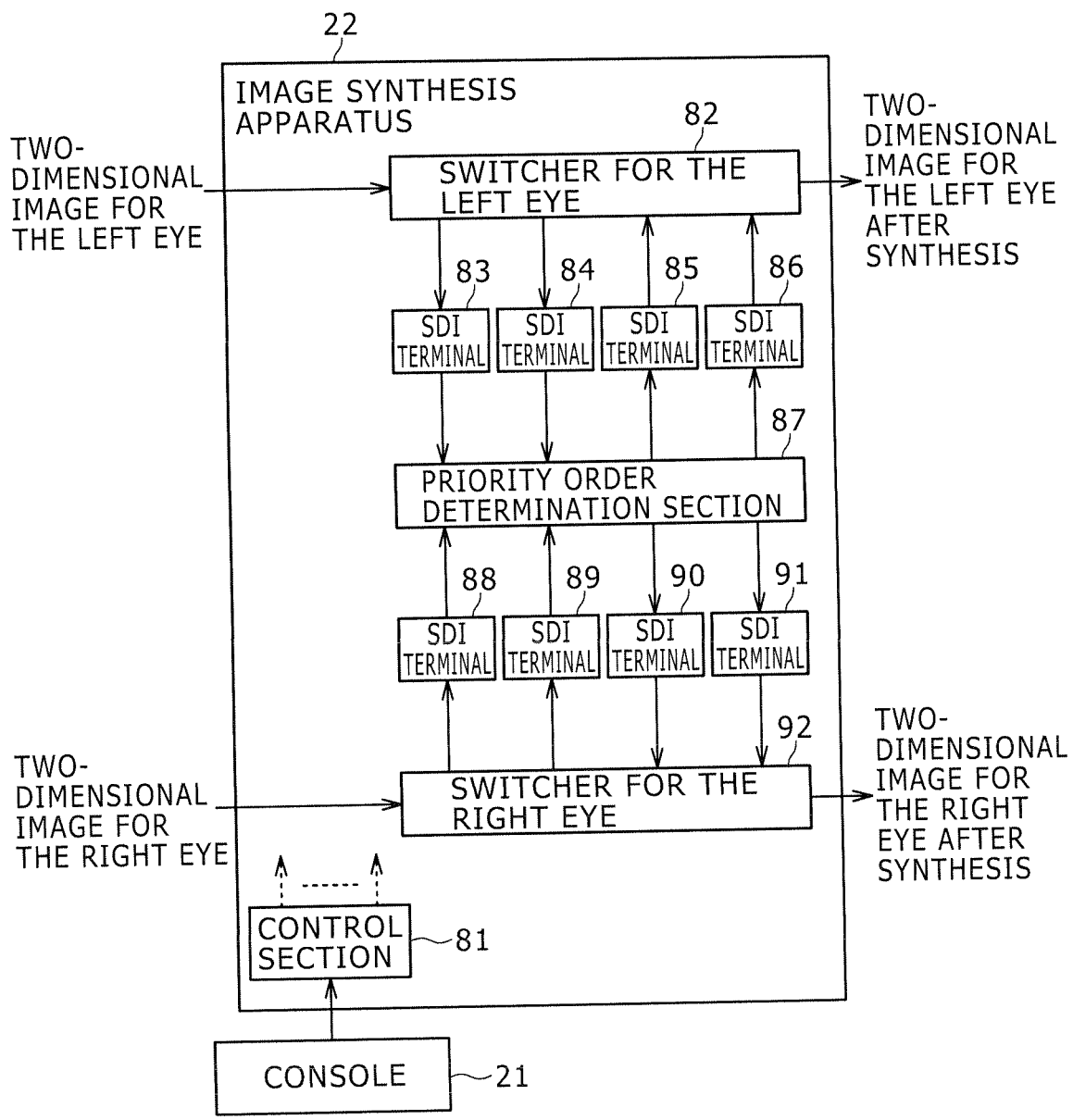

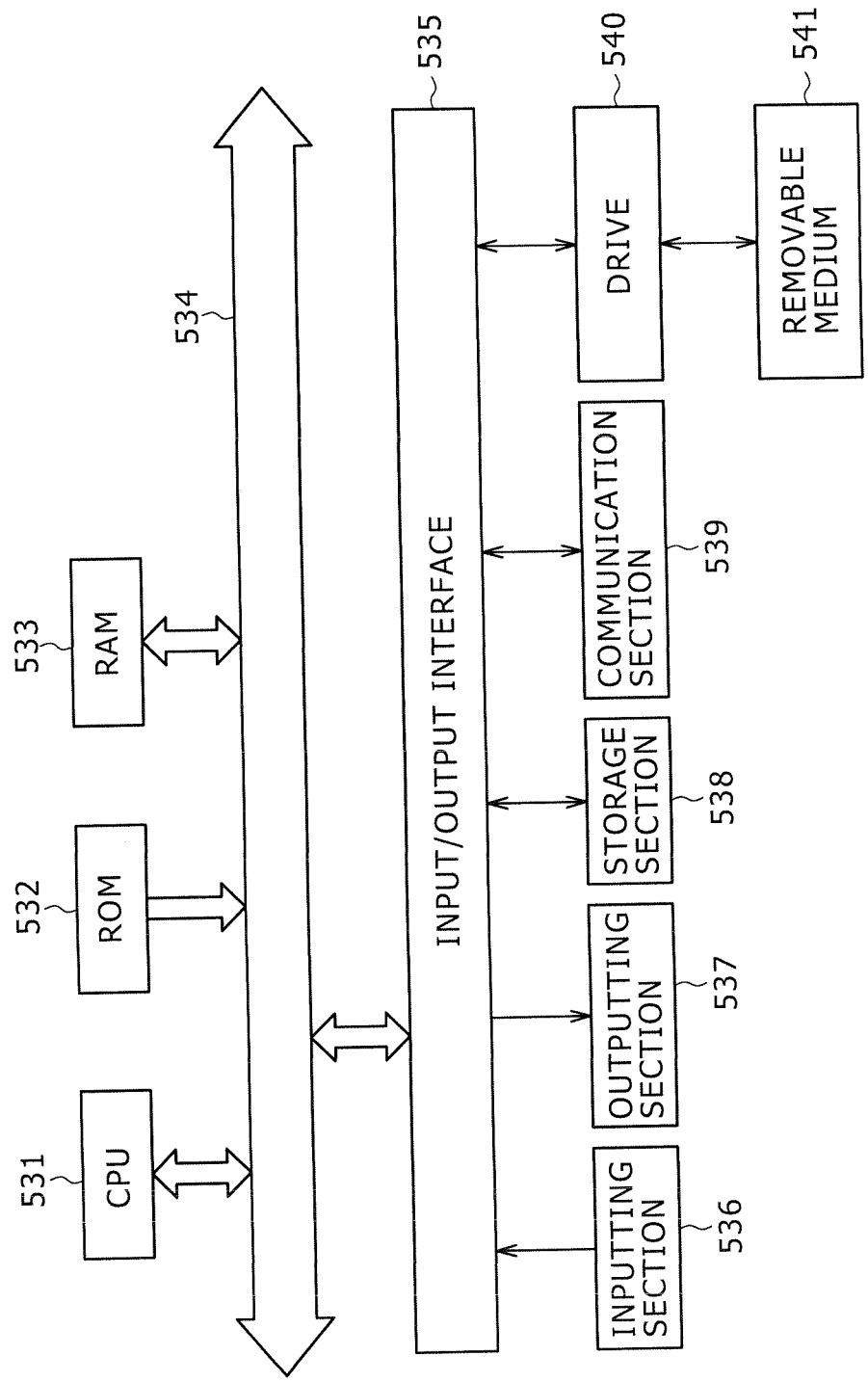

IMAGE SYNTHESIS APPARATUS, IMAGE SYNTHESIS METHOD AND PROGRAM

BACKGROUND OF THE INVENTION

1. Field of the Invention

This invention relates to an image synthesis apparatus, an image synthesis method and a program, and more particularly to an image synthesis apparatus, an image synthesis method and a program suitable for use in the case where, for example, three-dimensional images are synthesized.

2. Description of the Related Art

In related art, a synthesis technique such as superimposition of synthesizing three-dimensional images selected by a user using a switcher is known and disclosed, for example, in Japanese Patent Laid-Open No. Hei 8-321992.

A three-dimensional image is configured from a two-dimensional image for the left eye and a two-dimensional image for the right eye, and a parallax is provided between the two-dimensional images for the left and right eyes so that a physical solid in an image visually confirmed by an appreciating person looks three-dimensional.

Further, when the three-dimensional image is to be presented to an appreciating person, for example, the two-dimensional image for the left eye is presented so as to be visually confirmed only with the left eye and the two-dimensional image for the right eye is presented so as to be visually confirmed only with the right eye.

The appreciating person recognizes the visually confirmed images as a stereoscopic three-dimensional image based on a depth z perceived in accordance with an amount of the parallax, that is, a parallax amount, provided between the two-dimensional image for the left eye and the two-dimensional image for the right eye, or in other words, based on a relative position z of the physical solid existing in the three-dimensional image defined in a perpendicular direction to the three-dimensional image.

It is to be noted that also an adjustment technique of adjusting the parallax amount of a three-dimensional image is known and disclosed, for example, in Japanese Patent Laid-Open No. Hei 11-164328.

SUMMARY OF THE INVENTION

According to the synthesis technique described above, for example, when three-dimensional images selected by a user are to be synthesized, the selected three-dimensional images are synthesized in accordance with a synthesis order designated by the user.

In this instance, if the synthesis order does not conform to stereoscopic positions z of physical solids existing in the three-dimensional images to be synthesized, that is, does not conform to the depthwise positional relationship between the physical solids, then as a result of the synthesis of the three-dimensional images, an unnatural or uncomfortable three-dimensional image is sometimes generated wherein the three-dimensional positions z of the physical solids in the three-dimensional image and the synthesis order do not conform to each other.

In particular, for example, in the case where two three-dimensional images are selected and synthesized, if a first physical solid existing in one of the three-dimensional images is recognized nearer than a second physical solid existing in the other one of the three-dimensional images, it is necessary to synthesize the two three-dimensional images such that the first physical solid is displayed on the nearer side than the second physical solid so that the positional relationship between them may coincide with the positional relationship of the first and second physical solids recognized by the appreciating person.

However, in the case where the synthesis order designated by the user is that the second physical solid is displayed on the nearer side than the first physical solid, according to the synthesis technique described above, the two three-dimensional images are synthesized such that the second physical solid is displayed on the nearer side than the first physical solid against the positional relationship of the first and second physical solids recognized by the appreciating person. This synthesis gives rise to generation of a synthesized three-dimensional image which provides a very uncomfortable feeling to an appreciating person.

Therefore, it is desirable to provide an image synthesis apparatus, an image synthesis method and a program by which a synthesized three-dimensional image in which stereoscopic images of physical solids existing in three-dimensional images to be synthesized and the synthesis order conform to each other can be generated.

According to an embodiment of the present invention, there is provided an image synthesis apparatus including image selection means for selecting two or more three-dimensional images to be synthesized from among a plurality of three-dimensional images, order determination means for determining, based on parallax amounts of the selected three-dimensional images, a synthesis order representative of an order in which the selected three-dimensional images are to be synthesized, image synthesis means for synthesizing the selected three-dimensional images in accordance with the synthesis order, and control means for controlling the image selection means, the order determination means and the image synthesis means in response to an operation of a user.

The control means may control, when a selection operation of the user for selecting predetermined ones of the three-dimensional images so that the predetermined three-dimensional images may be synthesized in a predetermined synthesis order, the order determination means to determine a synthesis order of the predetermined three-dimensional images, and handle, when the synthesis order of the predetermined three-dimensional images determined by the order determination means does not become the predetermined synthesis order, the selection operation of the user as not having been carried out.

Or, the control means may handle, when a changing operation of the user for changing the synthesis order is carried out, the changing operation of the user as not having been carried out.

Or else, the control means may control, when a canceling operation of the user to cancel selection of any of the selected three-dimensional images is carried out, the order determination means to determine a new synthesis order which excludes the three-dimensional image whose selection is canceled from the synthesis order.

The image synthesis apparatus may further include parallax amount measuring means for measuring parallax amounts of the selected three-dimensional images, the order determination means determining the synthesis order based on the measured parallax amounts.

According to another embodiment of the present invention, there is provided an image synthesis method for an image synthesis apparatus for synthesizing three-dimensional images, the image synthesis apparatus including image selection means, order determination means, image synthesis means and control means, the image synthesis method including a step carried out by the image selection means of selecting two or more three-dimensional images to be synthesized from among a plurality of three-dimensional images, a step carried out by the order determination means of determining, based on parallax amounts of the selected three-dimensional images, a synthesis order representative of an order in which the selected three-dimensional images are to be synthesized, a step carried out by the image synthesis means of synthesizing the selected three-dimensional images in accordance with the synthesis order, and a step carried out by the control means of controlling the image selection means, the order determination means and the image synthesis means in response to an operation of a user.

According to a further embodiment of the present invention, there is provided an image synthesis apparatus including image selection means for selecting two or more three-dimensional images from among a plurality of three-dimensional images, order acquisition means for acquiring a synthesis order representative of an order in which the selected three-dimensional images are to be synthesized, parallax amount adjustment means for adjusting parallax amounts of the selected three-dimensional images based on the synthesis order, and image synthesis means for synthesizing the selected three-dimensional images after the adjustment in accordance with the synthesis order.

The image synthesis apparatus may further include fader acquisition means for acquiring fader information representative of a progressing situation when the parallax amounts of the selected three-dimensional images are adjusted from original parallax amounts to parallax amounts which correspond to the synthesis order, the parallax amount adjustment means adjusting the parallax amounts of the selected three-dimensional images based on the fader information, the image synthesis means synthesizing the three-dimensional images adjusted based on the fader information.

In this instance, the image synthesis apparatus may further include comparison generation means for comparing the parallax amounts of the three-dimensional images adjusted based on the fader information with each other and generating, based on a result of the comparison, region information representative of a region in which the three-dimensional image after the synthesis is to be displayed from within an overall region on the three-dimensional regions adjusted based on the fader information, the image synthesis means synthesizing the three-dimensional images adjusted based on the fader information based on the region information.

The order acquisition means may acquire, in response to a designation operation by the user to designate the synthesis order, the synthesis order designated by the designation operation of the user.

In this instance, the image synthesis apparatus may further include measuring means for measuring parallax amounts of the selected three-dimensional images, and adjustment amount calculation means for calculating, based on the synthesis order, adjustment amounts for adjusting the measured parallax amounts to parallax amounts corresponding to the synthesis order, the parallax amount adjustment means adjusting the parallax amounts using the adjustment amounts calculated based on the synthesis order.

In this instance, the image synthesis apparatus may further include adjustment amount retaining means for temporarily retaining the adjustment amounts, the parallax amount adjustment means adjusting the parallax amounts using the adjustment amounts retained in the adjustment amount retaining means in response to an instruction operation carried out for the instruction to carry out the synthesis in the synthesis order designated by the designation operation of the user, the image synthesis means synthesizing the three-dimensional images after the adjustment in accordance with the synthesis order designated by the designation operation of the user.

The parallax amount adjustment means may carry out adjustment regarding the parallax amounts of the selected three-dimensional images only when the parallax amounts of the three-dimensional images after the adjustment are lower than a threshold value determined in advance.

The image synthesis apparatus may further include first outputting means for outputting a synthesized three-dimensional image obtained by the synthesis of the image synthesis means so as to be displayed as a preview confirmation image for the confirmation of the user, and second outputting means for outputting the synthesized three-dimensional image as a final synthesized three-dimensional image.

The order acquisition means may acquire, as the synthesis order, an order in which the selected three-dimensional images are to be displayed on the near side when the selected three-dimensional images are synthesized.

According to a still further embodiment of the present invention, there is provided an image synthesis method for an image synthesis apparatus for synthesizing a plurality of three-dimensional images, the image synthesis apparatus including image selection means, order acquisition means, parallax amount adjustment means and image synthesis means, the image synthesis method including a step carried out by the image selection means of selecting two or more three-dimensional images from among the plural three-dimensional images, a step carried out by the order acquisition means of acquiring a synthesis order representative of an order in which the selected three-dimensional images are to be synthesized, a step carried out by the parallax amount adjustment means of adjusting parallax amounts of the selected three-dimensional images based on the synthesis order, and a step carried out by the image synthesis means of synthesizing the selected three-dimensional images after the adjustment in accordance with the synthesis order.

In the image processing apparatus and methods, two or more three-dimensional images are selected from among a plurality of three-dimensional images, and a synthesis order representative of an order in which the selected three-dimensional images are to be synthesized is acquired. Then, parallax amounts of the selected three-dimensional images are adjusted based on the synthesis order and then the selected three-dimensional images after the adjustment are synthesized in accordance with the synthesis order.

With the image processing apparatus and methods, a synthesized three-dimensional image can be generated in which stereoscopic positions of physical solids existing in three-dimensional images to be synthesized and a synthesis order of the three-dimensional images coincide with each other and which does not provide an uncomfortable feeling to a watching person.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 2A to 2C are schematic views illustrating an outline of processing carried out by the image synthesis apparatus of FIG. 1;

FIGS. 3A and 3B are schematic views illustrating an example of a determination method of determining a priority order based on an average value of the depth;

FIGS. 4A and 4B are schematic views illustrating an example of a determination method of determining a priority order based on a median of the depth;

FIG. 5 is a block diagram showing an example of a detailed configuration of the image synthesis apparatus of FIG. 1;

FIG. 32 is a block diagram showing an example of a configuration of a computer.

DETAILED DESCRIPTION OF THE PREFERRED EMBODIMENTS

In the following, preferred embodiments of the present invention are described. It is to be noted that description is given in the following order.
1. First Embodiment (example wherein three-dimensional images are synthesized in a priority order corresponding to parallax amounts of the three-dimensional images)
2. Second Embodiment (example wherein three-dimensional images having parallax amounts corresponding to a priority order designated by a user are synthesized in the priority order)
3. Third Embodiment (example wherein the parallax amounts of three-dimensional images are adjusted in response to a fader value adjusted by a user to synthesize the three-dimensional images)
4. Modifications 1. First Embodiment Configuration by the Console 21 and the Image Synthesis Apparatus 22

Figure 1:
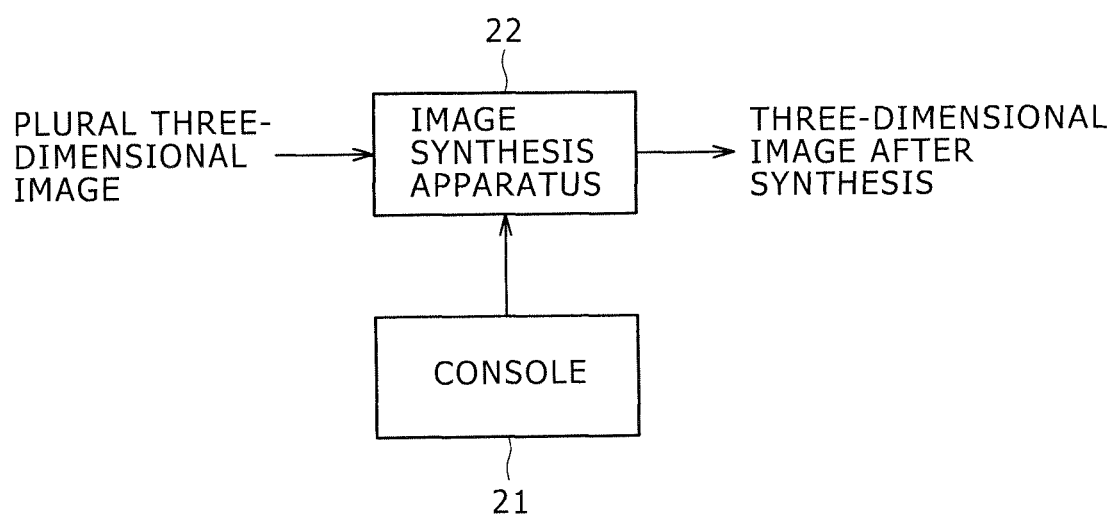
FIG. 1 is a block diagram showing an example of a configuration of an image synthesis apparatus according to a first embodiment of the present invention.

FIG. 1 shows an example of a configuration of an image synthesis apparatus 22 which synthesizes three-dimensional images in response to an operation signal from a console 21 according to a first embodiment of the present invention.

Referring to FIG. 1, the image synthesis apparatus 22 is connected to the console 21, for example, by a cable.

The console 21 includes a selection button for selecting three-dimensional images to be synthesized from among a plurality of three-dimensional images supplied to the image synthesis apparatus 22. The console 21 generates, in response to an operation thereof by a user, an operation signal corresponding to the operation of the user, and supplies the generated operation signal to the image synthesis apparatus 22. It is to be noted that details of the console 21 are hereinafter described with reference to FIGS. 10 and 11.

The image synthesis apparatus 22 carries out processing in response to the operation signal from the console 21. In particular, for example, the image synthesis apparatus 22 carries out synthesis of three-dimensional images selected by a selection operation of the user from among a plurality of three-dimensional images supplied thereto in response to an operation signal from the console 21. Then, the image synthesis apparatus 22 outputs a synthesized three-dimensional image obtained by the synthesis.

A three-dimensional image is configured from a two-dimensional image for the left eye and a two-dimensional image for the right eye, and a parallax is provided between the two-dimensional images for the left and right eyes so that a physical solid in an image visually confirmed by an appreciating person looks three-dimensional.

It is to be noted that, when the three-dimensional image is to be presented to an appreciating person, for example, the two-dimensional image for the left eye is presented so as to be visually confirmed only with the left eye and the two-dimensional image for the right eye is presented so as to be visually confirmed only with the right eye. Consequently, the appreciating person recognizes the visually confirmed images as a stereoscopic three-dimensional image based on a depth z perceived in accordance with an amount of the parallax, that is, a parallax amount, provided between the two-dimensional image for the left eye and the two-dimensional image for the right eye, or in other words, based on a three-dimensional position z of the physical solid existing in the three-dimensional image defined in a perpendicular direction to the three-dimensional image.

In order to simplify description, it is assumed that, in the description given below, the user operates the console 21 to select only two three-dimensional images as the three-dimensional images to be synthesized. However, the number of three-dimensional images to be synthesized is not limited to two but three or more three-dimensional images may be selected.

Outline of Processing Carried Out by the Image Synthesis Apparatus 22

FIGS. 2A to 2C illustrate an outline of processing carried out by the image synthesis apparatus 22.

On the lower side in FIG. 2A, a three-dimensional image 41 from between two three-dimensional images selected by the user is shown. The three-dimensional image 41 displays a dog 41a and a tree 41b.

On the upper side in FIG. 2A, the axis of abscissa indicates the position in the transverse direction on the three-dimensional image 41, and the axis of ordinate indicates the depth z according to the parallax provided between the two-dimensional image for the left eye and the two-dimensional image for the right eye of the three-dimensional image 41. This similarly applies also to the upper side in FIG. 2B and the upper side in FIG. 2C.

On the upper side in FIG. 2A, a plurality of coordinates 61a represent coordinates indicative of the depths z corresponding to pixels which configure a region of the three-dimensional image 41 in which the dog 41a exists. Meanwhile, a plurality of coordinates 61b represent coordinates indicative of the depths z corresponding to pixels which configure a region of the three-dimensional image 41 in which the tree 41b exists.

On the lower side in FIG. 2B, the other three-dimensional image 42 from between the two three-dimensional images selected by the user is shown. An automobile 42a is displayed in the three-dimensional image 42.

On the upper side in FIG. 2B, a plurality of coordinates 62a represent coordinates indicative of the depths z corresponding to pixels which configure a region of the three-dimensional image 42 in which the automobile 42a exists.

On the lower side in FIG. 2C, an example of a three-dimensional image 43 after synthesis obtained when the three-dimensional images 41 and 42 are synthesized is shown.

On the upper side in FIG. 2C, a plurality of coordinates 61b' represent coordinates indicative of the depths z corresponding to pixels which configure an overlapping portion in which the tree 41b is overlapped or synthesized with the automobile 42a from within the region in which the tree 41b is configured.

Further, on the upper side in FIG. 2C, a plurality of coordinates 62a' represent coordinates indicative of the depths z corresponding to pixels which configure an overlapping portion of the automobile 42a with the tree 41b from within the region in which the automobile 42a is configured.

The image synthesis apparatus 22 detects, based on the three-dimensional images 41 and 42 selected by the user, an overlapping portion in which the regions which configure the dog 41a and the tree 41b in the three-dimensional image 41 and the region which configures the automobile 42a in the three-dimensional image 42 overlap with each other when the three-dimensional images 41 and 42 are synthesized.

Then, the image synthesis apparatus 22 calculates the depth z which corresponds to each of the pixels which configure the overlapping portion of the three-dimensional image 41 and corresponds to the plural coordinates 61b' on the upper side in FIG. 2C.

Further, the image synthesis apparatus 22 calculates the depth z which corresponds to each of the pixels which configure the overlapping portion of the three-dimensional image 42 and corresponds to the plural coordinates 62a' on the upper side in FIG. 2C.

Furthermore, the image synthesis apparatus 22 calculates an average value regarding the depth z calculated with regard to the three-dimensional image 41 and the depth z calculated with regard to the three-dimensional image 42, and determines a priority order when the three-dimensional images 41 and 42 are to be synthesized based on the calculated average values.

Then, the image synthesis apparatus 22 synthesizes and outputs the three-dimensional images 41 and 42 in the determined priority order.

The priority order here represents an order in which a physical solid in a three-dimensional image, for example, the automobile 42a in the three-dimensional image 42, is to be superposed on the near side in priority to a physical solid on another three-dimensional image, for example, the dog 41a and the tree 41b in the three-dimensional image 41.

It is to be noted that, while the priority order signifies a synthesis order in which three-dimensional images are to be synthesized, in the following description of the first to third embodiments of the invention, a synthesis order is determined as the priority order.

In particular, paying attention to the fact that, in the first to third embodiments, the synthesis order represents an order in which a physical solid in a three-dimensional image to be synthesized is overlapped preferentially on the near side, the synthesis order is described as the priority order.

FIGS. 3A and 3B illustrate an example of a determination method of determining a priority order based on an average value of the depth z.

The image synthesis apparatus 22 calculates an average value ave1 of the depth z calculated with regard to the three-dimensional image 41 as illustrated on the upper side in FIG. 3A, is, among the depths z individually corresponding to a plurality of coordinates 61b'. Further, the image synthesis apparatus 22 calculates an average value ave2 of the depth z calculated with regard to the three-dimensional image 42, that is, among the depths z individually corresponding to a plurality of coordinates 62a' as seen on the upper side in FIG. 3B.

Then, the image synthesis apparatus 22 compares the calculated average value ave1 and average value ave2 and determines, based on a result of the comparison, the priority order so as to be an ascending order of the average of the depth z.

In the present case, the average value ave2 of the depth z of the automobile 42a in the three-dimensional image 42 is lower than the average value ave1 of the depth z of the tree 41b in the three-dimensional image 41. Therefore, the image synthesis apparatus 22 determines the turn in the priority order of the three-dimensional image 42 to the first and determines the turn in the priority order of the three-dimensional image 41 to the second so that the automobile 42a in the three-dimensional image 42 may be displayed on the nearer side than the tree 41b in the three-dimensional image 41.

It is to be noted that, while the image synthesis apparatus 22 described above determines the priority order based on average values of the depth z, it may otherwise determine the priority order, for example, based on medians of the depth z.

Determination Method of Determining the Priority Order Based on Medians of the Depth z FIGS. 4A and 4B illustrate an example of a determination method of determining a priority order based on medians of the depth z.

As seen on the upper side in FIG. 4A, the image synthesis apparatus 22 calculates a median med1 of the depths z calculated with regard to the three-dimensional image 41, that is, among the depths z corresponding to the plural coordinates 61b'. Further, the image synthesis apparatus 22 calculates a median med2 of the depths z calculated with regard to the three-dimensional image 42, that is, among the depths z corresponding to the plural coordinates 62a'.

Then, the image synthesis apparatus 22 compares the calculated median med1 and median med2 with each other and sets the priority order based on a result of the comparison to an ascending order of the median of the depth z.

In the present case, the median med2 of the depths z of the automobile 42a in the three-dimensional image 42 is lower than the median med1 of the depths z of the tree 41b in the three-dimensional image 41. Therefore, the image synthesis apparatus 22 determines the turn in the priority order of the three-dimensional image 42 to the first and determines the turn in the priority order of the three-dimensional image 41 to the second so that the automobile 42a in the three-dimensional image 42 is displayed on the nearer side than the tree 41b in the three-dimensional image 41.

Details of the Image Synthesis Apparatus 22

An example of a configuration of the image synthesis apparatus 22 is shown in FIG. 5.

Referring to FIG. 5, the image synthesis apparatus 22 includes a control section 81, a switcher 82 for the left eye, SDI (serial digital interface) terminals 83 to 86, a priority order determination section 87, SDI terminals 88 to 91, and a switcher 92 for the right eye.

It is to be noted that, to the image synthesis apparatus 22, a two-dimensional image for the left eye and a two-dimensional image for the right eye which configure a three-dimensional image are supplied. In particular, in the image synthesis apparatus 22, a two-dimensional image for the left eye corresponding to a three-dimensional image is supplied to the switcher 82 for the left eye and a two-dimensional image for the right eye corresponding to the three-dimensional image is supplied to the switcher 92 for the right eye.

To the control section 81, an operation signal from the console 21 is supplied. The control section 81 controls the switcher 82 for the left eye, priority order determination section 87 and switcher 92 for the right eye in response to the operation signal from the console 21.

The switcher 82 for the left eye selects two-dimensional images for the left eye corresponding to the two three-dimensional images 41 and 42 (FIGS. 2A and 2B) selected by a selection operation of the user from among plural two-dimensional images for the left eye supplied thereto under the control of the control section 81.

Then, the switcher 82 for the left eye supplies the two-dimensional image for the left eye corresponding to the three-dimensional image 41 to the SDI terminal 83 and supplies the two-dimensional image for the left eye corresponding to the three-dimensional image 42 to the SDI terminal 84.

Further, the switcher 82 for the left eye synthesizes the two-dimensional image for the left eye corresponding to the three-dimensional image 41 from the SDI terminal 85 and the two-dimensional image for the left eye corresponding to the three-dimensional image 42 from the SDI terminal 86 in the priority order supplied thereto from the SDI terminal 85 and then outputs a two-dimensional image for the left eye after the synthesis. It is to be noted that it is possible for the switcher 82 for the left eye to use two-dimensional images for the left eye inputted thereto from the outside as they are without using the images from the SDI terminal 85 and the SDI terminal 86 as the images to be synthesized.

The SDI terminals 83 to 86 connect the switcher 82 for the left eye and the priority order determination section 87 to each other by respective cables. In particular, in FIG. 5, the SDI terminals 83 to 86 connect the switcher 82 for the left eye and the priority order determination section 87 to each other by respective cables.

The SDI terminals 83 and 84 supply two-dimensional images for the left eye from the switcher 82 for the left eye to the priority order determination section 87.

The SDI terminals 85 and 86 supply the two-dimensional images for the left eye from the priority order determination section 87 to the switcher for the left eye. Further, when a priority order is supplied from the priority order determination section 87, the SDI terminal 85 supplies the priority order to the switcher 82 for the left eye. It is to be noted that, where the priority order determination section 87 is configured such that it supplies the priority order to the SDI terminal 86, the SDI terminal 86 supplies the priority order from the priority order determination section 87 to the switcher 82 for the left eye. It is to be noted that an SDI signal can transmit additional information other than an image as known already.

The priority order determination section 87 acquires a combination of the two-dimensional image for the left eye corresponding to the three-dimensional image 41 from the SDI terminal 83 and the two-dimensional image for the right eye corresponding to the three-dimensional image 41 from the SDI terminal 88 as the three-dimensional image 41. Then, the priority order determination section 87 measures, based on the acquired three-dimensional image 41, a parallax amount of the three-dimensional image 41, that is, a parallax amount provided at overlapping portions of the two-dimensional image for the left eye and the two-dimensional image for the right eye in the three-dimensional image 41.

Further, the priority order determination section 87 acquires the combination between the two-dimensional image for the left eye corresponding to the three-dimensional image 42 from the SDI terminal 84 and the two-dimensional image for the right eye corresponding to the three-dimensional image 42 from the SDI terminal 89 as a three-dimensional image 42. Then, the priority order determination section 87 measures, based on the acquired three-dimensional image 42, the parallax amount of the three-dimensional image 42, that is, the parallax amount provided at overlapping portions of the two-dimensional image for the left eye and the two-dimensional image for the right eye on the three-dimensional image 42.

Further, the priority order determination section 87 determines a priority order based on the measured parallax amount between the three-dimensional images 41 and 42 and supplies the determined priority order to the SDI terminals 85 and 90. It is to be noted that, while the priority order determination section 87 supplies the determined priority order to the SDI terminals 85 and 90 in order to notify the switcher 82 for the left eye and the switcher 92 for the right eye of the priority order, it may otherwise supply the determined priority order, for example, to the SDI terminals 86 and 91.

Further, the priority order determination section 87 supplies the acquired two-dimensional image for the left eye corresponding to the three-dimensional image 41 to the SDI terminal 85 and similarly supplies the acquired two-dimensional image for the right eye corresponding to the three-dimensional image 41 to the SDI terminal 90.

Furthermore, the priority order determination section 87 supplies the acquired two-dimensional image for the left eye corresponding to the three-dimensional image 42 to the SDI terminal 86 and similarly supplies the acquired two-dimensional image for the right eye corresponding to the three-dimensional image 42 to the SDI terminal 91.

The SDI terminals 88 to 91 individually connect the switcher 92 for the right eye and the priority order determination section 87 to each other individually by cables. In particular, it is illustrated in FIG. 5 that the SDI terminals 88 to 91 connect the switcher 92 for the right eye and the priority order determination section 87 to each other individually by cables.

The SDI terminals 88 and 89 supply the two-dimensional images for the right eye from the switcher 92 for the right eye to the priority order determination section 87.

The SDI terminals 90 and 91 supply the two-dimensional images for the right eye from the priority order determination section 87 individually to the switcher 92 for the right eye. Further, if a priority order is supplied from the priority order determination section 87, then the SDI terminal 90 supplies the priority order to the switcher 92 for the right eye. It is to be noted that, in the case where the priority order determination section 87 is configured such that it supplies a priority order to the SDI terminal 91, the SDI terminal 91 supplies the priority order from the priority order determination section 87 to the switcher 92 for the right eye.

The switcher 92 for the right eye carries out processing similar to that of the switcher 82 for the left eye. In particular, the switcher 92 for the right eye selects two-dimensional images for the right eye corresponding to the two three-dimensional images 41 and 42 (FIGS. 2A and 2B) selected by a selection operation of the user from among a plurality of two-dimensional images for the right eye supplied thereto.

Then, the switcher 92 for the right eye supplies the two-dimensional image for the right eye corresponding to the three-dimensional image 41 to the SDI terminal 88 and supplies the two-dimensional image for the right eye corresponding to the three-dimensional image 42 to the SDI terminal 89.

Further, the switcher 92 for the right eye synthesizes the two-dimensional image for the right eye corresponding to the three-dimensional image 41 from the SDI terminal 90 and the two-dimensional image for the right eye corresponding to the three-dimensional image 42 from the SDI terminal 91 in the priority order supplied thereto from the SDI terminal 90. Then, the switcher 92 for the right eye outputs a two-dimensional image for the right eye after the synthesis.

Example of a Configuration of the Switcher 82 for the Left Eye

Figure 6:
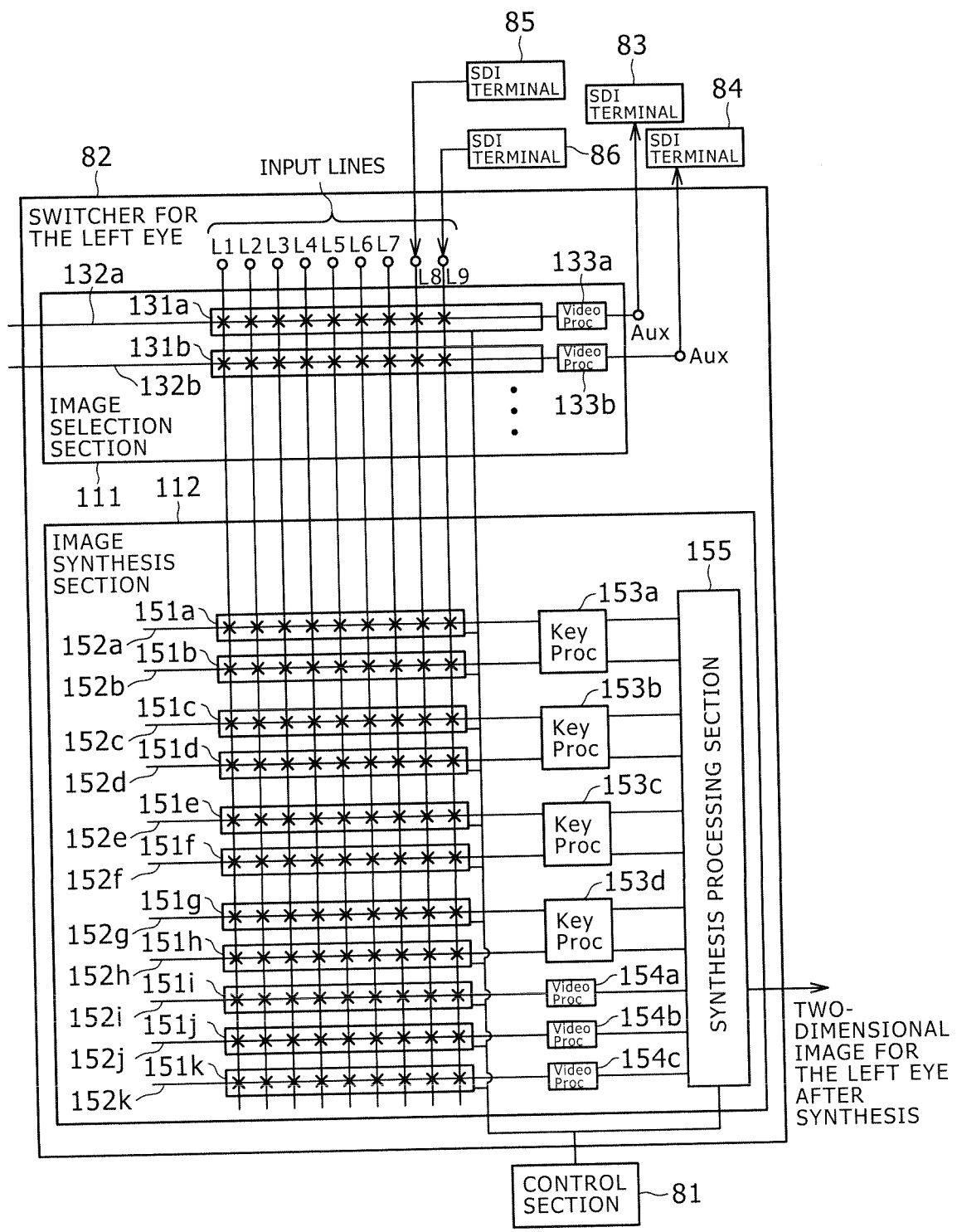
FIG. 6 is a block diagram showing an example of a configuration of a switcher for the left eye shown in FIG. 5.

FIG. 6 shows an example of a configuration of the switcher 82 for the left eye.

It is to be noted that, since the switcher 92 for the right eye is configured similarly to the switcher 82 for the left eye, description is given only of the switcher 82 for the left eye while description of the switcher 92 for the right eye is omitted herein to avoid redundancy.

The switcher 82 for the left eye is configured from an image selection section 111 and an image synthesis section 112. The switcher 82 for the left eye includes input lines L1 to L9.

To the input lines L1 to L7 of the input lines L1 to L9, two-dimensional images for the left eye individually corresponding to a plural of three-dimensional images, in the present case, seven three-dimensional images, supplied thereto from the image synthesis apparatus 22 are inputted or supplied.

Meanwhile, to the input line L8 from among the input lines L1 to L9, the two-dimensional image for the left eye corresponding to the three-dimensional image 41 and the priority order are inputted from the SDI terminal 85, and to the input line L9, the two-dimensional image for the left eye corresponding to the three-dimensional image 42 is inputted from the SDI terminal 86.

It is to be noted that, while it is described above that the switcher 82 for the left eye has the nine input lines L1 to L9, the number of input lines is not limited to nine but may be any other number.

The image selection section 111 selects the two-dimensional images for the left eye individually corresponding to the two three-dimensional images 41 and 42 selected by a selection operation of the user from among the seven two-dimensional images for the left eye supplied from the input lines L1 to L7 under the control of the control section 81. Then, the image selection section 111 supplies one of the selected two-dimensional images for the left eye to the SDI terminal 83 and supplies the other selected two-dimensional image for the left eye to the SDI terminal 84.

In particular, for example, the image selection section 111 is configured from cross point switches 131*a* and 131*b*, bus lines 132*a* and 132*b* and video signal processing sections (Video Proc) 133*a* and 133*b*.

The cross point switch 131*a* controls connection at points indicated by a x mark at which the bus line 132*a* and the input lines L1 to L9 cross with each other under the control of the control section 81. The cross point switch 131*a* controls connection at the points and supplies one of two-dimensional images for the left eye corresponding, for example, to the three-dimensional image 41, from between the two-dimensional images for the left eye supplied from the input lines L1 to L7 to the video signal processing section 133*a* through the bus line 132*a*.

The cross point switch 131*b* controls connection at points at which the bus line 132*b* and the input lines L1 to L9 cross with each other under the control of the control section 81. The cross point switch 131*b* controls connection of the points such that it supplies the two-dimensional image for the left eye corresponding, for example, to the three-dimensional image 42 from between the two-dimensional images for the left eye supplied thereto from the input lines L1 to L7 to the video signal processing section 133*b* through the bus line 132*b*.

The video signal processing section 133*a* carries out predetermined processing for the two-dimensional image for the left eye corresponding to the three-dimensional image 41 supplied thereto from the bus line 132*a* and supplies a resulting two-dimensional image for the left eye to the SDI terminal 83. The video signal processing section 133*b* carries out predetermined processing for the two-dimensional image for the left eye corresponding to the three-dimensional image 42 supplied thereto from the bus line 132*b* and supplies a resulting two-dimensional image for the left eye to the SDI terminal 84.

The image synthesis section 112 is configured from cross point switches 151*a* to 151*k*, bus lines 152*a* to 152*k*, key signal processing sections (Key Proc) 153*a* to 153*d*, video signal processing sections (Video Proc) 154*a* to 154*c* and a synthesis processing section 155.

The cross point switch 151a controls connection at points at which the bus line 152a and the input lines L1 to L9 cross each other under the control of the control section 81 and supplies, for example, a two-dimensional image for the left eye corresponding to the three-dimensional image 41 and a priority order both supplied from the input line L8, to the key signal processing section 153a through the bus line 152a.

The cross point switch 151b controls connection at points at which the bus line 152b and the input lines L1 to L9 cross each other under the control of the control section 81 and supplies, for example, a two-dimensional image for the left eye corresponding to the three-dimensional image 41 and supplied thereto from the input line L8, to the key signal processing section 153a through the bus line 152b.

The key signal processing section 153a generates an image worked for overlapping based on the two-dimensional image for the left eye from the bus line 152a and supplies the generated image to the synthesis processing section 155. Further, the key signal processing section 153a generates a key signal of the two-dimensional image for the left eye in response to the two-dimensional image for the left eye from the bus line 152b and supplies the key signal to the synthesis processing section 155.

It is to be noted that the key signal represents a region in which a physical solid other than the background exists from within the overall area of an image. In the first embodiment, this key signal is generated, for example, from a corresponding two-dimensional image for the left eye and the key signal processing section 153a extracts the key signal from the two-dimensional image for the left eye to generate a key signal of the two-dimensional image for the left eye.

Further, the key signal processing section 153a supplies a priority order from the bus line 152a to the synthesis processing section 155.

It is to be noted that the cross points switches 151c and 151d, 151e and 151f as well as 151g and 151h are configured similarly to the cross points switches 151a and 151b. Further, the key signal processing sections 153b to 153d are configured similarly to the key signal processing section 153a. For example, the cross point switches 151c and 151d supply the two-dimensional images for the left eye corresponding to the three-dimensional image 42 and supplied thereto from the input line L9, to the key signal processing section 153b through the bus lines 152c and 152d.

Here, since synthesis of the two three-dimensional images 41 and 42 in the present first embodiment is described here, for example, the cross point switches 151a to 151d from among the cross point switches 151a to 151h are used and the key signal processing sections 153a and 153b from among the key signal processing sections 153a to 153d are used.

In the case where three or more three-dimensional images, that is, three or more two-dimensional images for the left eye, are to be synthesized, the cross point switches 151e to 151h and the key signal processing sections 153c and 153d are further used. It is to be noted that also the relationship between a background image hereinafter described and images to be handled in the key signal processing sections may take a forward and backward relationship in the z direction into consideration like the relationship of the three-dimensional images 41 and 42 in the example described hereinabove. For example, even in the case where the key signal processing section 153a from among the key signal processing sections 153a to 153d is used, a forward and backward relationship of the key signal processing section 153a to an image of the background may be taken into consideration. Here, in order to simplify the description, description is given of synthesis in which a forward and backward relationship regarding two three-dimensional images is taken into consideration.

The cross point switches 151i to 151k, bus lines 152i to 152k and video signal processing sections 154a to 154c supply, for example, a two-dimensional image for the left eye from between a two-dimensional image for the left eye and a two-dimensional image for the right eye which configure a background three-dimensional image representative of the background to be synthesized with the three-dimensional images 41 and 42 to the synthesis processing section 155.

In this instance, from the input lines L1 to L7 from among the input lines L1 to L9, a background image as a two-dimensional image for the left eye from between a two-dimensional image for the left eye and a two-dimensional image for the right eye which individually configure a background three-dimensional image are supplied.

The cross point switch 151i controls connection at points at which the bus line 152i and the input lines L1 to L9 cross each other to select one of background images supplied thereto from the input lines L1 to L7 under the control of the control section 81 and supplies the selected background image to the video signal processing section 154a through the bus line 152i.

The video signal processing section 154a applies predetermined processing to the background image from the bus line 152i and supplies a resulting background image to the synthesis processing section 155.

It is to be noted that the cross point switches 151j and 151k are configured similarly to the cross point switch 151i, and the video signal processing sections 154b and 154c are configured similarly to the video signal processing section 154a.

The cross point switches 151j and 151k and the video signal processing sections 154b and 154c are used, for example, in the case where a plurality of background three-dimensional images are to be synthesized with the three-dimensional images 41 and 42. For example, it is possible to provide a wipe waveform generator in the inside of the synthesis processing section 155 such that the screen is delimited by a wipe waveform generated by the wide waveform generator to dispose a plurality of background three-dimensional images on the screen.

The synthesis processing section 155 carries out a synthesis process of synthesizing two two-dimensional images for the left eye supplied thereto from the key signal processing sections 153a and 153b in a priority order from the key signal processing section 153a using key signals from the key signal processing sections 153a and 153b and synthesizing a result of the synthesis with the background images. Then, the synthesis processing section 155 outputs a two-dimensional image for the left eye obtained by the synthesis from an output line.

Details of the Priority Order Determination Section 87

Figure 7:
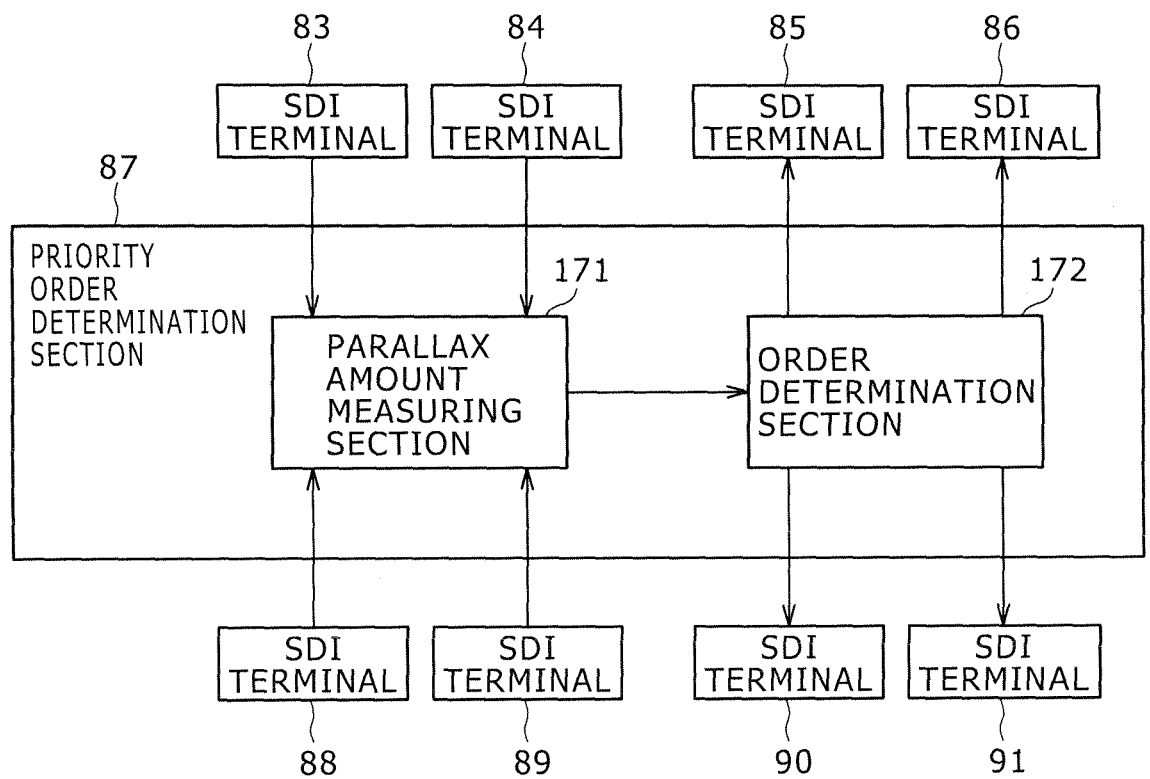
FIG. 7 is a block diagram showing an example of a configuration of a priority order determination section shown in FIG. 5.

FIG. 7 shows an example of a configuration of the priority order determination section 87.

The priority order determination section 87 is configured from a parallax amount measuring section 171 and an order determination section 172.

The parallax amount measuring section 171 acquires a combination of a two-dimensional image for the left eye from the SDI terminal 83 and a two-dimensional image for the right eye from the SDI terminal 88 as the three-dimensional image 41.

The parallax amount measuring section 171 acquires a combination of a two-dimensional image for the left eye from the SDI terminal 84 and a two-dimensional image for the right eye from the SDI terminal 89 as the three-dimensional image 42.

Then, in the case where the three-dimensional images 41 and 42 are synthesized based on the acquired three-dimensional images 41 and 42, the parallax amount measuring section 171 detects an overlapping portion between regions which configure the dog 41a and the tree 41b in the three-dimensional image 41 and a region which configures the automobile 42a in the three-dimensional image 42.

In particular, for example, the parallax amount measuring section 171 detects an overlapping portion of a two-dimensional image for the left eye based on a key signal generated by calculation from the two-dimensional image for the left eye corresponding to the three-dimensional image 41 from the SDI terminal 83 and a two-dimensional image for the left eye corresponding to the three-dimensional image 42 from the SDI terminal 84.

Further, the parallax amount measuring section 171 detects an overlapping portion of a two-dimensional image for the right eye based on a key signal generated by calculation from the two-dimensional image for the right eye corresponding to the two-dimensional image 41 from the SDI terminal 88 and a two-dimensional image for the right eye corresponding to the three-dimensional image 42 from the SDI terminal 89.

It is to be noted that, for the generation of the key signals, for example, a luminance key technique of generating a key signal from the luminance or the like is used.

The parallax amount measuring section 171 measures, based on the overlapping portions of the two-dimensional image for the left eye and the two-dimensional image for the right eye which correspond to the three-dimensional image 41, the parallax mount between the overlapping portions of the two-dimensional image for the left eye and the two-dimensional image for the right eye in the three-dimensional image 41. The parallax amount described is hereinafter referred to as parallax amount of the three-dimensional image 41. Then, the parallax amount measuring section 171 supplies the measured parallax amount of the three-dimensional image 41 to the order determination section 172 together with the three-dimensional image 41.

The parallax amount measuring section 171 measures, based on the overlapping portions of the two-dimensional image for the left eye and the two-dimensional image for the right eye which correspond to the three-dimensional image 41, the parallax mount between the overlapping portions of the two-dimensional image for the left eye and the two-dimensional image for the right eye in the three-dimensional image 42. The parallax amount described is hereinafter referred to as parallax amount of the three-dimensional image 42. Then, the parallax amount measuring section 171 supplies the measured parallax amount of the three-dimensional image 42 to the order determination section 172 together with the three-dimensional image 42.

The order determination section 172 calculates an average value ave1 of the depth z of the three-dimensional image 41 based on the parallax amount of the three-dimensional image 41 from the parallax amount measuring section 171.

Further, the order determination section 172 calculates an average value ave2 of the depth z of the three-dimensional image 42 based on the parallax amount of the three-dimensional image 42 from the parallax amount measuring section 171.

Then, the order determination section 172 compares the average values ave1 and ave2 of the depth z of the three-dimensional images 41 and 42, determines a priority order based on a result of the comparison and supplies the determined priority order to the SDI terminals 85 and 90.

The order determination section 172 supplies the two-dimensional image for the left eye corresponding to the three-dimensional image 41 from the parallax amount measuring section 171 to the SDI terminal 85, and supplies the two-dimensional image for the left eye corresponding to the three-dimensional image 42 from the parallax amount measuring section 171 to the SDI terminal 86.

Further, the order determination section 172 supplies the two-dimensional image for the right eye corresponding to the three-dimensional image 41 from the parallax amount measuring section 171 to the SDI terminal 90 and supplies the two-dimensional image for the right eye corresponding to the three-dimensional image 42 from the parallax amount measuring section 171 to the SDI terminal 91.

Operation of the Image Synthesis Apparatus 22

Now, a priority order determination process carried out by the image synthesis apparatus 22 is described with reference to a flow chart of FIG. 8.

This priority order determination process is started, for example, when the user uses the console 21 to carry out a selection operation of selecting three-dimensional images 41 and 42 to be synthesized from among a plurality of three-dimensional images supplied thereto from the image synthesis apparatus 22.

At this time, an operation signal corresponding to the selection operation of the user is supplied from the console 21 to the control section 81. Then, the control section 81 controls the switcher 82 for the left eye and the switcher 92 for the right eye in response to the operation signal from the console 21.

In particular, at step S1, the image selection section 111 of the switcher 82 for the left eye acquires two-dimensional images for the left eye individually corresponding to the two three-dimensional images 41 and 42 selected by a selection operation of the user from among the seven two-dimensional images for the left eye inputted from the input lines L1 to L7 under the control of the control section 81.

Then, the image selection section 111 supplies one of the acquired two-dimensional images for the left eye to the SDI terminal 83 and supplies the other of the acquired two-dimensional images for the left eye to the SDI terminal 84. The SDI terminals 83 and 84 supply the two-dimensional images for the left eye from the image selection section 111 to the priority order determination section 87.

Further, the switcher 92 for the right eye supplies one of the acquired two-dimensional images for the right eye to the SDI terminal 88 similarly to the image selection section 111 of the switcher 82 for the left eye and supplies the other two-dimensional image for the right eye to the SDI terminal 89 under the control of the control section 81. The SDI terminals 88 and 89 individually supply the two-dimensional images for the right eye from the switcher 92 for the right eye to the priority order determination section 87.

At step S2, the parallax amount measuring section 171 of the priority order determination section 87 detects, based on the two-dimensional image for the left eye corresponding to the three-dimensional image 41 from the SDI terminal 83 and the two-dimensional image for the left eye corresponding to the three-dimensional image 42 from the SDI terminal 84, an overlapping portion of the two-dimensional images for the left eye.

Further, the parallax amount measuring section 171 detects an overlapping portion of the two-dimensional images for the right eye based on the two-dimensional image for the right eye corresponding to the three-dimensional image 41 from the SDI terminal 88 and the two-dimensional image for the right eye corresponding to the three-dimensional image 42 from the SDI terminal 89.

The parallax amount measuring section 171 measures, based on the overlapping portion between the two-dimensional image for the left eye and the two-dimensional image for the right eye corresponding to the three-dimensional image 41, that is, corresponding to a combination of the two-dimensional image for the left eye from the SDI terminal 83 and the two-dimensional image for the right eye from the SDI terminal 88, the parallax amount of the three-dimensional image 41. Then, the parallax amount measuring section 171 supplies the measured parallax amount to the order determination section 172 together with the three-dimensional image 41.

Further, the parallax amount measuring section 171 measures, based on the overlapping portion between the two-dimensional image for the left eye and the two-dimensional image for the right eye corresponding to the three-dimensional image 42, that is, corresponding to a combination of the two-dimensional image for the left eye from the SDI terminal 84 and the two-dimensional image for the right eye from the SDI terminal 89, the parallax amount of the three-dimensional image 42. Then, the parallax amount measuring section 171 supplies the measured parallax amount to the order determination section 172 together with the three-dimensional image 42.

At step S3, the order determination section 172 calculates the average value ave1 of the depth z of the three-dimensional image 41 based on the parallax amount of the three-dimensional image 41 from the parallax amount measuring section 171. Further, the order determination section 172 calculates the average value ave2 of the depth z of the three-dimensional image 42 based on the parallax amount of the three-dimensional image 42 from the parallax amount measuring section 171.

Then, the order determination section 172 compares the average values ave1 and ave2 of the depth z regarding the three-dimensional images 41 and 42 with each other, determines a priority order based on a result of the comparison and supplies the determined priority order to the SDI terminals 85 and 90.

The order determination section 172 supplies the two-dimensional image for the left eye corresponding to the three-dimensional image 41 from the parallax amount measuring section 171 to the SDI terminal 85 and supplies the two-dimensional image for the left eye corresponding to the three-dimensional image 42 from the parallax amount measuring section 171 to the SDI terminal 86.

The order determination section 172 supplies the two-dimensional image for the right eye corresponding to the three-dimensional image 41 from the parallax amount measuring section 171 to the SDI terminal 90 and supplies the two-dimensional image for the right eye corresponding to the three-dimensional image 42 from the order determination section 172 to the SDI terminal 91.

The SDI terminal 85 supplies the two-dimensional image for the left eye and a priority order from the order determination section 172 to the switcher 82 for the left eye, and the SDI terminal 86 supplies a two-dimensional image for the left eye from the order determination section 172 to the switcher 82 for the left eye.

The SDI terminal 90 supplies the two-dimensional image for the right eye and the priority order from the order determination section 172 to the switcher 92 for the right eye, and the SDI terminal 91 supplies the two-dimensional image for the right eye from the order determination section 172 to the switcher 92 for the right eye.

At step S4, the image synthesis section 112 of the switcher 82 for the left eye synthesizes the two-dimensional image for the left eye supplied thereto from the SDI terminal 85 through the input line L8 and the two-dimensional image for the left eye supplied thereto from the SDI terminal 86 through the input line L9 in the priority order supplied thereto from the SDI terminal 85 through the input line L8. Then, the image synthesis section 112 outputs a two-dimensional image for the left eye obtained by the synthesis to the output line.

Further, the switcher 92 for the right eye synthesizes the two-dimensional image for the right eye from the SDI terminal 90 and the two-dimensional image for the right eye from the SDI terminal 91 in the priority order from the SDI terminal 90 similarly to the switcher 82 for the left eye, and outputs a two-dimensional image for the right eye obtained by the synthesis to the output line.

As described above, according to the priority order determination process, for example, the image synthesis apparatus 22 determines, based on the parallax amounts of the three-dimensional images 41 and 42 selected by a selection operation of the user, a priority order corresponding to the parallax amounts of the three-dimensional images 41 and 42 and synthesizes the three-dimensional images 41 and 42 based on the determined priority order. Consequently, such a situation that the three-dimensional images 41 and 42 are synthesized in a priority order which does not correspond to the parallax mounts of the three-dimensional images 41 and 42 to be synthesized can be prevented.

Therefore, in the priority order determination process, it can be prevented that an unnatural three-dimensional image synthesized in a priority order which does not correspond to the parallax amounts of the three-dimensional images 41 and 42 is generated. Therefore, an appreciating person can appreciate a three-dimensional image which corresponds to the parallax amounts and does not provide an uncomfortable feeling.

Further, in the priority order determination process, only if the user uses the console 21 to select the three-dimensional images 41 and 42 to be synthesized, the three-dimensional images 41 and 42 are synthesized in a priority order corresponding to the parallax amounts of the three-dimensional images 41 and 42.

Therefore, for example, in comparison with an alternative case in which it is necessary for the user to use the console 21 to adjust the order for the synthesis or the parallax amount of three-dimensional images so that the three-dimensional images can be synthesized in a priority order corresponding to the parallax amounts, operation by the user can be reduced and the troublesomeness of operation by the user using the console 21 can be reduced.

In the first embodiment, the priority order determination section 87 measures the parallax amounts of the three-dimensional images 41 and 42 and determines a priority order based on a result of the measurement. However, it is possible to adopt, for example, such a different configuration that priority order determination sections 87a to 87d having a function similar to that of the priority order determination section 87 are provided in a switcher 182 for the left eye like an image synthesis apparatus 22 shown in FIG. 9.

Another Example of the Configuration of the Image Synthesis Apparatus 22

Figure 9:
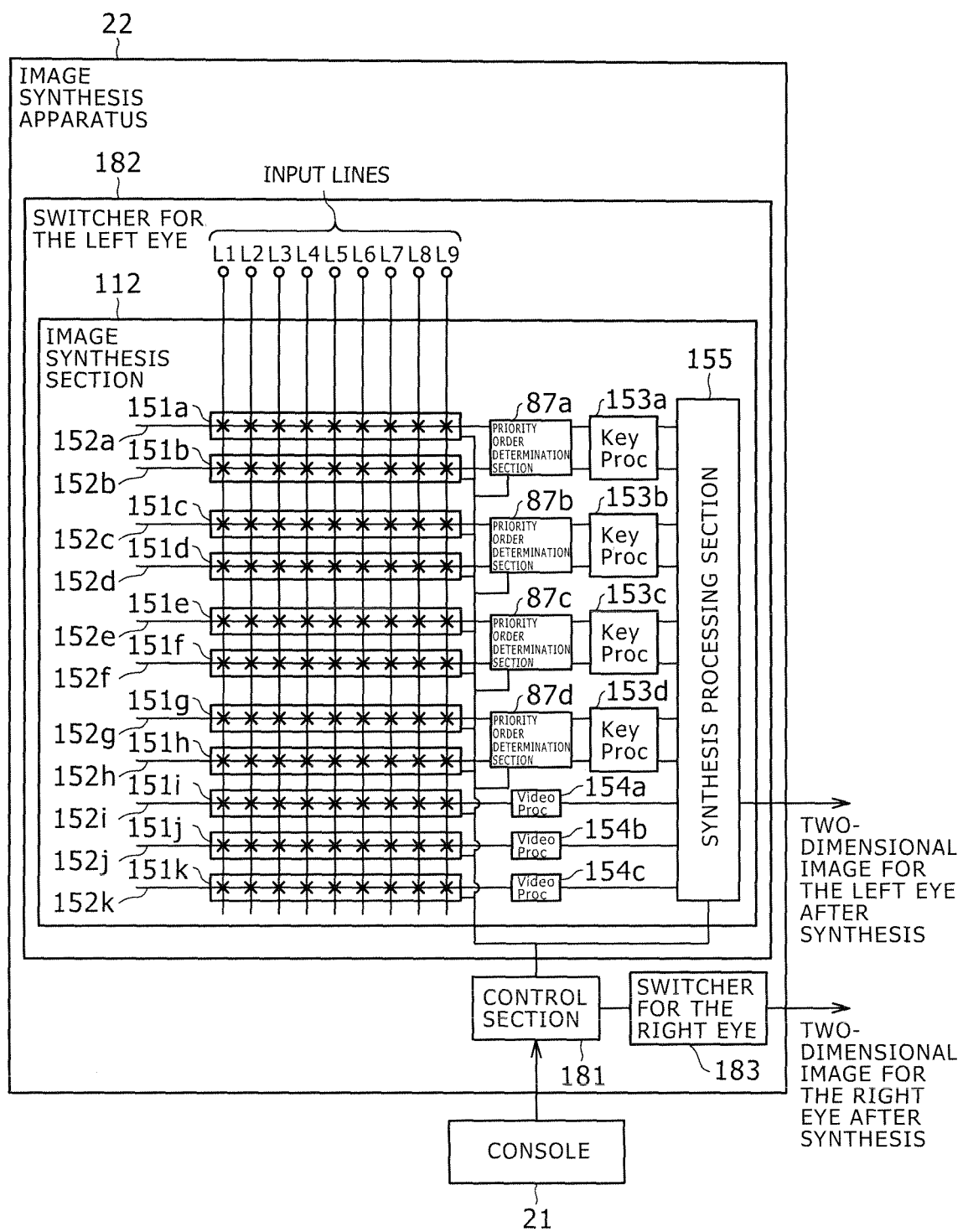
FIG. 9 is a block diagram showing another example of a configuration of the image synthesis apparatus of FIG. 1.

Now, FIG. 9 shows another example of a configuration of the image synthesis apparatus 22.

Referring to FIG. 9, the image synthesis apparatus 22 includes a control section 181, a switcher 182 for the left eye and a switcher 183 for the right eye.

The control section 181 controls the switcher 182 for the left eye and the switcher 183 for the right eye in response to an operation signal from the console 21.

The switcher 182 for the left eye is configured from an image synthesis section 112 in which priority order determination sections 87a to 87d configured similarly to the priority order determination section 87 are provided newly. It is to be noted that the priority order determination sections 87a to 87d are connected to each other by a controlling communication line and are connected to the control section 181 by another controlling communication line. Further, the switcher 182 for the left eye is connected also to the same component of the switcher 183 for the right eye by a controlling communication line so that all components operate in association with each other.

To the switcher 182 for the left eye, two-dimensional images for the left eye are supplied as two-dimensional images for the left eye individually corresponding to a plurality of three-dimensional images from the input lines L1 to L9.

It is to be noted that those elements of the image synthesis section 112 of the switcher 182 for the left eye which are configured similarly to those of the image synthesis section 112 shown in FIG. 6 are denoted by like reference characters, and overlapping description of them is suitably omitted herein to avoid redundancy.

The cross point switch 151a selects the two-dimensional image for the left eye corresponding to the three-dimensional image 41 selected, for example, by a selection operation of a user from among the two-dimensional images for the left eye individually supplied from the input lines L1 to L9 and supplies the selected two-dimensional image for the left eye to the priority order determination section 87a through the bus line 152a.

Meanwhile, the cross point switch 151c selects the two-dimensional image for the left eye corresponding to the three-dimensional image 42 selected, for example, by a selection operation of the user from between the two-dimensional images for the left eye individually supplied from the input lines L1 to L9 and supplies the selected two-dimensional image for the left eye to the priority order determination section 87 through the bus line 152c.

The priority order determination section 87a communicates with and carries out associated processing with the same part in the switcher 183 for the right eye and then uses the combination of the two-dimensional image for the left eye corresponding to the three-dimensional image 41 from the bus line 152a and the two-dimensional image for the right eye corresponding to the three-dimensional image 41 supplied from the switcher 183 for the right eye through the control section 181 as the three-dimensional image 41 for processing.

Meanwhile, the priority order determination section 87b communicates with and carries out associated processing with the same part in the switcher 183 for the right eye and then uses the combination of the two-dimensional image for the left eye corresponding to the three-dimensional image 42 from the bus line 152c and the two-dimensional image for the right eye corresponding to the three-dimensional image 42 supplied from the switcher 183 for the right eye through the control section 181 as the three-dimensional image 42 for processing.

Then, the priority order determination sections 87a and 87b determine a priority order based on the acquired three-dimensional image 41 and three-dimensional image 42 similarly as in the priority order determination section 87. The priority order determination section 87a supplies the determined priority order to the key signal processing sections 153a and 153b together with the two-dimensional images for the left eye individually corresponding to the acquired three-dimensional images 41 and 42.

Consequently, the key signal processing sections 153a and 153b and the synthesis processing section 155 carry out a process of synthesizing the three-dimensional images 41 and 42 as described hereinabove, and a two-dimensional image for the left eye obtained by the synthesis is outputted from the switcher 182 for the left eye.

Meanwhile, the priority order determination sections 87a and 87b hold the determined priority order commonly with the switcher 183 for the right eye through the control section 181.

It is to be noted that the priority order determination sections 87c and 87d are configured similarly to the priority order determination section 87a and, when three or more three-dimensional images are to be synthesized, for example, the priority order determination sections 87a to 87d transfer the parallax amounts of the three or more three-dimensional images to each other to determine a priority order.

The switcher 183 for the right eye synthesizes the two-dimensional images for the right eye individually corresponding to the three-dimensional images 41 and 42 in the priority order held commonly with the priority order determination section 87a through the control section 181 and outputs a two-dimensional image for the right eye obtained by the synthesis.

In the image synthesis apparatus 22 of FIG. 9, the SDI terminals 83 to 86, priority order determination section 87 and SDI terminals 88 to 91 can be omitted, for example, in comparison with the image synthesis apparatus 22 of FIG. 5.

Further, in the first embodiment, in a corresponding relationship to the fact that the user selects the three-dimensional images 41 and 42 to be synthesized, the image synthesis apparatus 22 determines a priority order, that is, a chronological order, of the three-dimensional images 41 and 42 to be synthesized. However, it is possible to adopt a different configuration wherein a priority order designated by a user using the console 21 is applied in response to a situation during utilization.

Top Plan View of the Console 21

Figure 10:
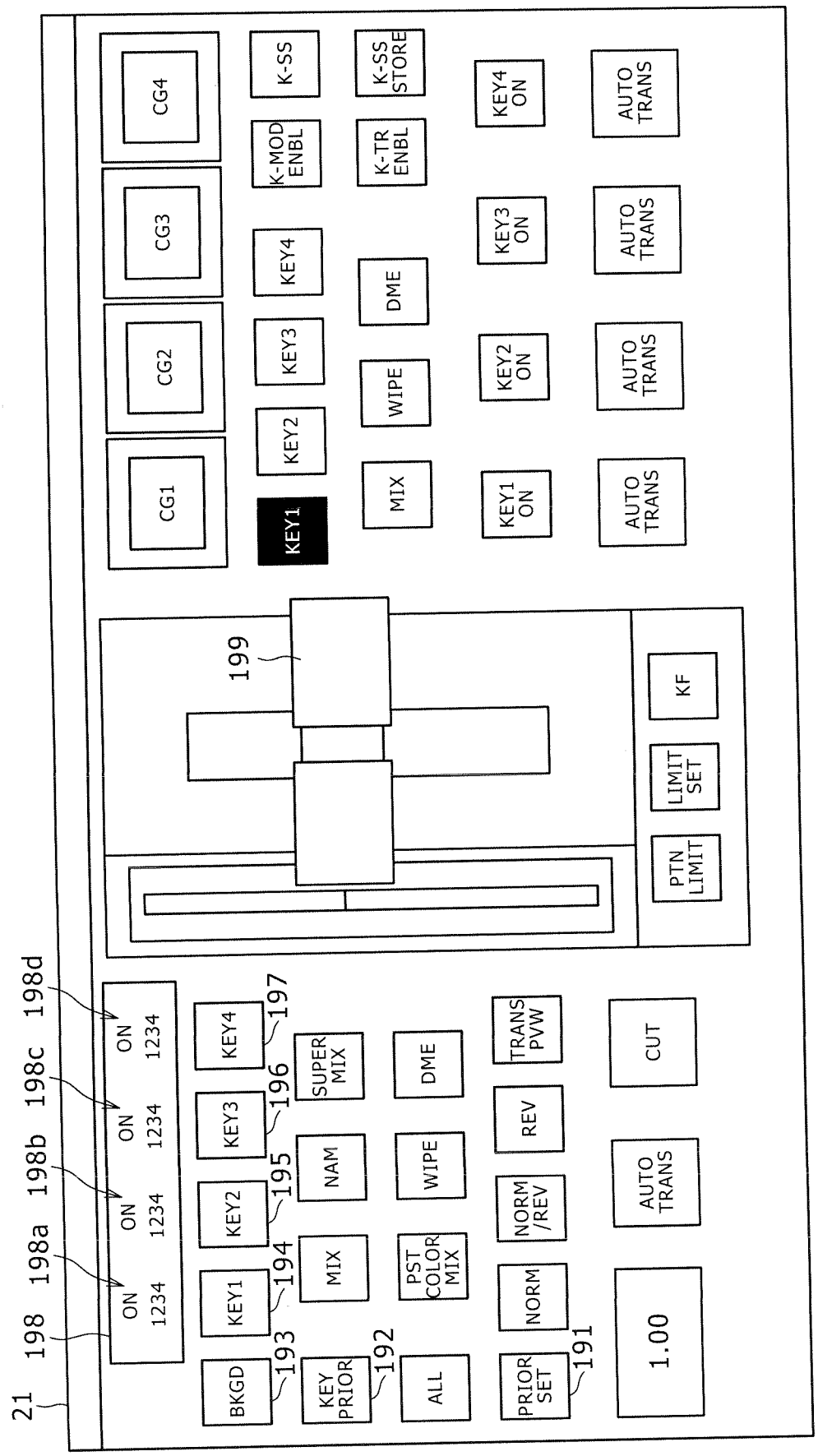
FIG. 10 is a schematic view showing an example of a console shown in FIG. 1.

An example of the console 21 which is used in the case where a user designates a priority order is shown in FIG. 10.

Referring to FIG. 10, the console 21 includes a "PRIOR SET" button 191, a "KEY PRIOR" button 192, a "BKGD" button 193, a "KEY1" button 194, a "KEY2" button 195, a "KEY3" button 196, a "KEY4" button 197, a priority order display section 198, a fader changing lever 199, and a plurality of other buttons operated to control the image synthesis apparatus 22.

In the following description, description is given only of the buttons from the "PRIOR SET" button 191 to the "KEY4" button 197 which are operated when the user designates a priority order and the priority order display section 198 while description of the other buttons is omitted.

It is to be noted that the fader changing lever 199 is operated when a fader value is to be changed in the third embodiment of the present invention hereinabove described. The fader changing lever 199 and a fader value are described in the description of the third embodiment.

The "PRIOR SET" button 191 is operated to designate a priority order. In particular, for example, while the "PRIOR SET" button 191 is kept depressed, the buttons from the "KEY PRIOR" button 192 to the "KEY4" button 197 function as buttons for designating a priority order.

The "KEY PRIOR" button 192 is kept in an on state or an off state in the case where the console 21 is set to a mode in which the "KEY PRIOR" button 192 can be operated. Further, the "KEY PRIOR" button 192 emits light when it is in an on state, but emits no light when it is in an off state. It is to be noted that the "KEY PRIOR" button 192 has a built-in LED (light emitting diode) or the like and emits light or no light in response to the on or off state thereof.

Further, for example, the "KEY PRIOR" button 192 designates an object for which a priority order is to be set in response to the on or off state thereof.

In particular, for example, when the "KEY PRIOR" button 192 is in an off state and emits no light, it designates a priority order in a current mode as an object of setting, but when the "KEY PRIOR" button 192 is in an on state and emits light, it designates a priority order in a next mode as an object of setting.

It is to be noted that the current mode represents a mode currently set to the console 21, and the next mode represents a mode to which the mode changes from the current mode in response to a changing operation of the user. The image synthesis apparatus 22 synthesizes three-dimensional images in a priority order in the mode set to the console 21.

In the case where the priority order in the next mode is determined as an object of setting, the "BKGD" button 193 sets the priority order in the next mode to a priority order same as that in the current mode in response to an operation by the user.

The user would operate the buttons from the "KEY1" button 194 to the "KEY4" button 197 to set the priority order in the mode designated as the object of setting in response to the "KEY PRIOR" button 192.

With the buttons from the "KEY1" button 194 to the "KEY4" button 197, three-dimensional images to be synthesized are associated individually. The buttons from the "KEY1" button 194 to the "KEY4" button 197 are each operated in order to set a turn in a priority order of a corresponding three-dimensional image.

In particular, for example, if the "KEY1" button 194 is depressed, then the turn in a priority order of a corresponding three-dimensional image becomes the first, and the turns in the priority order of the buttons from the "KEY2" button 195 to the "KEY4" button 197 are changed so as to maintain the order before the "KEY1" button 194 is depressed.

The priority order display section 198 includes a KEY1 display region 198a for representing a state of the "KEY1" button 194, a KEY2 display region 198b for representing a state of the "KEY2" button 195, a KEY3 display region 198c for representing a state of the "KEY3" button 196, and a KEY4 display region 198d for representing a state of the "KEY4" button 197.

The KEY1 display region 198a displays in which one of an on state and an off state of the "KEY1" button 194 is and displays a turn in a priority order of a three-dimensional image associated with the "KEY1" button 194. Further, the KEY2 display region 198b, KEY3 display region 198c and KEY4 display region 198d are configured similarly to the KEY1 display region 198a, and therefore, overlapping description of them is omitted herein to avoid redundancy.

It is to be noted that, when the "PRIOR SET" button 191 is not depressed, the "KEY PRIOR" button 192 is operated in order to display one of the priority order in the current mode and the priority order in the next mode.

In particular, for example, when the "KEY PRIOR" button 192 is in an off state and emits no light, the KEY1 to KEY4 display regions 198a to 198d of the priority order display section 198 indicate corresponding ones of the numbers "1," "2," "3" and "4" as the turn numbers of the priority order in the current mode.

On the other hand, for example, when the "KEY PRIOR" button 192 is in an on state and emits light, the KEY1 to KEY4 display regions 198a to 198d of the priority order display section 198 individually display turn numbers of the priority order in the next mode.

In particular, for example, those (the numbers "1," "2," "3" and "4") of the KEY1 to KEY4 display regions 198a to 198d of the priority order display section 198 in which the turn numbers in the priority order are same between the priority order in the current mode and the priority order in the next mode emit light while those in which the turn numbers are different flicker.

In this manner, the user can designate a priority order of three-dimensional images to be synthesized using the console 21.

Example of Change by the Console 21

Figure 11:
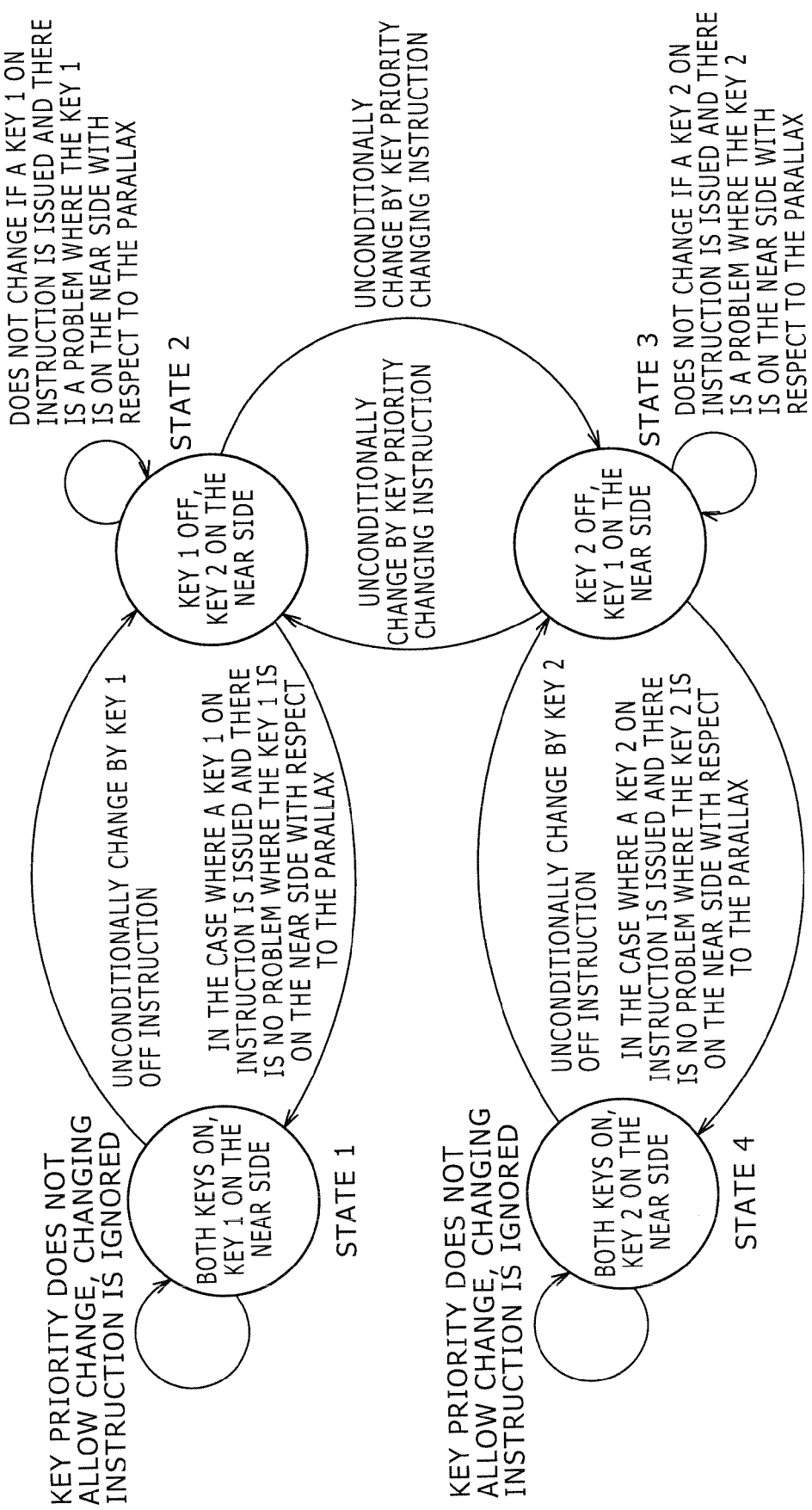
FIG. 11 is a diagrammatic view illustrating an example of state transition of a button provided on the console of FIG. 10.

FIG. 11 illustrates states of the "KEY1" button 194 and the "KEY2" button 195, for example, in the case where the user uses the console 21 to designate a priority order of three-dimensional images to be synthesized.

It is to be noted that, in order to simplify description, it is assumed that, in FIG. 11, the user operates only the "KEY1" button 194 and the "KEY2" button 195 into an on state or an off state from among the "KEY1" to "KEY4" buttons 194 to 197.

Further, it is assumed that, in FIG. 11, the priority order of the "KEY1" button 194 and the "KEY2" button 195, or in other words, which one of a three-dimensional image corresponding to the "KEY1" button 194 and a three-dimensional image corresponding to the "KEY2" button 195 should be displayed on the near side when the three-dimensional images are to be synthesized, is changed.

The "KEY1" button 194 and the "KEY2" button 195 are placed into an on state or an off state, and one of a state 1 to a state 4 is established in response to the states of the "KEY1" button 194 and the "KEY2" button 195.

Corresponding to this, the control section 81 controls the switcher 82 for the left eye, priority order determination section 87 and switcher 92 for the right eye in response to the states of the "KEY1" button 194 and the "KEY2" button 195 based on an operation signal supplied thereto from the console 21.

In particular, for example, when both of the "KEY1" button 194 and the "KEY2" button 195 are in an on state, the state 1 is established in which three-dimensional images corresponding to the "KEY1" button 194 and the "KEY2" button 195 are synthesized such that the three-dimensional image corresponding to the "KEY1" button 194 is displayed on the near side.

In the state 1, an operation signal corresponding to a user operation for changing the priority order so that the three-dimensional image corresponding to the "KEY2" button 195 is displayed on the near side is ignored or abandoned. In other words, the control section 81 ignores an operation signal corresponding to a user operation for changing the priority order from the console 21 and handles the operation signal such that the user operation is not carried out.

Further, if, in the state 1, a KEY1 off operation for placing the "KEY1" button 194 into an off state is carried out in order to eliminate a three-dimensional image corresponding to the "KEY1" button 194 from an object of synthesis, then the state is changed to the state 2 in which a three-dimensional image corresponding to the "KEY2" button 195 is displayed on the near side.

When the state is changed from the state 1 to the state 2, the control section 81 controls the order determination section 172 of the priority order determination section 87 to determine a priority order in a state in which the three-dimensional image corresponding to the "KEY1" button 194 is excluded from an object of synthesis. In the present case, the order determination section 172 determines that the turn in the priority order of the three-dimensional image corresponding to the "KEY2" button 195 is the first. Then, the switcher 82 for the left eye and the switcher 92 for the right eye carry out synthesis in accordance with the priority order determined by the order determination section 172 in the state in which the three-dimensional image corresponding to the "KEY1" button 194 is excluded from the object of synthesis.

However, it is to be noted that, for example, if the "KEY3" button 196 and the "KEY4" button 197 are in an on state, then the order determination section 172 newly determines a turn in the priority order of the three-dimensional image corresponding to the "KEY3" button 196 and a turn in the priority order of the three-dimensional image corresponding to the "KEY4" button 197 under the control of the control section 81 so that the priority order before the KEY1 off operation is carried out may be maintained.

This similarly applies to a case in which a priority order is newly determined by the order determination section 172 in response to an on or off state of the "KEY1" button 194 and the "KEY2" button 195.

In the case where, in the state 2, the three-dimensional image corresponding to the "KEY1" button 194 is newly added as an object of synthesis and a KEY1 operation for turning the "KEY1" button 194 into an on state in order to set the turn in the priority order of the three-dimensional image corresponding to the "KEY1" button 194 to the first is carried out, if there is no problem even if the three-dimensional image corresponding to the "KEY1" button 194 is displayed on the near side, that is, even if the priority order is determined in accordance with the parallax amount, the "KEY1" button 194 is placed into an on state in response to the KEY1 on operation to change the state from the state 2 to the state 1.

In this instance, the control section 81 controls the order determination section 172 of the priority order determination section 87 to determine a priority order in the state in which the three-dimensional image corresponding to the "KEY1" button 194 is newly added as an object of synthesis.

It is to be noted that, in the case where, in the state 2, the turn in the priority order of the three-dimensional image corresponding to the "KEY1" button 194 determined by the order determination section 172 is not the first, that is, when, if the three-dimensional image corresponding to the "KEY1" button 194 is displayed on the near side, there is a problem, that is, a priority order according to the parallax amount is not obtained, the KEY1 on operation is handled as not having been carried out and the state does not change to the state 1 but the state 2 is maintained. In other words, the control section 81 ignores the operation signal corresponding to the KEY1 on operation from the console 21 and does not carry out control corresponding to the KEY1 on operation.

On the other hand, if, in the state 2, a KEY2 off operation for placing the "KEY2" button 195 into an off state is carried out and a KEY1 on operation is carried out in order to exclude the three-dimensional image corresponding to the "KEY2" button 195 from an object of synthesis as an order changing operation for changing the priority order, then the "KEY2" button 195 is placed into an off state and the "KEY1" button 194 is placed into an on state in response to the KEY2 off operation and the KEY1 on operation, respectively. Consequently, the state changes to the state 3 in which the three-dimensional image corresponding to the "KEY1" button 194 is displayed on the near side.

Upon change from the state 2 to the state 3, the control section 81 controls the order determination section 172 to determine a priority order such that the three-dimensional image corresponding to the "KEY2" button 195 is excluded from an object of synthesis and the three-dimensional image corresponding to the "KEY1" button 194 is newly added as an object of synthesis. In the present case, the order determination section 172 determines the priority order such that the turn in the priority order of the three-dimensional image corresponding to the "KEY1" button 194 is the first. Then, the switcher 82 for the left eye and the switcher 92 for the right eye carry out synthesis in accordance with the priority order determined by the order determination section 172 in the state in which the three-dimensional image corresponding to the "KEY2" button 195 is excluded from the object of synthesis.

If, in the state 3, for example, a KEY1 off operation is carried out and then a KEY2 on operation for placing the "KEY2" button 195 into an on state in order to newly add the three-dimensional image corresponding to the "KEY2" button 195 to the object of synthesis and set the turn in the priority order of the three-dimensional image, for example, to the first as an order changing operation, then the "KEY1" button 194 is placed into an off state and the "KEY2" button 195 is placed into an on state in response to the KEY1 off operation and the KEY2 on operation, respectively, so that the state is changed to the state 2.

Upon such change from the state 3 to the state 2, the control section 81 controls the order determination section 172 to determine a priority order such that the three-dimensional image corresponding to the "KEY1" button 194 is excluded from the object of synthesis and the three-dimensional image corresponding to the "KEY2" button 195 is newly added as an object of synthesis. In the present case, the order determination section 172 determines the priority order such that the turn of the three-dimensional image corresponding to the "KEY2" button 195 is the first. Then, the switcher 82 for the left eye and the switcher 92 for the right eye carry out synthesis in accordance with the priority order determined by the order determination section 172 in the state in which the three-dimensional image corresponding to the "KEY1" button 194 is excluded from the object of synthesis.

Further, in the case where, in the state 3, a KEY2 on operation is carried out, even if the three-dimensional image corresponding to the "KEY2" button 195 is displayed on the near side, if there is no problem, that is, if a priority order conforming to the parallax amount is obtained, then the "KEY2" button 195 is placed into an on state in response to the KEY2 on operation. Consequently, the state changes to the state 4 in which the three-dimensional images corresponding to the "KEY1" button 194 and the "KEY2" button 195 are synthesized such that the three-dimensional image corresponding to the "KEY2" button 195 is displayed on the near side.

In the present case, the control section 81 controls the order determination section 172 to determine a priority order in the state in which the three-dimensional image corresponding to the "KEY2" button 195 is newly added as an object of synthesis.

It is to be noted that, if, in the state 3, the turn of the priority order of the three-dimensional image corresponding to the "KEY2" button 195 determined by the order determination section 172 does not becomes the first, or in other words, if display of the three-dimensional image corresponding to the "KEY2" button 195 on the near side makes a problem, that is, results in failure to obtain a priority order according to the parallax amount, then the KEY2 on operation is handled as not having been carried out and the state 3 is maintained without changing to the state 4. In other words, the control section 81 ignores the operation signal corresponding to the KEY2 on operation from the console 21 and does not carry out control corresponding to the KEY2 on operation.

If a KEY2 off operation is carried out in the state 4, then the state changes to the state 3. Upon the change from the state 4 to the state 3, the control section 81 controls the order determination section 172 to determine a priority order in the state in which the three-dimensional image corresponding to the "KEY2" button 195 is excluded from the object of synthesis. In the present case, the order determination section 172 determines the priority order such that the turn in the priority order of the three-dimensional image corresponding to the "KEY1" button 194 is the first. Then, the switcher 82 for the left eye and the switcher 92 for the right eye carry out synthesis in accordance with the priority order determined by the order determination section 172 in the state in which the three-dimensional image corresponding to the "KEY2" button 195 is excluded from the object of synthesis.

Further, in the state 4, an operation signal corresponding to a user operation for changing the priority order such that the three-dimensional image corresponding to the "KEY1" button 194 is displayed on the near side is ignored. In particular, the control section 81 ignores an operation signal corresponding to the user operation for changing the priority order from the console 21 and handles the user operation as not having been carried out.

In the first embodiment, according to the description given hereinabove with reference to FIG. 11, when a user operation for changing a priority order is carried out, if the priority order corresponding to the user operation is different from the priority order corresponding to the parallax amount, then the operation of the user is handled as not having been carried out. Thereupon, however, for example, a warning that the priority order corresponding to the user operation is different from that corresponding to the parallax amount may be displayed, or warning sound for the warning may be outputted.

2. Second Embodiment

Now, an image synthesis apparatus 211 according to a second embodiment of the present invention is described. In the image synthesis apparatus 211, the parallax amount of three-dimensional images to be synthesized is adjusted so that the parallax amounts become corresponding a priority order designated by a user and then the three-dimensional images after the adjustment are synthesized.
Configuration of the Console 21 and the Image Synthesis Apparatus 211

Figure 12:
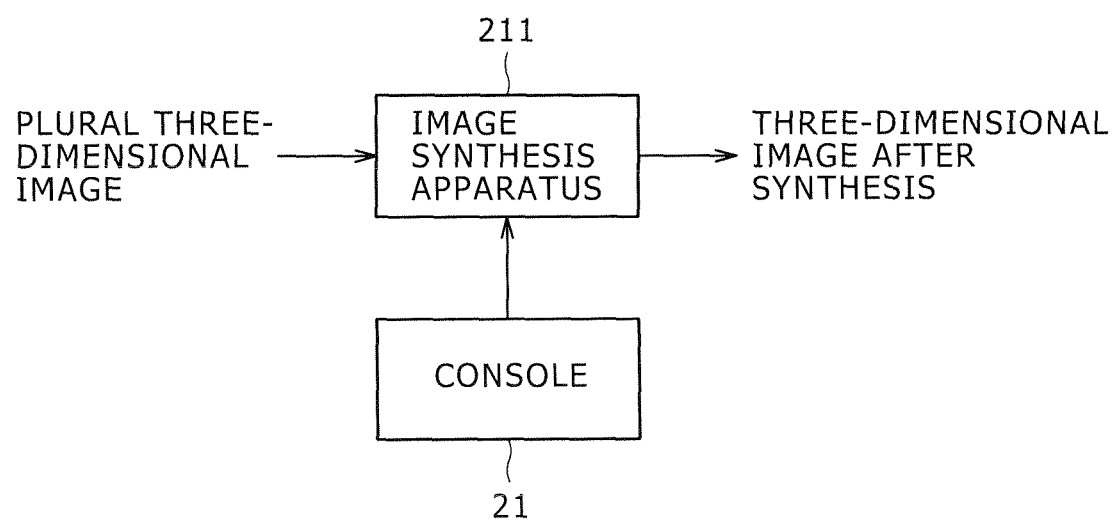
FIG. 12 is a block diagram showing an example of a configuration of an image synthesis apparatus according to a second embodiment of the present invention.

FIG. 12 shows an example of a configuration of the image synthesis apparatus 211 according to the second embodiment of the present invention which synthesizes three-dimensional images in response to an operation signal from a console 21.

It is to be noted that the console 21 is configured similarly to the console 21 in the first embodiment, and therefore, overlapping description of the same is omitted herein to avoid redundancy.

The image synthesis apparatus 211 synthesizes three-dimensional images selected by a selection operation of a user from among a plurality of three-dimensional images supplied thereto in accordance with a priority order designated by a user in response to an operation signal from the console 21.

Figure 13A:
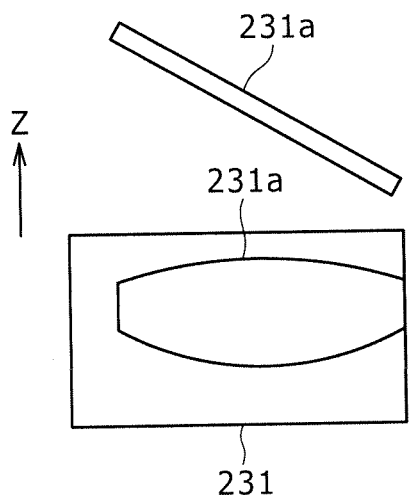
FIGS. 13A to 13C are schematic views illustrating an outline of processing carried out by the image synthesis apparatus of FIG. 12.
Figure 13B:
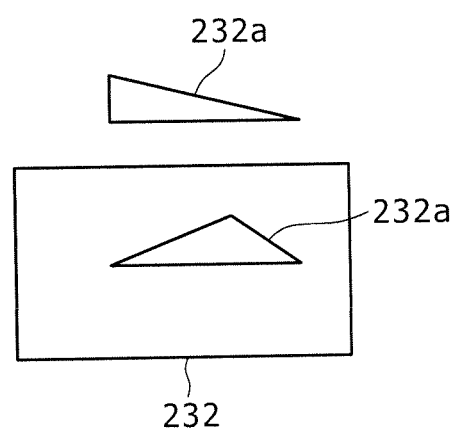
Figure 13C:
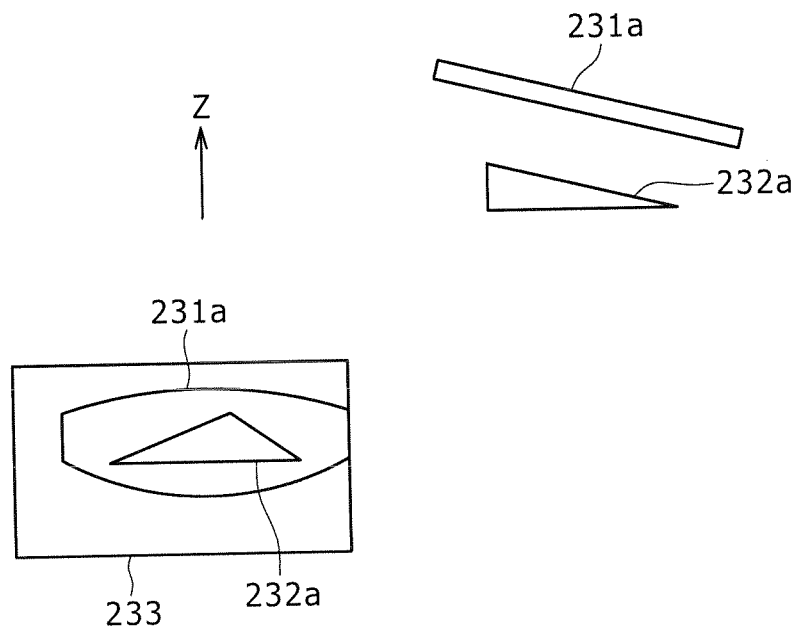

FIGS. 13A to 13C illustrate an outline of processing carried out by the image synthesis apparatus 211.

On the lower side in FIG. 13A, a three-dimensional image 231 from between two three-dimensional images selected by the user is shown. The three-dimensional image 231 displays a physical solid 231a. On the upper side in FIG. 13A, a view of the physical solid 231a as viewed from above is shown.

On the lower side in FIG. 13B, the other three-dimensional image 232 from between the two three-dimensional images selected by the user is shown. The three-dimensional image 232 displays a physical solid 232a. On the upper side in FIG. 13B, a view of the physical solid 232a as viewed from above is shown.

On the lower side in FIG. 13C, an example of a three-dimensional image 233 obtained when the three-dimensional image 231 and the three-dimensional image 232 are synthesized is shown. On the upper side in FIG. 13C, depths z of physical solids 231a and 232a in the three-dimensional image 233 are indicated.

The console 21 generates, in response to a selection operation carried out by the user using the console 21 for selecting the three-dimensional images 231 and 232 as three-dimensional images to be synthesized, an operation signal corresponding to the selection operation of the user and supplies the operation signal to the image synthesis apparatus 211.

In this instance, the image synthesis apparatus 211 selects the three-dimensional images 231 and 232 selected by the selection operation of the user from among a plurality of three-dimensional images supplied thereto in response to the operation signal from the console 21.

Further, the console 21 generates, in response to a designation operation carried out by the user using the console 21 for designating a priority order, an operation signal corresponding to the designation operation of the user and supplies the operation signal to the image synthesis apparatus 211.

The image synthesis apparatus 211 adjusts, in response to the operation signal from the console 21, the parallax amount of the three-dimensional image 231 and the parallax amount of the three-dimensional image 232 to parallax amounts corresponding to the priority order designated by the user so that the three-dimensional images 231 and 232 can be synthesized in the priority order designated by the user.

In the present case, for example, if the user designates the turn in the priority order of the three-dimensional image 231 to the second and designates the turn in the priority order of the three-dimensional image 232 to the first, then the image synthesis apparatus 211 adjusts the parallax amounts of the three-dimensional images 231 and 232 so that the depth z of the physical solid 232a in the three-dimensional image 232 may be smaller than the depth z of the physical solid 231a in the three-dimensional image 231 as seen on the upper side in FIG. 13C.

Then, the image synthesis apparatus 211 synthesizes the three-dimensional images 231 and 232 having the parallax amounts adjusted in such a manner as described above in the priority order designated by the user to generate such a three-dimensional image 233 as shown on the lower side in FIG. 13C, and outputs the generated three-dimensional image 233.
Details of the Image Synthesis Apparatus 211

Figure 14:
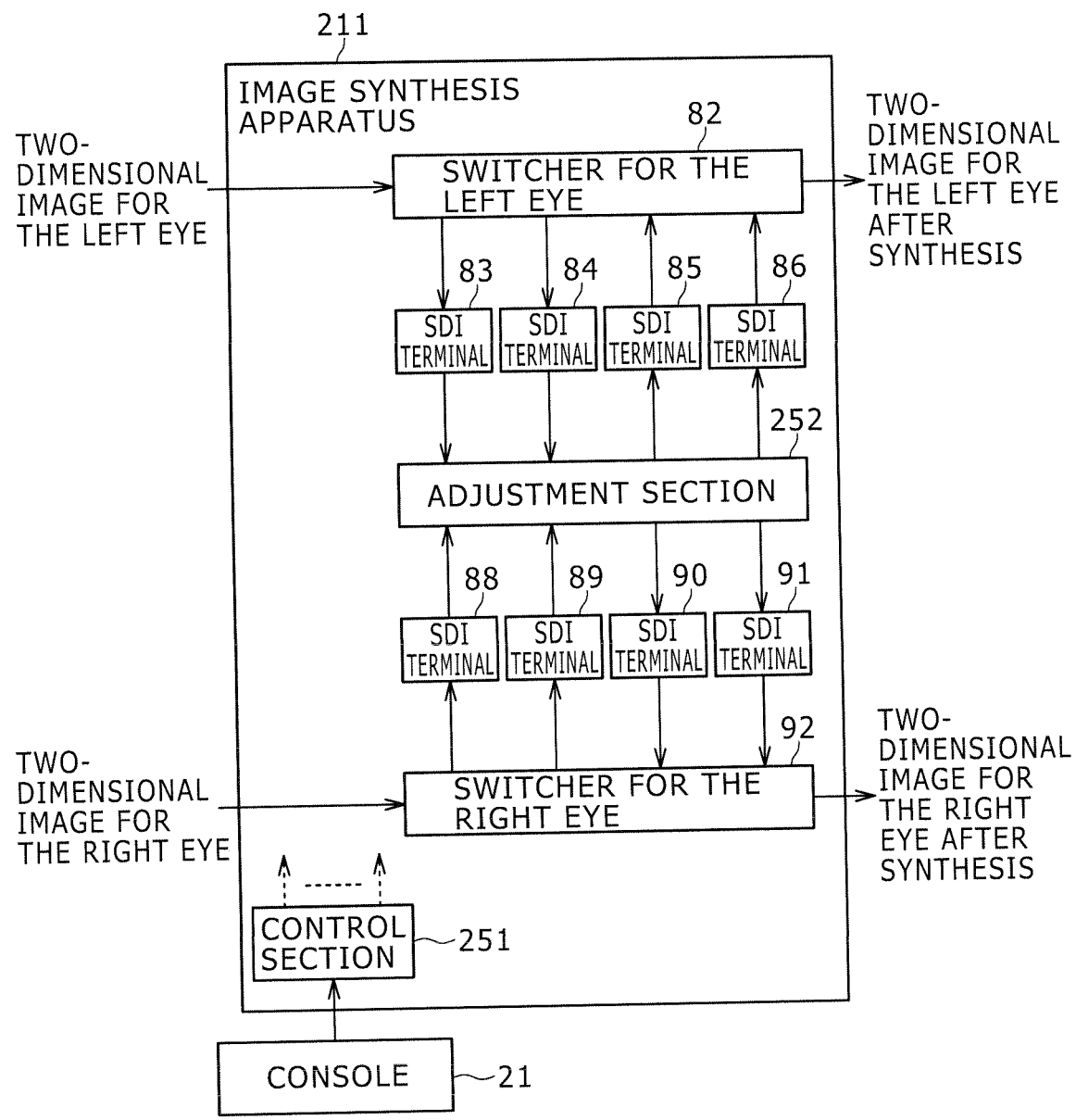
FIG. 14 is a block diagram showing an example of a detailed configuration of the image synthesis apparatus of FIG. 12.

FIG. 14 shows an example of a configuration of the image synthesis apparatus 211.

It is to be noted that the image synthesis apparatus 211 includes several common components to those of the image synthesis apparatus 22 shown in FIG. 5 in the first embodiment described hereinabove, and overlapping description of such common components is omitted herein to avoid redundancy.

In particular, referring to FIG. 14, the image synthesis apparatus 211 is configured similarly to the image synthesis apparatus 22 shown in FIG. 5 except that it includes a control section 251 and an adjustment section 252 in place of the control section 81 and the priority order determination section 87.

The control section 251 controls the switcher 82 for the left eye, adjustment section 252 and switcher 92 for the right eye in response to an operation signal from the console 21.

Further, the control section 251 supplies a control signal representative of a priority signal designated by a user to the adjustment section 252 in response to an operation signal from the console 21.

The adjustment section 252 acquires a combination of a two-dimensional image for the left eye corresponding to the three-dimensional image 231 from the SDI terminal 83 and a two-dimensional image for the right eye corresponding to the three-dimensional image 231 from the SDI terminal 88 as a three-dimensional image 231.

Further, the adjustment section 252 acquires a combination of a two-dimensional image for the left eye corresponding to the three-dimensional image 232 from the SDI terminal 84 and a two-dimensional image for the right eye corresponding to the three-dimensional image 232 from the SDI terminal 89 as a three-dimensional image 232.

Then, the adjustment section 252 measures the parallax amount of the three-dimensional image 231 based on the acquired three-dimensional image 231 and measures the parallax amount of the three-dimensional image 232 based on the acquired three-dimensional image 232 similarly the priority order determination section 87.

The adjustment section 252 adjusts the parallax amounts of the three-dimensional images 231 and 232 so that the measured parallax amounts of the three-dimensional images 231 and 232 may become those corresponding to the priority order designated by the designation operation of the user.

The adjustment section 252 supplies the two-dimensional image for the left eye corresponding to the three-dimensional image 231 after the adjustment and the priority order designated by the designation operation of the user to the SDI terminal 85. Further, the adjustment section 252 supplies the two-dimensional image for the left eye corresponding to the three-dimensional image 232 after the adjustment to the SDI terminal 86.

Further, the adjustment section 252 supplies the two-dimensional image for the right eye corresponding to the three-dimensional image 231 after the adjustment and the priority order designated by the designation operation of the user to the SDI terminal 90. Further, the adjustment section 252 supplies the two-dimensional image for the right eye corresponding to the three-dimensional image 232 after the adjustment to the SDI terminal 91.

Example of the Configuration of the Adjustment Section 252

Figure 15:
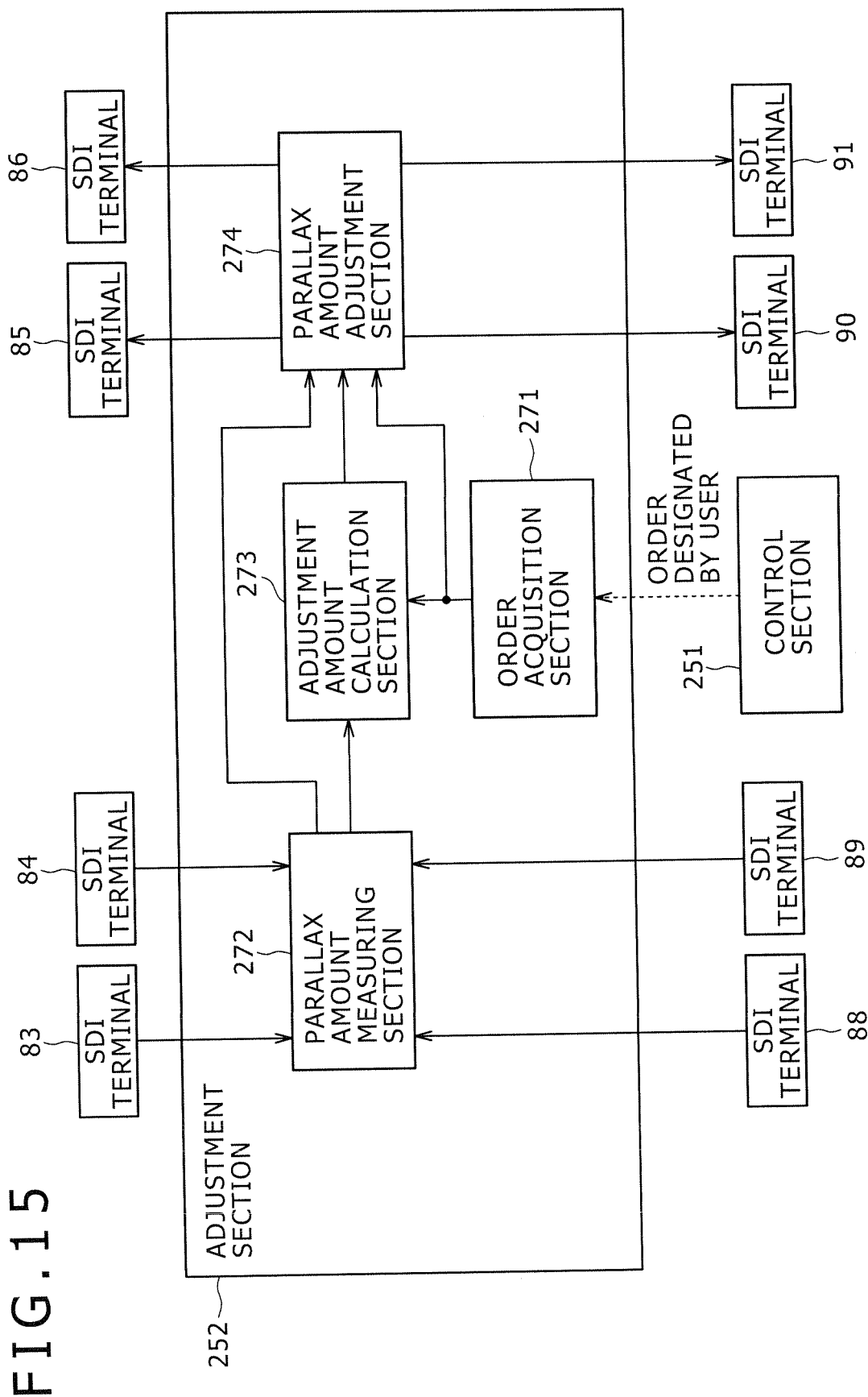
FIG. 15 is a block diagram showing an example of a configuration of an adjustment section shown in FIG. 14.

FIG. 15 shows an example of a configuration of the adjustment section 252.

Referring to FIG. 15, the adjustment section 252 shown includes an order acquisition section 271, a parallax amount measuring section 272, an adjustment amount calculation section 273 and a parallax amount adjustment section 274.

To the order acquisition section 271, a control signal representative of a priority order designated by a designation operation of a user is supplied as a control signal from the control section 251. The order acquisition section 271 acquires the priority order designated by the user based on the control signal from the control section 251 and supplies the priority order to the adjustment amount calculation section 273 and the parallax amount adjustment section 274.

The parallax amount measuring section 272 acquires a combination of a two-dimensional image for the left eye from the SDI terminal 83 and a two-dimensional image for the right eye from the SDI terminal 88 as a three-dimensional image 231. Further, the parallax amount measuring section 272 acquires a combination of a two-dimensional image for the left eye from the SDI terminal 84 and a two-dimensional image for the right eye from the SDI terminal 89 as a three-dimensional image 232.

Then, the parallax amount measuring section 272 measures a parallax amount of the three-dimensional images 231 and 232 based on the acquired three-dimensional images 231 and 232 similarly to the parallax amount measuring section 171 and supplies the measured parallax amounts to the adjustment amount calculation section 273.

Further, the parallax amount measuring section 272 supplies the acquired three-dimensional images 231 and 232 to the parallax amount adjustment section 274.

The adjustment amount calculation section 273 calculates, based on the parallax amounts of the three-dimensional images 231 and 232 from the parallax amount measuring section 272, a priority order corresponding to the parallax amounts.

Then, the adjustment amount calculation section 273 decides whether or not the calculated priority order corresponding to the parallax amounts coincides with the priority order from the order acquisition section 271.

If the adjustment amount calculation section 273 decides that the priority order corresponding to the parallax amounts does not coincide with the priority order from the order acquisition section 271, then the adjustment amount calculation section 273 calculates an adjustment amount for adjusting the parallax amounts of the three-dimensional images 231 and 232 to those which correspond to the priority order from the order acquisition section 271.

In particular, for example, the adjustment amount calculation section 273 calculates, based on the priority order from the order acquisition section 271 and the parallax amounts of the three-dimensional images 231 and 232 from the parallax amount measuring section 272, respective adjustment amounts for the three-dimensional images 231 and 232. Then, the adjustment amount calculation section 273 supplies the calculated adjustment amounts to the parallax amount adjustment section 274.

On the other hand, if the adjustment amount calculation section 273 decides that the priority order corresponding to the parallax amounts coincides with the priority order from the order acquisition section 271, then the adjustment amount calculation section 273 notifies the parallax amount adjustment section 274 of the decision.

The parallax amount adjustment section 274 adjusts, if the adjustment amounts are supplied thereto from the adjustment amount calculation section 273, the parallax amounts of the three-dimensional images 231 and 232 from the parallax amount measuring section 272 based on the adjustment amounts supplied thereto.

In particular, for example, the parallax amount adjustment section 274 adjusts the parallax amount of the three-dimensional image 231 from the parallax amount measuring section 272 based on the adjustment amount for the three-dimensional image 231 from the adjustment amount calculation section 273. Further, for example, the parallax amount adjustment section 274 adjusts the parallax amount of the three-dimensional image 232 from the parallax amount measuring section 272 based on the adjustment amount for the three-dimensional image 232 from the adjustment amount calculation section 273.

The parallax amount adjustment section 274 supplies the two-dimensional image for the left eye corresponding to the three-dimensional image 231 after the adjustment of the parallax amount and the priority order from the order acquisition section 271 to the SDI terminal 85. Further, the parallax amount adjustment section 274 supplies the two-dimensional image for the left eye corresponding to the three-dimensional image 232 after the adjustment of the parallax amount to the SDI terminal 86.

Further, the parallax amount adjustment section 274 supplies the two-dimensional image for the right eye corresponding to the three-dimensional image 231 after the adjustment of the parallax amount and the priority order from the order acquisition section 271 to the SDI terminal 90. Further, the parallax amount adjustment section 274 supplies the two-dimensional image for the right eye corresponding to the three-dimensional image 232 after the adjustment of the parallax amount to the SDI terminal 91.

It is to be noted that, if a notification that the priority order corresponding to the relevant parallax amount coincides with the priority order from the order acquisition section 271 is supplied from the adjustment amount calculation section 273 to the parallax amount adjustment section 274, then the parallax amount adjustment section 274 does not carry out adjustment of the parallax amounts of the three-dimensional images 231 and 232 from the parallax amount measuring section 272. Thus, the parallax amount adjustment section 274 supplies the two-dimensional images for the left eye as they are to the SDI terminals 85 and 86 and supplies the two-dimensional images for the right eye as they are to the SDI terminals 90 and 91. Further, the parallax amount adjustment section 274 supplies the priority order from the order acquisition section 271 to the SDI terminals 85 and 90.

Operation of the Image Synthesis Apparatus 211

Now, a first parallax amount adjustment process carried out by the image synthesis apparatus 211 is described with reference to a flow chart of FIG. 16.

This first parallax amount adjustment process is started, for example, when the user uses the console 21 to carry out a selection operation of selecting three-dimensional images 231 and 232 to be synthesized from among a plurality of three-dimensional images supplied to the image synthesis apparatus 211. This similarly applies also to second and third parallax amount adjustment processes hereinafter described.

At this time, an operation signal corresponding to the selection operation of the user is supplied from the console 21 to the control section 251. Then, the control section 251 controls the switcher 82 for the left eye and the switcher 92 for the right eye in response to the operation signal from the console 21. Then, processing similar to that at step S1 of FIG. 8 is carried out at step S31.

Further, when the user uses the console 21 to carry out a designation operation of designating a turn in a priority order of the three-dimensional images 231 and 232, the console 21 generates an operation signal corresponding to the designation operation of the user and supplies the operation signal to the control section 251. Thereafter, the processing is advanced to step S32.

At step S32, the control section 251 supplies a control signal representative of the priority order designated by the designation operation of the user in response to the operation signal from the console 21 to the order acquisition section 271.

The order acquisition section 271 acquires the priority order designated by the user based on the control signal from the control section 251 and supplies the acquired priority order to the adjustment amount calculation section 273 and the parallax amount adjustment section 274.

At step S33, the parallax amount measuring section 272 acquires a combination of a two-dimensional image for the left eye from the SDI terminal 83 and a two-dimensional image for the right eye from the SDI terminal 88 as a three-dimensional image 231. Further, the parallax amount measuring section 272 acquires a combination of a two-dimensional image for the left eye from the SDI terminal 84 and a two-dimensional image for the right eye from the SDI terminal 89 as a three-dimensional image 232.

Then, the parallax amount measuring section 272 measures the parallax amount of the three-dimensional images 231 and 232 based on the acquired three-dimensional images 231 and 232 similarly to the parallax amount measuring section 171 and supplies the measured parallax amounts to the adjustment amount calculation section 273.

Further, the parallax amount measuring section 272 supplies the acquired three-dimensional images 231 and 232 to the parallax amount adjustment section 274.

At step S34, the adjustment amount calculation section 273 calculates, based on the parallax amounts of the three-dimensional images 231 and 232 from the parallax amount measuring section 272, the turn in a priority order corresponding to the parallax amounts.

In particular, for example, the adjustment amount calculation section 273 compares an average value of the depth z corresponding to the parallax amount of the three-dimensional image 231 and an average value of the depth z corresponding to the parallax amount of the three-dimensional image 232, and calculate an ascending order of the average value of the depth z as a priority order corresponding to the parallax amounts. It is to be noted that the adjustment amount calculation section 273 may calculate a priority order corresponding to the parallax amounts based not on an average value of the depth z but on a median of the depth z.

At step S35, the adjustment amount calculation section 273 decides whether or not the calculated priority order corresponding to the parallax amounts coincides with the priority order from the order acquisition section 271. If it is decided that the priority order corresponding to the parallax amounts does not coincide with the priority order from the order acquisition section 271, then the processing is advanced to step S36.

At step S36, the adjustment amount calculation section 273 calculates, based on the parallax amounts of the three-dimensional images 231 and 232 from the parallax amount measuring section 272 and the priority order from the order acquisition section 271, adjustment amounts for the three-dimensional images 231 and 232 and supplies the calculated adjustment amounts to the parallax amount adjustment section 274.

At step S37, the parallax amount adjustment section 274 adjusts the parallax amount of the three-dimensional image 231 from the parallax amount measuring section 272 based on the adjustment amount for the three-dimensional image 231 from the adjustment amount calculation section 273. Further, the parallax amount adjustment section 274 adjusts the parallax amount of the three-dimensional image 232 from the parallax amount measuring section 272 based on the adjustment amount for the three-dimensional image 232 from the adjustment amount calculation section 273.

Then, the parallax amount adjustment section 274 supplies the two-dimensional image for the left eye corresponding to the three-dimensional image 231 after the adjustment of the parallax amount and the priority order from the order acquisition section 271 to the SDI terminal 85. Further, the parallax amount adjustment section 274 supplies the two-dimensional image for the left eye corresponding to the three-dimensional image 232 after the adjustment of the parallax amount to the SDI terminal 86.

Further, the parallax amount adjustment section 274 supplies the two-dimensional image for the right eye corresponding to the three-dimensional image 231 after the adjustment of the parallax amount and the priority order from the order acquisition section 271 to the SDI terminal 90. Further, the parallax amount adjustment section 274 supplies the two-dimensional image for the right eye corresponding to the three-dimensional image 232 after the adjustment of the parallax amount to the SDI terminal 91. Thereafter, the processing is advanced to step S38.

It is to be noted that, if it is decided at step S35 that the priority order corresponding to the parallax amounts coincides with the priority order from the order acquisition section 271, then a notification of this is supplied to the parallax amount adjustment section 274.

The parallax amount adjustment section 274 thus receives the notification from the adjustment amount calculation section 273 that the priority order corresponding to the parallax amounts coincides with the priority order from the order acquisition section 271. Then in response to the notification, the parallax amount adjustment section 274 supplies the two-dimensional images for the left eye of the three-dimensional images 231 and 232 from the parallax amount measuring section 272 to the SDI terminals 85 and 86 and supplies the two-dimensional images for the right eye of the three-dimensional images 231 and 232 to the SDI terminals 90 and 91, respectively.

Further, the parallax amount adjustment section 274 supplies the priority order from the order acquisition section 271 to the SDI terminals 85 and 90 and then advances the processing to step S38.

At step S38, the SDI terminal 85 supplies the two-dimensional image for the left eye and the priority order from the parallax amount adjustment section 274 to the switcher 82 for the left eye, and the SDI terminal 86 supplies the two-dimensional image for the left eye from the parallax amount adjustment section 274 to the switcher 82 for the left eye.

The SDI terminal 90 supplies the two-dimensional image for the right eye and the priority order from the parallax amount adjustment section 274 to the switcher 92 for the right eye and supplies the two-dimensional image for the right eye from the parallax amount adjustment section 274 to the switcher 92 for the right eye.

Figure 8:
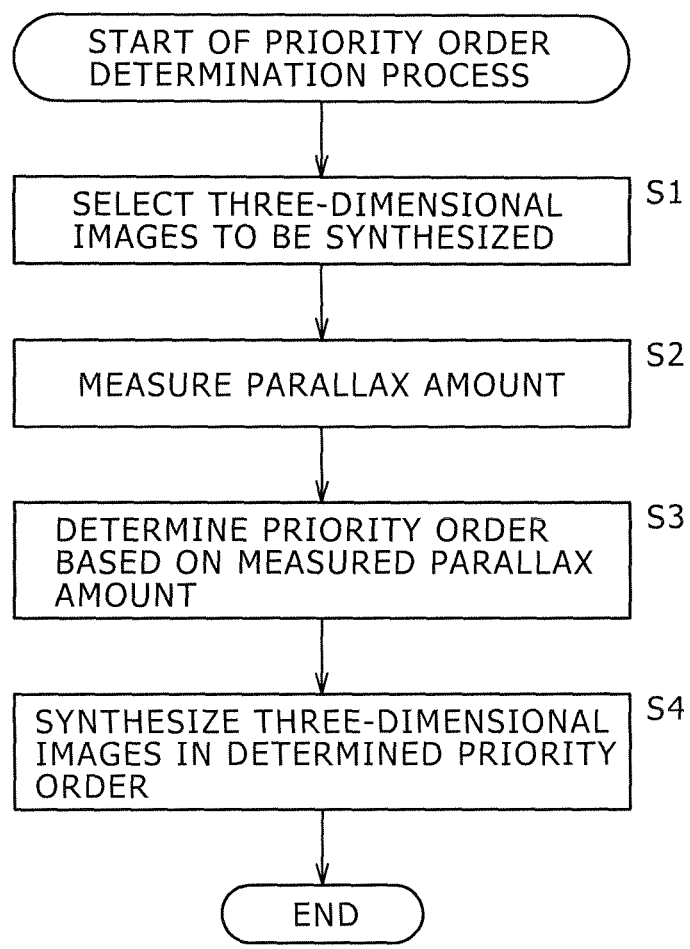
FIG. 8 is a flow chart illustrating a priority order determination process executed by the priority order determination section of FIG. 7.

Then at step S38, processing similar to that at step S4 of FIG. 8 is carried out, thereby ending the first parallax amount adjustment process.

As described above, according to the first parallax amount adjustment process, if the parallax amounts of the three-dimensional images 231 and 232 are different from the parallax amounts corresponding to the priority order designated by a designation operation of the user, then the image synthesis apparatus 211 adjusts the parallax amounts of the three-dimensional images 231 and 232 so as to correspond to the priority order designated by the designation operation of the user. Then, the image synthesis apparatus 211 synthesizes the three-dimensional images 231 and 232 after the adjustment.

Therefore, in the first parallax amount adjustment process, such a situation that the three-dimensional images 231 and 232 are synthesized in a priority order which does not correspond to the parallax amounts of the three-dimensional images 231 and 232 to be synthesized is prevented. Thus, it is possible to synthesize the three-dimensional images 231 and 232 in a priority order desired by the user.

Now, a second parallax amount adjustment process carried out by the image synthesis apparatus 211 is described with reference to a flow chart of FIG. 17.

Figure 16:
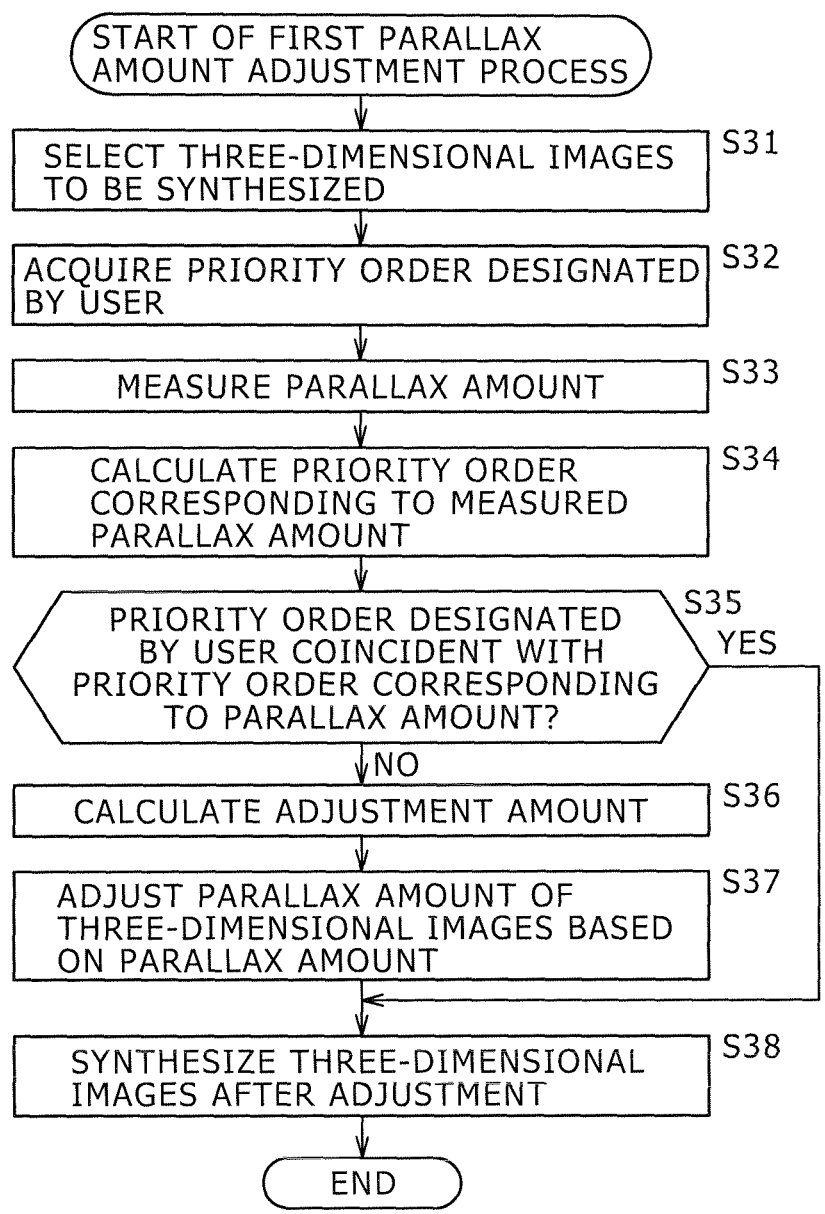
FIG. 16 is a flow chart illustrating a first parallax amount adjustment process executed by the adjustment section of FIG. 15.

At steps S51 to S54, processing similar to that at steps S31 to S34 of FIG. 16 is carried out, respectively.

At step S55, the adjustment amount calculation section 273 decides whether or not the priority order corresponding to the parallax amounts coincides with the priority order from the order acquisition section 271 similarly as at step S35. Then, if the adjustment amount calculation section 273 decides that the priority order corresponding to the parallax amounts does not coincide with the priority order from the order acquisition section 271, then the processing is advanced to step S56.

At step S56, the adjustment amount calculation section 273 calculates the adjustment amounts in a similar manner as in the case at step S36 of FIG. 16 and supplies the calculated adjustment amounts to the parallax amount adjustment section 274. The parallax amount adjustment section 274 supplies the adjustment amounts from the adjustment amount calculation section 273 to the built-in memory so as to be stored into the built-in memory.

It is to be noted that, in the case where the image synthesis apparatus 211 carries out the second parallax mount adjustment process, the parallax amount adjustment section 274 has a memory not shown built therein.

At step S57, the parallax amount adjustment section 274 decides whether or not a synthesis instruction signal for the instruction to start synthesis of the three-dimensional images 231 and 232 is received from the control section 251 and carries out the process at step S57 repetitively until it is decided at step S57 that a synthesis instruction signal is received.

It is to be noted that, if the user uses the console 21 to carry out an operation for the instruction to start synthesis of the three-dimensional images 231 and 232, then the control section 251 supplies a synthesis instruction signal to the parallax amount adjustment section 274 in response to the operation signal from the console 21.

If it is decided at step S57 that the parallax amount adjustment section 274 receives a synthesis instruction signal from the control section 251, then the processing is advanced to step S58.

At step S58, the parallax amount adjustment section 274 adjusts, based on the adjustment amount for the three-dimensional image 231 stored in the built-in memory, the parallax amount of the three-dimensional image 231 from the parallax amount measuring section 272. Further, the parallax amount adjustment section 274 adjusts, based on the adjustment amount for the three-dimensional image 232 stored in the built-in memory, the parallax amount of the three-dimensional image 232 from the parallax amount measuring section 272. It is to be noted that fresh parallax amounts may normally be received without carrying out storage into the built-in memory.

Then, the parallax amount adjustment section 274 supplies the two-dimensional image for the left eye corresponding to the three-dimensional image 231 after the adjustment of the parallax amount and the priority order from the order acquisition section 271 to the SDI terminal 85. Further, the parallax amount adjustment section 274 supplies the two-dimensional image for the left eye corresponding to the three-dimensional image 232 after the adjustment to the SDI terminal 86.

Further, the parallax amount adjustment section 274 supplies the two-dimensional image for the right eye corresponding to the three-dimensional image 231 after the adjustment of the parallax amount and the priority order from the order acquisition section 271 to the SDI terminal 90. Further, the parallax amount adjustment section 274 supplies the two-dimensional image for the right eye corresponding to the three-dimensional image 232 after the adjustment to the SDI terminal 91.

Then at step S59, processing similar to that at step S38 of FIG. 16 is carried out.

It is to be noted that, if it is decided at step S55 that the priority order corresponding to the parallax amounts coincides with the priority order from the order acquisition section 271, then the adjustment amount calculation section 273 notifies the parallax amount adjustment section 274 of the decision. Thereafter, the processing is advanced to step S60.

At step S60, the parallax amount adjustment section 274 decides whether or not a synthesis instruction signal is received from the control section 251 and carries out the process at step S60 repetitively until it is decided at step S60 that a synthesis instruction signal is received.

If it is decided at step S60 that a synthesis instruction signal is received from the control section 251, then the parallax amount adjustment section 274 supplies the two-dimensional images for the left eye of the three-dimensional images 231 and 232 from the parallax amount measuring section 272 to the SDI terminals 85 and 86 and supplies the two-dimensional images for the right eye of the three-dimensional images 231 and 232 to the SDI terminals 90 and 91, respectively.

Further, the parallax amount adjustment section 274 supplies the priority order from the order acquisition section 271 to the SDI terminals 85 and 90 and then advances the processing to step S59, at which processing similar to that at step S38 of FIG. 16 is carried out. The second parallax amount adjustment process is ended therewith.

As described above, according to the second parallax amount adjustment process, since the image synthesis apparatus 211 synthesizes the three-dimensional images 231 and 232 at a timing indicated by a user, the three-dimensional images 231 and 232 can be synthesized at the timing desired by the user. Further, at a point of time at which synthesis should not be carried out, adjustment of the parallax is not carried out, but images are provided as they are. On the other hand, upon synthesis, the images of parallaxes suitable for synthesis can be provided.

Figure 18:
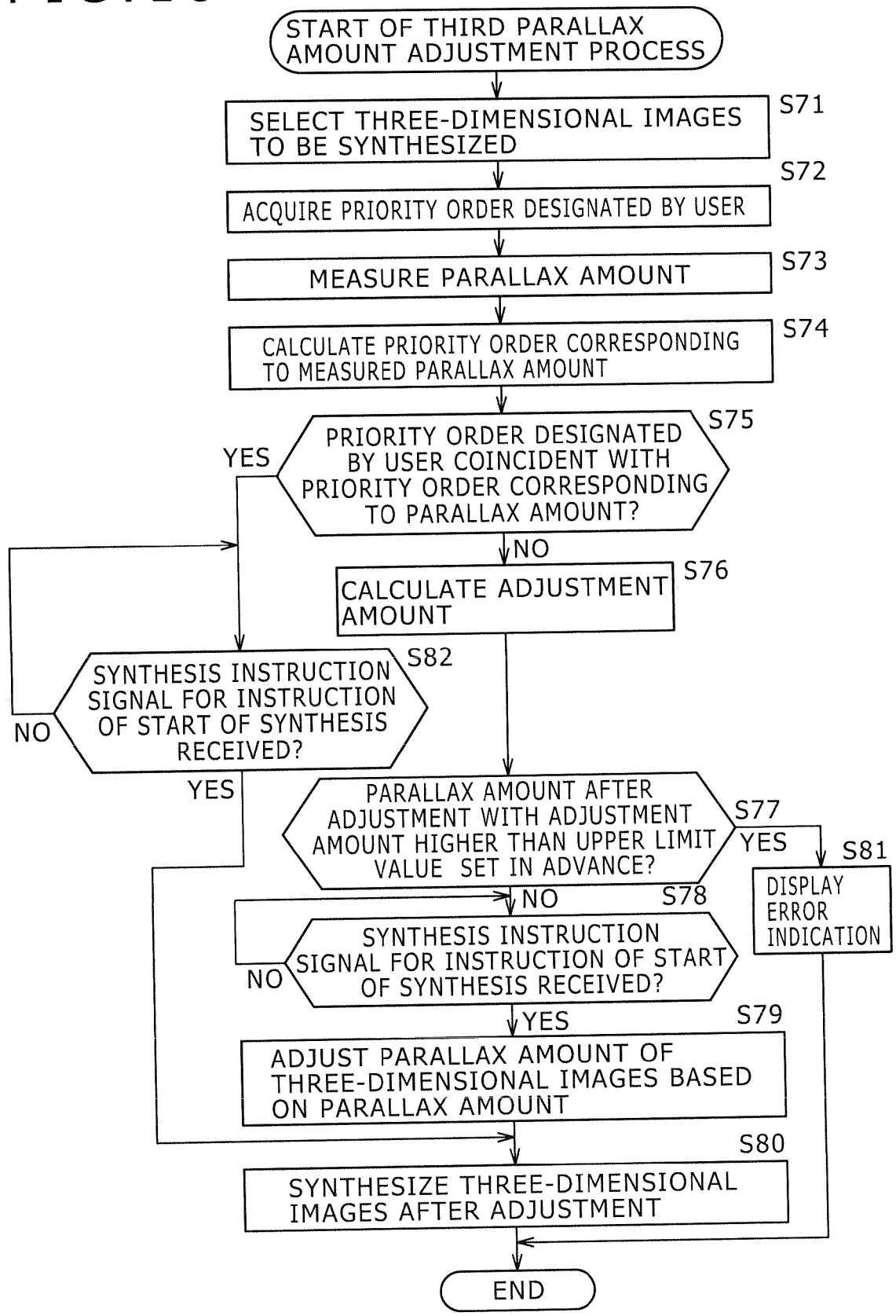
FIG. 18 is a flow chart illustrating a third parallax amount adjustment process executed by the adjustment section of FIG. 15.

Now, a third parallax amount adjustment process carried out by the image synthesis apparatus 211 is described with reference to a flow chart of FIG. 18.

Figure 17:
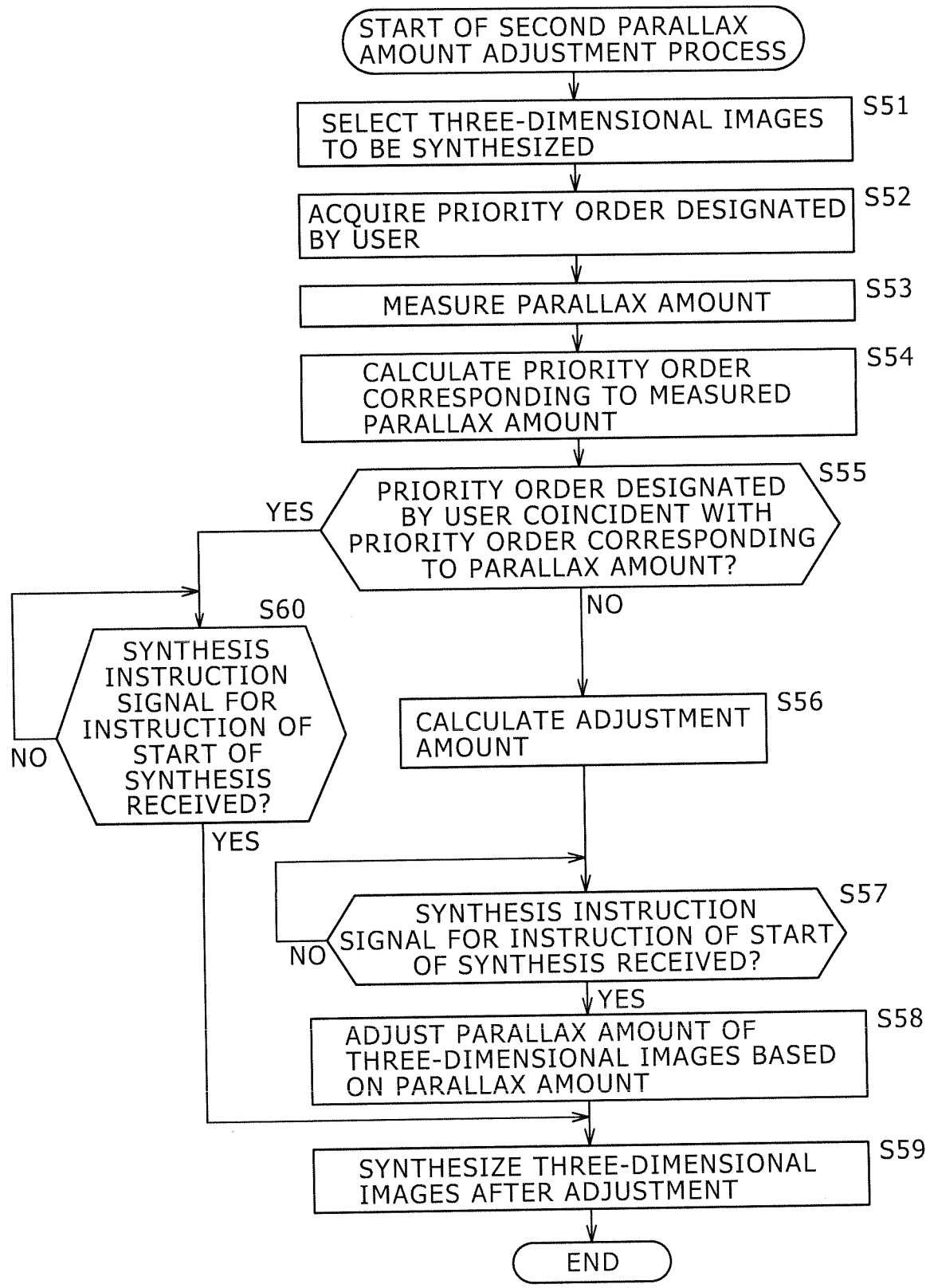
FIG. 17 is a flow chart illustrating a second parallax amount adjustment process executed by the adjustment section of FIG. 15.

At steps S71 to S76, processing similar to that at steps S51 to S56 of FIG. 17 is carried out, respectively. Further, if the processing advances to step S82 from step S75, then processing similar to that at step S60 of FIG. 17 is carried out at step S82.

At step S77, the parallax amount adjustment section 274 decides, based on the adjustment amounts from the adjustment amount calculation section 273 stored in the built-in memory, whether or not, in the case where the parallax amounts are adjusted with the adjustment amounts, at least one of the parallax amounts of the three-dimensional images 231 and 232 after the adjustment exceeds an upper limit value determined in advance. If it is decided that any one of the parallax amounts after the adjustment with the adjustment amounts does not exceed its upper limit value, then the processing is advanced to step S78. It is to be noted that fresh parallax amounts may normally be received without carrying out storage into the built-in memory.

At steps S78 to S80, processing similar to that at steps S57 to S59 of FIG. 17 is carried out, respectively.

On the other hand, if it is decided at step S77 by the parallax amount adjustment section 274 that one of the parallax amounts after the adjustment with the adjustment amounts from the adjustment amount calculation section 273 comes to exceed its upper limit value, then the processing is advanced to step S81.

At step S81, the parallax amount adjustment section 274 outputs an error notification representing that it is impossible to carry out synthesis with the priority order designated by the designation operation of the user to the monitor or the like not shown. The third parallax amount adjustment process is ended therewith.

As described above, according to the third parallax amount adjustment process, if it is decided at step S77 by the parallax amount adjustment section 274 that a parallax amount adjusted based on an adjustment amount from the adjustment amount calculation section 273 exceeds its upper limit value, then the processing is advanced to step S81, at which an error notification representing that it is not possible to carry out synthesis in the priority order designated by the designation operation of the user is outputted to the monitor or the like not shown. Consequently, such a situation that a parallax amount is adjusted exceeding an upper limit therefor determined in advance can be prevented.

In this instance, such a situation that the three-dimensional image after the adjustment becomes uncomfortable to an appreciating person as a result of adjustment of the parallax amount by an excessive amount can be prevented.

In the second embodiment, the parallax amounts of the three-dimensional images 231 and 232 are adjusted directly to parallax amounts corresponding to a priority order designated by a designation operation of a user. However, it is possible to adopt a modified configuration that the parallax amounts are adjusted gradually to the parallax amounts corresponding to the priority order, for example, in response to an operation amount by which the fader changing lever 199 of the console 21 is operated.

Now, a third embodiment wherein a parallax amount is adjusted in response to an operation amount of the fader changing lever 199 is described.

3. Third Embodiment

Outline of Processing in the Third Embodiment

FIGS. 19A, 19B and 20A to 20C illustrate an outline of processing in the third embodiment.

Figure 19A:
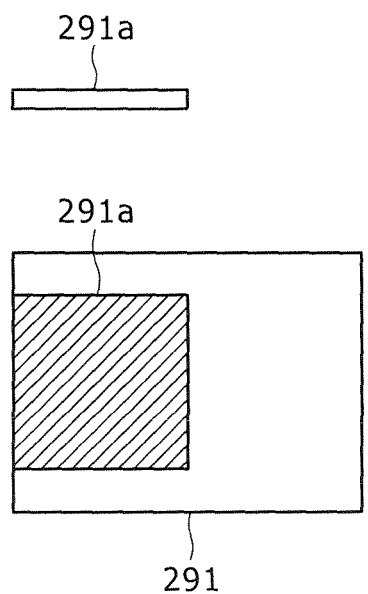
FIGS. 19A and 19B and 20A to 20C are schematic views illustrating an outline of processing executed in a third embodiment of the present invention.
Figure 19B:
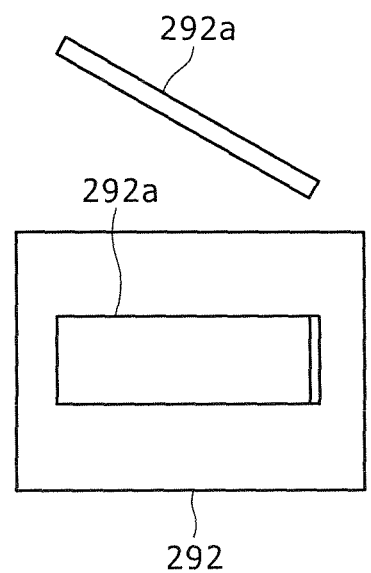

FIGS. 19A and 19B show an example of three-dimensional images selected by a selection operation of a user from among a plurality of three-dimensional images.

On the lower side in FIG. 19A, a three-dimensional image 291 from between two three-dimensional images selected by a user are shown. The three-dimensional image 291 displays a physical solid 291a. On the upper side in FIG. 19A, a view of the physical solid 291a as viewed from above is shown.

On the lower side in FIG. 19B, the other three-dimensional image 292 from between the two three-dimensional images selected by the user is shown. This three-dimensional image 292 displays a physical solid 292a. On the upper side in FIG. 19B, a view of the physical solid 292a as viewed from above is shown.

The user can adjust the depth z of the physical solid 291a and the depth z of the physical solid 292a by changing a fader value using the fader changing lever 199 of the console 21.

The fader value is a value representative of a progressing situation or advancing rate of adjustment of a parallax amount. If the fader value is 0%, then this represents that adjustment of the parallax amount is not carried out at all, but if the fader value is 100%, this represents that the parallax amount is adjusted fully to a parallax amount corresponding to the priority order.

Figure 20A:
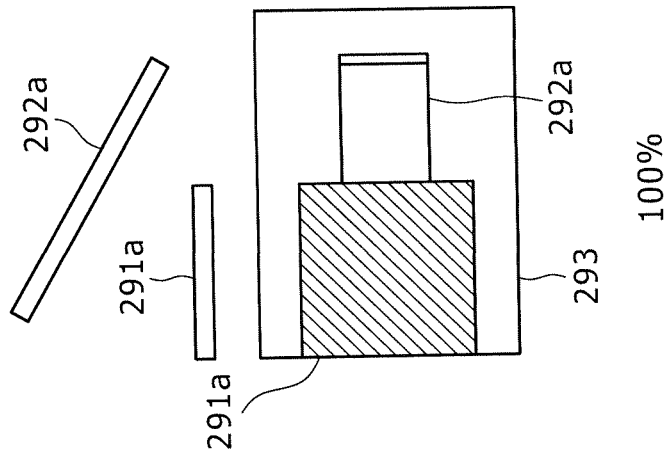
Figure 20B:
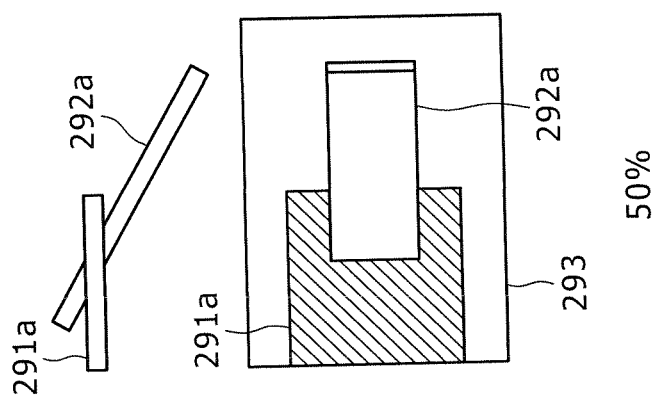
Figure 20C:
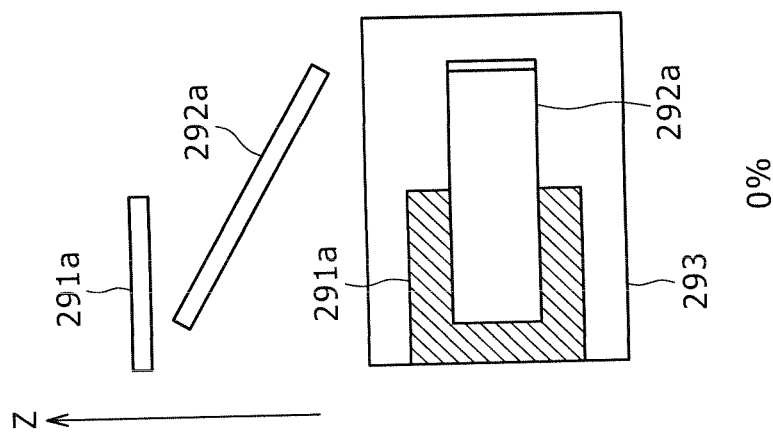

FIGS. 20A to 20C illustrate an example of a manner in which the depth z of the physical solid 291a and the physical solid 292a is adjusted in response to change of the fader value.

FIGS. 20A, 20B and 20C show three-dimensional images 293 obtained by synthesis of the three-dimensional images 291 and 292 in the case where the fader value is 0%, 50% and 100%, respectively.

In the case where the user operates the fader changing lever 199 of the console 21 to set the fader value to 0%, when the depth z of the physical solid 291a is greater than the depth z of the physical solid 292a, the depth z of the physical solid 291a and the depth z of the physical solid 292a are not changed and a three-dimensional image 293 in which the physical solid 292a exists on the near side is generated as seen in FIG. 20A. On the other hand, if the depth z of the physical solid 292a is not greater than the depth z of the physical solid 292a, then the parallaxes are adjusted to establish such a state of the depths z as seen in FIG. 20A.

Then, if the user operates the fader changing lever 199 of the console 21 to set the fader value to 50%, then if the parallaxes are adjusted in such a manner as seen in FIG. 20B, then a three-dimensional image 293 in which part of the physical solid 292a is hidden by the physical solid 291a is generated.

Further, if the user operates the fader changing lever 199 of the console 21 to set the fader value to 100%, then if the parallaxes are adjusted in such a manner as seen in FIG. 20C, then a three-dimensional image 293 in which the physical solid 291a exists on the near side is generated.

Example of the Configuration of the Image Synthesis Apparatus 301

Figure 21:
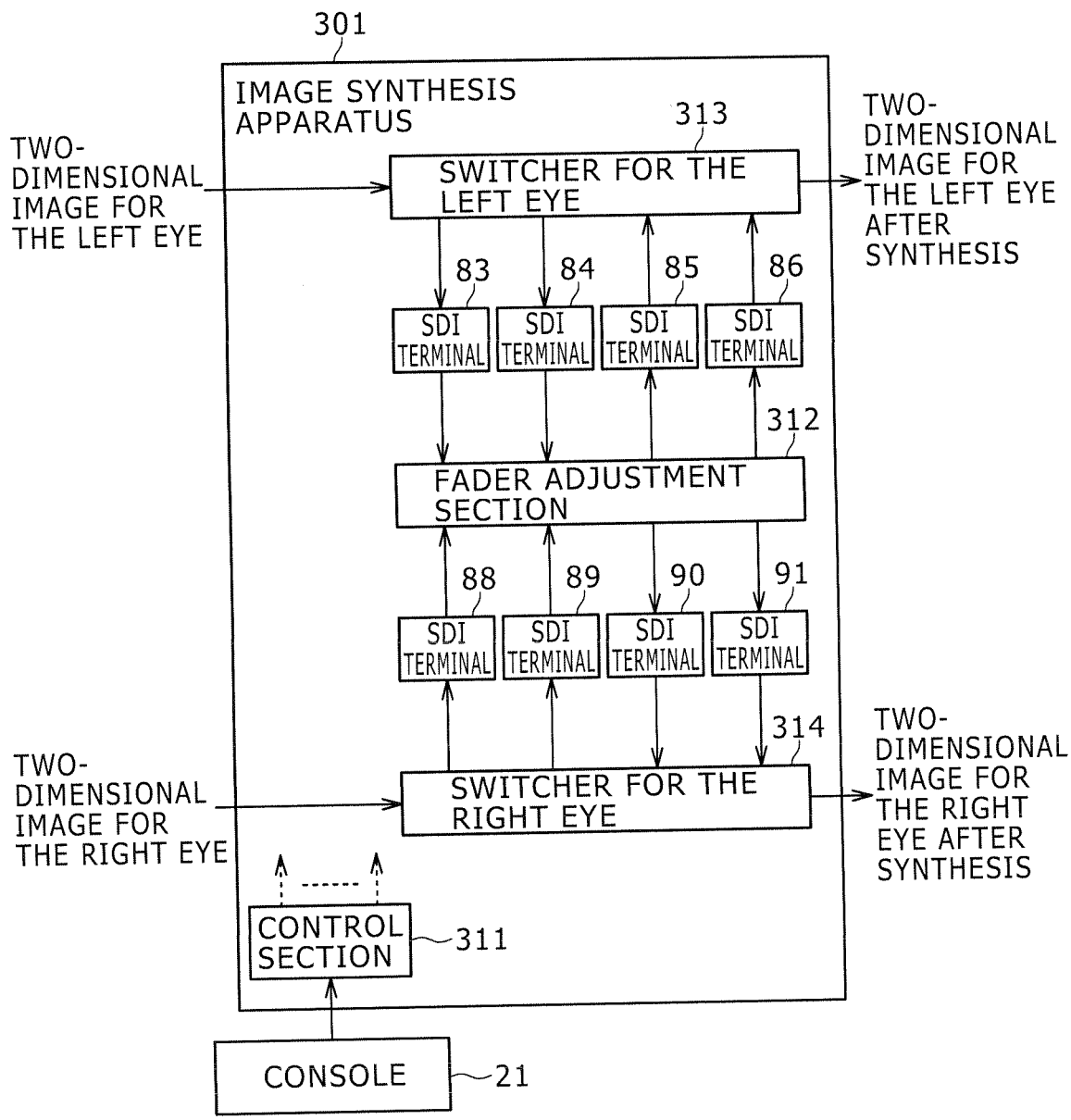
FIG. 21 is a block diagram showing an example of a configuration of an image synthesis apparatus according to the third embodiment of the present invention.

FIG. 21 shows an example of a configuration of an image synthesis apparatus 301 according to a third embodiment of the present invention.

It is to be noted that the image synthesis apparatus 301 is configured partly similarly to the image synthesis apparatus 211 in the second embodiment shown in FIG. 14, and therefore, overlapping description of the same is omitted herein to avoid redundancy.

In particular, referring to FIG. 21, the image synthesis apparatus 301 is configured similarly to the image synthesis apparatus 211 except that a control section 311, a fader adjustment section 312, a switcher 313 for the left eye and a switcher 314 for the right eye in place of the control section 251, adjustment section 252, switcher 82 for the left eye and switcher 92 for the right eye, respectively.

The control section 311 controls the fader adjustment section 312, switcher 313 for the left eye and switcher 314 for the right eye, for example, in response to an operation signal from the console 21.

It is to be noted that, if the user uses the fader changing lever 199 of the console 21 to carry out a fader value changing operation for changing the fader value, then the console 21 generates an operation signal corresponding to the fader value changing operation of the user and supplies the generated operation signal to the control section 311.

In this instance, the control section 311 acquires the fader value changed by the fader value changing operation of the user in response to the operation signal from the console 21 and supplies the acquired fader value to the fader adjustment section 312.

Further, similarly to the control section 215, the control section 311 supplies a control signal representative of a priority order designated by the user to the fader adjustment section 312.

The fader adjustment section 312 acquires a combination of a two-dimensional image for the left eye from the SDI terminal 83 and a two-dimensional image for the right eye from the SDI terminal 88 as a three-dimensional image 291. Further, the fader adjustment section 312 acquires a combination of a two-dimensional image for the left eye from the SDI terminal 84 and a two-dimensional image for the right eye from the SDI terminal 89 as a three-dimensional image 292.

The fader adjustment section 312 acquires a priority order in accordance with a control signal from the control section 311 and adjusts the parallax amounts of the acquired three-dimensional images 291 and 292 based on the acquired priority order and the fader value from the control section 311.

The switcher 313 for the left eye selects two-dimensional images for the left eye corresponding to the two three-dimensional images 291 and 292 (FIGS. 19A and 19B) selected by the selection operation of the user from among a plurality of two-dimensional images for the left eye supplied thereto under the control of the control section 311.

Then, the switcher 313 for the left eye supplies the two-dimensional image for the left eye corresponding to the three-dimensional image 291 to the SDI terminal 83 and supplies the two-dimensional image for the left eye corresponding to the three-dimensional image 292 to the SDI terminal 84.

Further, the switcher 313 for the left eye synthesizes the two-dimensional image for the left eye from the SDI terminal 85 and the two-dimensional image for the left eye from the SDI terminal 86 in the priority order supplied thereto from the SDI terminal 85 and outputs the two-dimensional image for the left eye synthesized in accordance with the fader value.

The switcher 314 for the right eye selects two-dimensional images for the right eye corresponding to the two three-dimensional images 291 and 292 (FIGS. 19A and 19B) selected by the selection operation of the user from among a plurality of two-dimensional images for the right eye supplied thereto under the control of the control section 311.

Then, the switcher 314 for the right eye supplies the two-dimensional image for the right eye corresponding to the three-dimensional image 291 to the SDI terminal 88 and supplies the two-dimensional image for the right eye corresponding to the three-dimensional image 292 to the SDI terminal 89.

Further, the switcher 314 for the right eye synthesizes the two-dimensional image for the right eye from the SDI terminal 90 and the two-dimensional image for the right eye from the SDI terminal 91 in the priority order supplied thereto from the SDI terminal 90 and outputs the two-dimensional image for the right eye synthesized in accordance with the fader value.

Details of the Fader Adjustment Section 312

Figure 22:
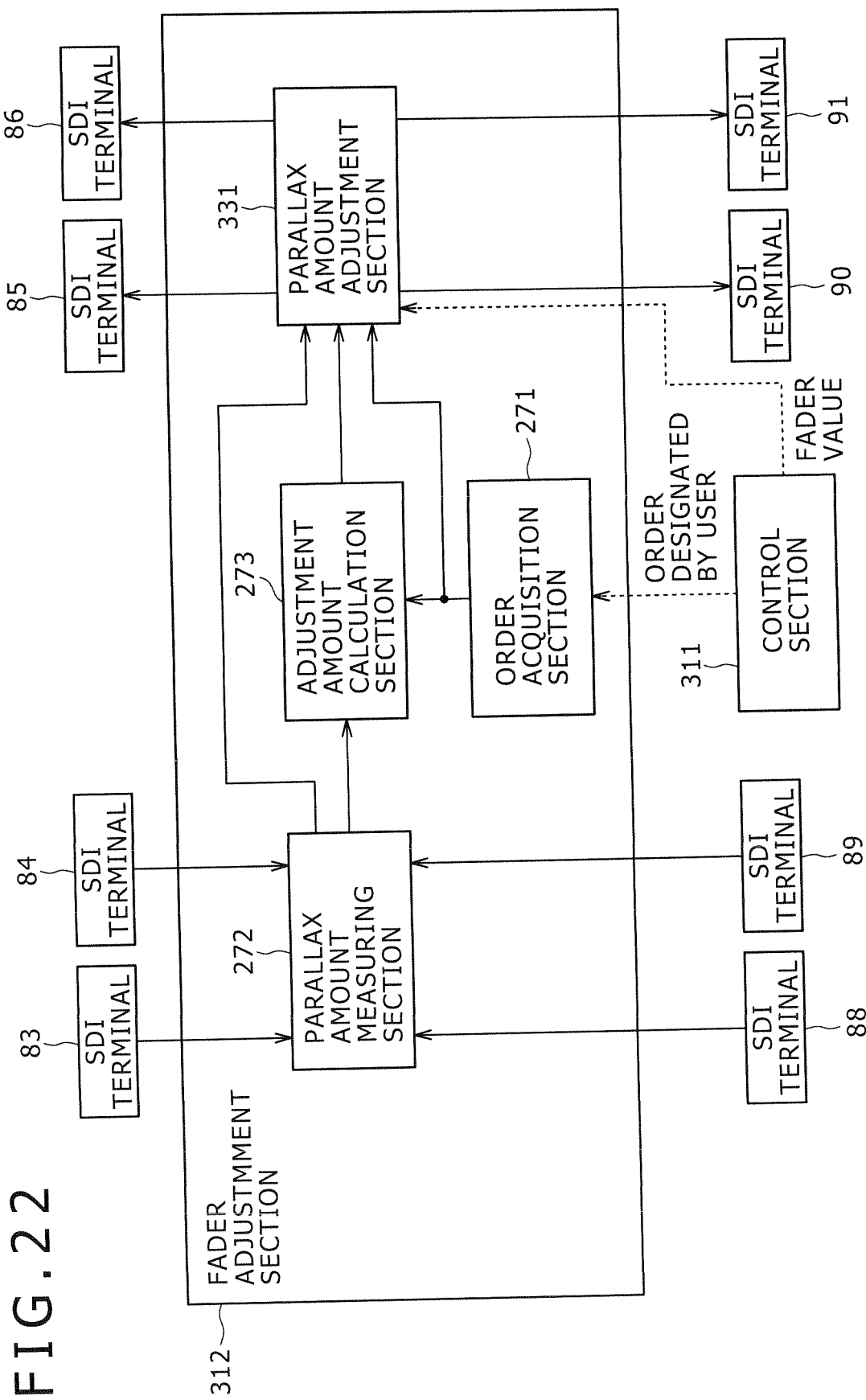
FIG. 22 is a block diagram showing an example of a configuration of a fader adjustment section shown in FIG. 21.

FIG. 22 shows an example of a configuration of the fader adjustment section 312.

It is to be noted that the fader adjustment section 312 includes several common components to those of the adjustment section 252 shown in FIG. 15, and overlapping description of such common components is omitted herein to avoid redundancy.

Referring to FIG. 22, the fader adjustment section 312 shown is configured similarly to the adjustment section 252 except that it includes a parallax amount adjustment section 331 in place of the parallax amount adjustment section 274.

One of adjustment amounts or the notification which a priority order from the order acquisition section 271, three-dimensional images 291 and 292 from the parallax amount measuring section 272, and a priority order corresponding to parallax amounts from the adjustment amount calculation section 273 coincide with a priority order from the order acquisition section 271 is supplied to the parallax amount adjustment section 331. Further, a fader value is supplied from the control section 311 to the parallax amount adjustment section 331.

The parallax amount adjustment section 331 adjusts, in the case where an adjustment amount is supplied thereto from the adjustment amount calculation section 273, the parallax amounts of the three-dimensional images 291 and 292 from the parallax amount measuring section 272 based on the adjustment amount from the adjustment amount calculation section 273 and the fader value from the control section 311 so that the parallax amounts become parallax amounts corresponding to the fader value.

Then, the parallax amount adjustment section 331 supplies the two-dimensional image for the left eye corresponding to the three-dimensional image 291 after the adjustment and the priority order from the order acquisition section 271 to the SDI terminal 85 and supplies the two-dimensional image for the left eye corresponding to the three-dimensional image 292 after the adjustment to the SDI terminal 86.

Further, the parallax amount adjustment section 331 supplies the two-dimensional image for the right eye corresponding to the three-dimensional image 291 after the adjustment and the priority order from the order acquisition section 271 to the SDI terminal 90 and supplies the two-dimensional image for the right eye corresponding to the three-dimensional image 292 after the adjustment to the SDI terminal 91.

Further, the parallax amount adjustment section 331 supplies the parallax amounts of the three-dimensional images 291 and 292 after the adjustment to the SDI terminals 85 and 90, respectively.

Consequently, the SDI terminal 85 supplies the parallax amounts of the three-dimensional images 291 and 292 after the adjustment supplied thereto from the parallax amount adjustment section 331 to the switcher 313 for the left eye.

Meanwhile, the SDI terminal 90 supplies the parallax amounts of the three-dimensional images 291 and 292 after the adjustment supplied thereto from the parallax amount adjustment section 331 to the switcher 314 for the right eye.

It is to be noted that, if a notification representing that the priority order corresponding to the parallax amounts coincides with the priority order from the order acquisition section 271 is supplied to the parallax amount adjustment section 331, then the parallax amount adjustment section 331 carries out processing similar to that of the parallax amount adjustment section 274.

Example of the Configuration of the Switcher 313 for the Left Eye

Figure 23:
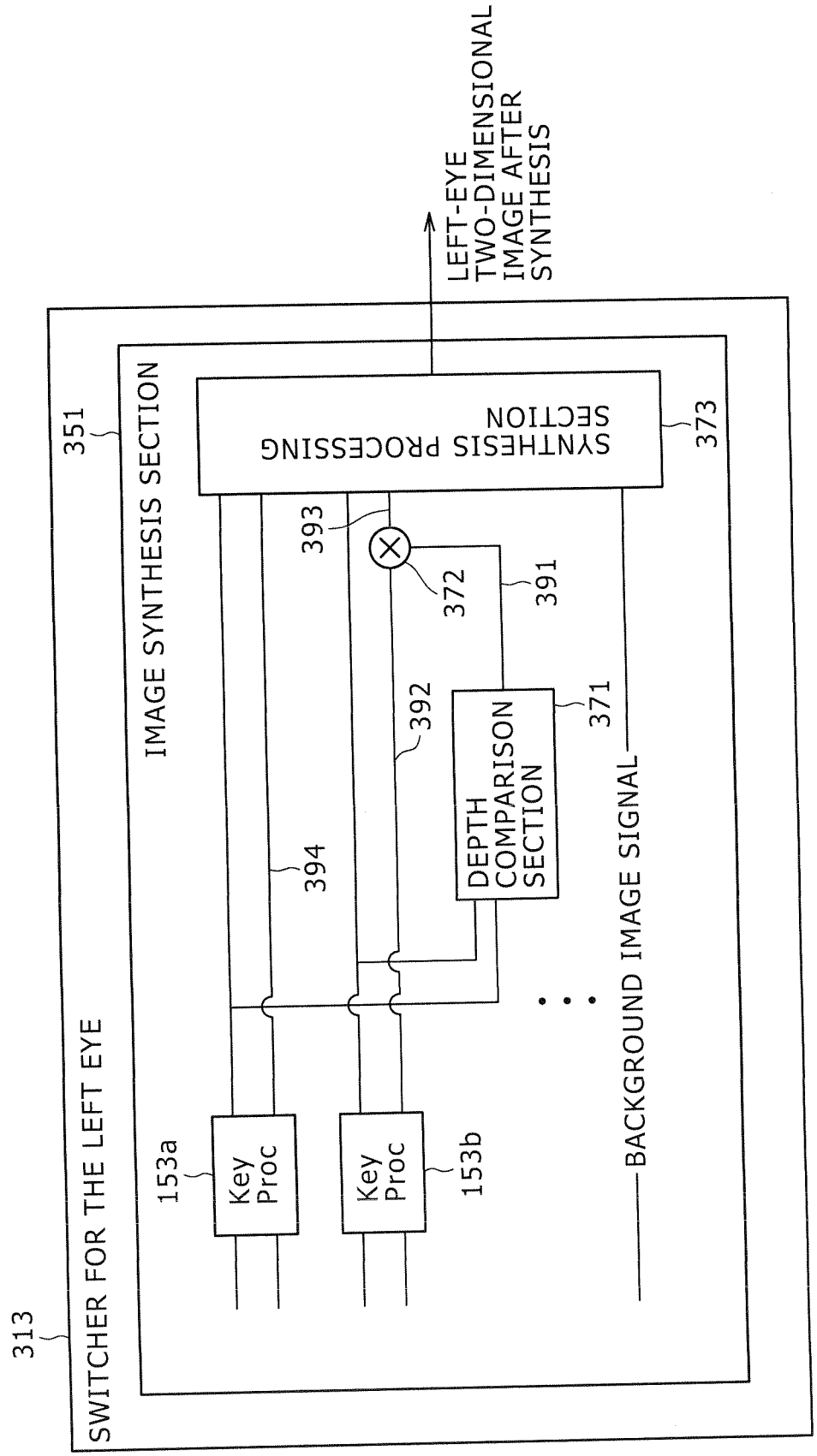
FIG. 23 is a block diagram showing an example of a configuration of a switcher for the left eye shown in FIG. 21.

FIG. 23 shows an example of a configuration of the switcher 313 for the left eye.

It is to be noted that the switcher 314 for the right eye is configured similarly to the switcher 313 for the left eye, and therefore, description is given only of the switcher 313 for the left eye while overlapping description of the switcher 341 for the right eye is omitted herein to avoid redundancy.

The switcher 313 for the left eye is configured similarly to the switcher 82 for the left eye except that an image synthesis section 351 is provided in place of the image synthesis section 112 from between the image selection section 111 and the image synthesis section 112 which configure the switcher 82 for the left eye shown in FIG. 6.

It is to be noted that, in FIG. 23, in order to avoid complicated illustration, from between a functional block configured similarly to the image selection section 111 of the switcher 82 for the left eye and the image synthesis section 351, the functional block configured similarly to the image synthesis section 112 of the switcher 82 for the left eye is omitted.

In particular, the image synthesis section 351 of the switcher 313 for the left eye is configured similarly to the image synthesis section 112 of the switcher 82 for the left eye except that it additionally includes a depth comparison section 371 and a multiplication section 372 and includes a synthesis processing section 373 in place of the synthesis processing section 155.

To the switcher 313 for the left eye, parallax amounts of the three-dimensional images 291 and 292 after adjustment in response to a fader value are supplied from the SDI terminal 85. The parallax amount of the three-dimensional image 291 from the SDI terminal 85 is supplied to the depth comparison section 371 through the key signal processing section 153a, and the parallax amount of the three-dimensional image 292 from the SDI terminal 85 is supplied to the depth comparison section 371 through the key signal processing section 153b.

The depth comparison section 371 compares, based on the parallax amount of the three-dimensional image 291 from the key signal processing section 153a and the parallax amount of the three-dimensional image 292 from the key signal processing section 153b, the depth z of the physical solid 291a in the three-dimensional image 291 and the depth z of the physical solid 292a in the three-dimensional image 292 with each other. It is to be noted that another configuration may be adopted in which the depth comparison section 371 does not receive the parallax amounts but cooperates with the relevant element of the switcher for the right eye such that the parallaxes are calculated thereby.

Then, the depth comparison section 371 generates, based on a result of the comparison, a key signal 391 representative of a portion of the physical solid 292a in the three-dimensional image 292 which exists on the nearer side than the physical solid 291a in the three-dimensional image 291, that is, a portion in which the depth z of the physical solid 292a is smaller than the depth z of the physical solid 291a. Then, the depth comparison section 371 supplies the key signal 391 to the multiplication section 372.

To the multiplication section 372, a key signal 392 representative of a region of the three-dimensional image 292 in which the physical solid 292a exists is supplied from the key signal processing section 153b in addition to the key signal 391 from the depth comparison section 371.

The multiplication section 372 multiplies the key signal 391 from the depth comparison section 371 by the key signal 392 from the key signal processing section 153b. Then, the multiplication section 372 supplies a key signal 393 representative of a region corresponding to a portion of the physical solid 292a in the three-dimensional image 292 which exists on the nearer side than the physical solid 291a in the three-dimensional image 291, obtained by the multiplication, to the synthesis processing section 373.

To the synthesis processing section 373, a key signal 394 representative of a region of the three-dimensional image 291 at which the physical solid 291a exists is supplied from the key signal processing section 153a in addition to the key signal 393 supplied from the multiplication section 372. Further, a two-dimensional image for the left eye corresponding to the three-dimensional image 291 and a priority order are supplied from the key signal processing section 153a to the synthesis processing section 373, and a two-dimensional image for the left eye corresponding to the three-dimensional image 292 is supplied from the key signal processing section 153b to the synthesis processing section 373.

The synthesis processing section 373 synthesizes the two-dimensional image for the left eye from the key signal processing section 153a and the two-dimensional image for the left eye from the key signal processing section 153b in the priority order from the key signal processing section 153a.

In particular, for example, if the turn in the pity order of the three-dimensional image 292 is the first and the turn in the priority order of the three-dimensional image 291 is the second, then the parallax amount measuring section 272 synthesizes the three-dimensional images 291 and 292 such that a region indicated by the key signal 393 from the multiplication section 372 in the two-dimensional image for the left eye corresponding to the three-dimensional image 292, that is, a region in which part of the physical solid 292a exists, comes to the nearer side than a region represented by the key signal 394 from the key signal processing section 153a in the two-dimensional image for the left eye corresponding to the three-dimensional image 291, that is, a region in which the physical solid 291a exists.

It is to be noted that, in the case where a background image signal representative of a background image is supplied to the synthesis processing section 373, the synthesis processing section 373 synthesizes a background image corresponding to the background image signal supplied thereto as the background.

Processing Carried Out by the Depth Comparison Section 371 and the Synthesis Processing Section 373

Figure 24A:
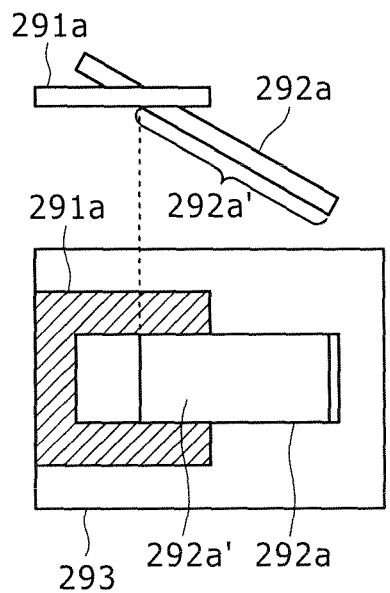
FIGS. 24A and 24B are schematic views illustrating an example of processing executed by a depth comparison section and a synthesis processing section shown in FIG. 23.
Figure 24B:
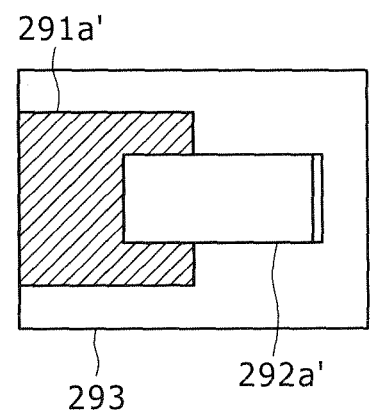

FIGS. 24A and 24B illustrate processing carried out by the depth comparison section 371 and the synthesis processing section 373.

The depth comparison section 371 compares, based on a parallax amount of the three-dimensional image 291 from the key signal processing section 153a and a parallax amount of the three-dimensional image 292 from the key signal processing section 153b, the depths z of the physical solid 291a in the three-dimensional image 291 and the physical solid 292a in the three-dimensional image 292 with each other.

Then, the depth comparison section 371 detects a portion 292a' of the physical solid 292a in the three-dimensional image 292 which exists on the nearer side than the physical solid 291a in the three-dimensional image 291, and generates and supplies a key signal 391 representative of the region in which the portion 292a' exists to the multiplication section 372.

The multiplication section 372 multiplies the key signal 392 from the key signal processing section 153b by the key signal 391 from the depth comparison section 371 and supplies a key signal 393 obtained by the multiplication and representative of the region in which the portion 292a' exists to the synthesis processing section 373.

The synthesis processing section 373 decides, based on the key signal 393 from the multiplication section 372, the portion 292a' of the physical solid 292a which is to be displayed on the nearer side than the physical solid 291a. Then, the synthesis processing section 373 synthesizes the two-dimensional image for the left eye from the key signal processing section 153a and the two-dimensional image for the left eye from the key signal processing section 153b such that the detected portion 292a' of the physical solid 292a is displayed on the nearer side than the physical solid 291a.

Consequently, the two-dimensional image 293 on which the portion 292a' of the physical solid 292a and a portion 291a' of the physical solid 291a are displayed as seen in FIG. 24B is generated.

Then, the synthesis processing section 373 outputs a two-dimensional image for the left eye after the synthesis obtained by the synthesis.

It is to be noted that, while the synthesis processing section 373 uses the key signal 393 from the multiplication section 372, since the key signal 393 outputted from the multiplication section 372 and the key signal 391 outputted from the depth comparison section 371 become the same key signal depending upon the generation method of the key signals, the key signal 391 outputted from the depth comparison section 371 may be used in place of the key signal 393 from the multiplication section 372. In this instance, the image synthesis section 351 can be configured omitting the multiplication section 372.

Operation of the Image Synthesis Apparatus 301

Figure 25:
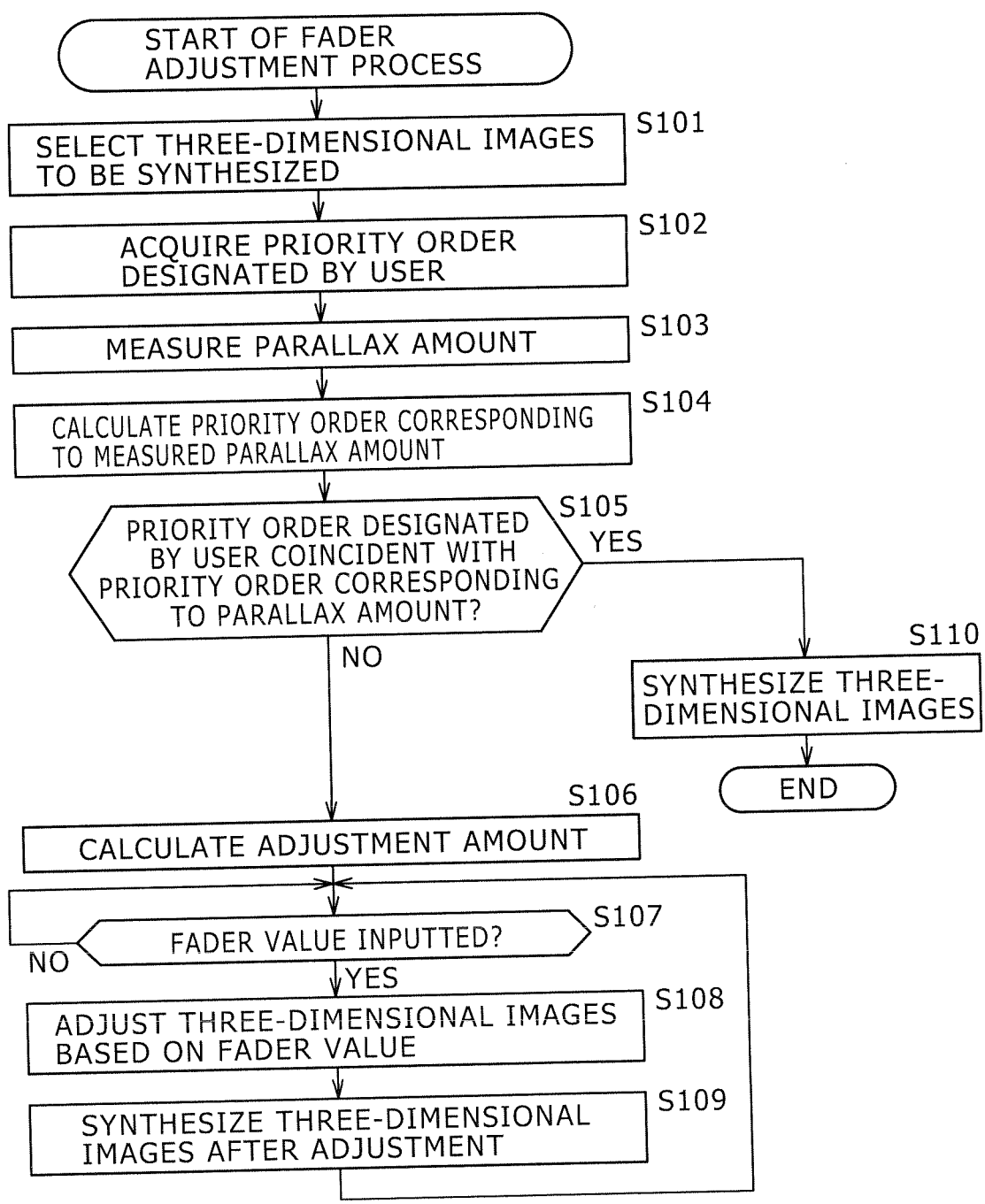
FIG. 25 is a flow chart illustrating a fader adjustment process executed by the fader adjustment section of FIG. 22.

Now, a fader adjustment process carried out by the image synthesis apparatus 301 is described with reference to a flow chart of FIG. 25.

This fader adjustment process is started, for example, when the user uses the console 21 to carry out a selection operation of selecting the three-dimensional images 291 and 292 to be synthesized from among a plurality of three-dimensional images supplied to the image synthesis apparatus 301.

At this time, an operation signal corresponding to the selection operation of the user is supplied from the console 21 to the control section 311. Then, the control section 311 controls the switcher 313 for the left eye and the switcher 314 for the right eye in response to the operation signal from the console 21.

Then at step S101, the switcher 313 for the left eye acquires two-dimensional images for the left eye corresponding to two three-dimensional images 291 and 292 selected by a selection operation of the user similarly to the switcher 82 for the left eye under the control of the control section 311.

The switcher 313 for the left eye supplies one of the acquired two-dimensional images for the left eye to the SDI terminal 83 and supplies the other one of the acquired two-dimensional images for the left eye to the SDI terminal 84. The SDI terminals 83 and 84 supply the two-dimensional images for the left eye from the switcher 313 for the left eye to the parallax amount measuring section 272 of the fader adjustment section 312.

Meanwhile, the switcher 314 for the right eye supplies one of the received two-dimensional images for the right eye to the SDI terminal 88 and the other one of the received two-dimensional images for the right eye to the SDI terminal 89 similarly to the switcher 313 for the left eye under the control of the control section 311. The SDI terminals 88 and 90 supply the two-dimensional images for the right eye from the switcher 314 for the right eye to the parallax amount measuring section 272.

At steps S102 to S104, processing similar to that at steps S32 to S34 of FIG. 16 is carried out, respectively.

At step S105, the adjustment amount calculation section 273 decides whether or not the calculated priority order corresponding to the parallax amounts coincides with the priority order from the order acquisition section 271. If it is decided that the priority order corresponding to the parallax amounts does not correspond to the priority order from the order acquisition section 271, then the processing advances to step S106.

At step S106, the adjustment amount calculation section 273 calculates adjustment amounts similarly as in the case at step S36 of FIG. 16 and supplies the calculated adjustment amounts to the parallax amount adjustment section 331. Corresponding to this, the parallax amount adjustment section 331 supplies the adjustment amounts from the adjustment amount calculation section 273 to the built-in memory not shown so as to be stored into the built-in memory.

At step S107, the parallax amount adjustment section 331 decides whether or not a fader value from the control section 311 is inputted or supplied thereto, and carries out the process at step S107 repetitively until it is decided at step S107 that a fader value is inputted from the control section 311.

If the parallax amount adjustment section 331 decides at step S107 that a fader value from the control section 311 is inputted, then it advances the processing to step S108. At step S108, the parallax amount adjustment section 331 adjusts, based on the adjustment amounts stored in the built-in memory and the fader value from the control section 311, the parallax amounts of the three-dimensional images 291 and 292 from the parallax amount measuring section 272 to parallax amounts corresponding to the fader value of the control section 311. It is to be noted that such a configuration may be adopted that not an adjustment amount stored in the built-in memory is used but normally the latest adjustment amount is calculated and used.

Then, the parallax amount adjustment section 331 supplies the two-dimensional image for the left eye corresponding to the three-dimensional image 291 after the adjustment and the priority order from the order acquisition section 271 to the SDI terminal 85, and supplies the two-dimensional image for the left eye corresponding to the three-dimensional image 292 after the adjustment to the SDI terminal 86.

Further, the parallax amount adjustment section 331 supplies the two-dimensional image for the right eye corresponding to the three-dimensional image 291 after the adjustment and the priority order from the order acquisition section 271 to the SDI terminal 90, and supplies the two-dimensional image for the right eye corresponding to the three-dimensional image 292 after the adjustment to the SDI terminal 91.

Further, the parallax amount adjustment section 331 supplies the parallax values of the three-dimensional images 291 and 292 after the adjustment to the SDI terminals 85 and 90, respectively.

At step S109, the SDI terminal 85 supplies the two-dimensional image for the left eye and the priority order from the parallax amount adjustment section 331 to the switcher 313 for the left eye and the SDI terminal 86 supplies the two-dimensional image for the left eye from the parallax amount adjustment section 331 to the switcher 313 for the left eye.

Meanwhile, the SDI terminal 85 supplies the parallax amounts of the three-dimensional images 291 and 292 after the adjustment supplied thereto from the parallax amount adjustment section 331 to the switcher 313 for the left eye.

The SDI terminal 90 supplies the two-dimensional image for the right eye and the priority order from the parallax amount adjustment section 331 to the switcher 31A for the right eye and the SDI terminal 91 supplies the two-dimensional image for the right eye from the parallax amount adjustment section 331 to the switcher 314 for the right eye.

Further, the SDI terminal 90 supplies the parallax amounts of the three-dimensional images 291 and 292 after the adjustment supplied thereto from the parallax amount adjustment section 331 to the switcher 314 for the right eye.

Then at step S109, the switcher 313 for the left eye uses a key signal generated based on the parallax amounts of the three-dimensional images 291 and 292 after the adjustment from the SDI terminal 85 to synthesize the two-dimensional image for the left eye from the SDI terminal 85 and the two-dimensional image for the left eye from the SDI terminal 86 in the priority order from the SDI terminal 85 in accordance with the fader value. Then, the switcher 313 for the left eye outputs a two-dimensional image for the left eye after the synthesis obtained as a result of the synthesis to the output line.

Meanwhile, the switcher 314 for the right eye uses a key signal generated based on the parallax amounts of the three-dimensional images 291 and 292 after the adjustment from the SDI terminal 90 to synthesize the two-dimensional image for the right eye from the SDI terminal 90 and the two-dimensional image for the right eye from the SDI terminal 91 in the priority order from the SDI terminal 90 in accordance with the fader value. Then, the switcher 314 for the right eye outputs a two-dimensional image for the right eye after the synthesis obtained as a result of the synthesis to the output line.

After the process at step S109 comes to an end, the processing returns to step S107 so that the processes at the steps beginning with step S107 are repeated.

It is to be noted that, in the case where the processes at steps S107 to S109 are carried out repetitively, this fader adjustment process is ended, for example, when the user uses the console 21 to issue an instruction to end the fader adjustment process.

On the other hand, if the adjustment amount calculation section 273 decides at step S105 that the calculated priority order corresponding to the parallax amounts coincides with the priority order from the order acquisition section 271, then it supplies a notification of this to the parallax amount adjustment section 331 and then advances the processing to step S110.

At step S110, the parallax amount adjustment section 331 carries out processing similar to that in the case where the processing advances from step S35 to step S38 of FIG. 16, and the processing is ended.

As described above, in the fader adjustment process, the three-dimensional images 291 and 292 are synthesized in response to a fader value changed by a fader value changing operation of the user. Therefore, the user can generate a three-dimensional image 293 by synthesis of the three-dimensional images 291 and 292 in response to a desired fader value.

4. Modifications

Example of the Configuration of the Switcher 313 for the Left Eye

Figure 26:
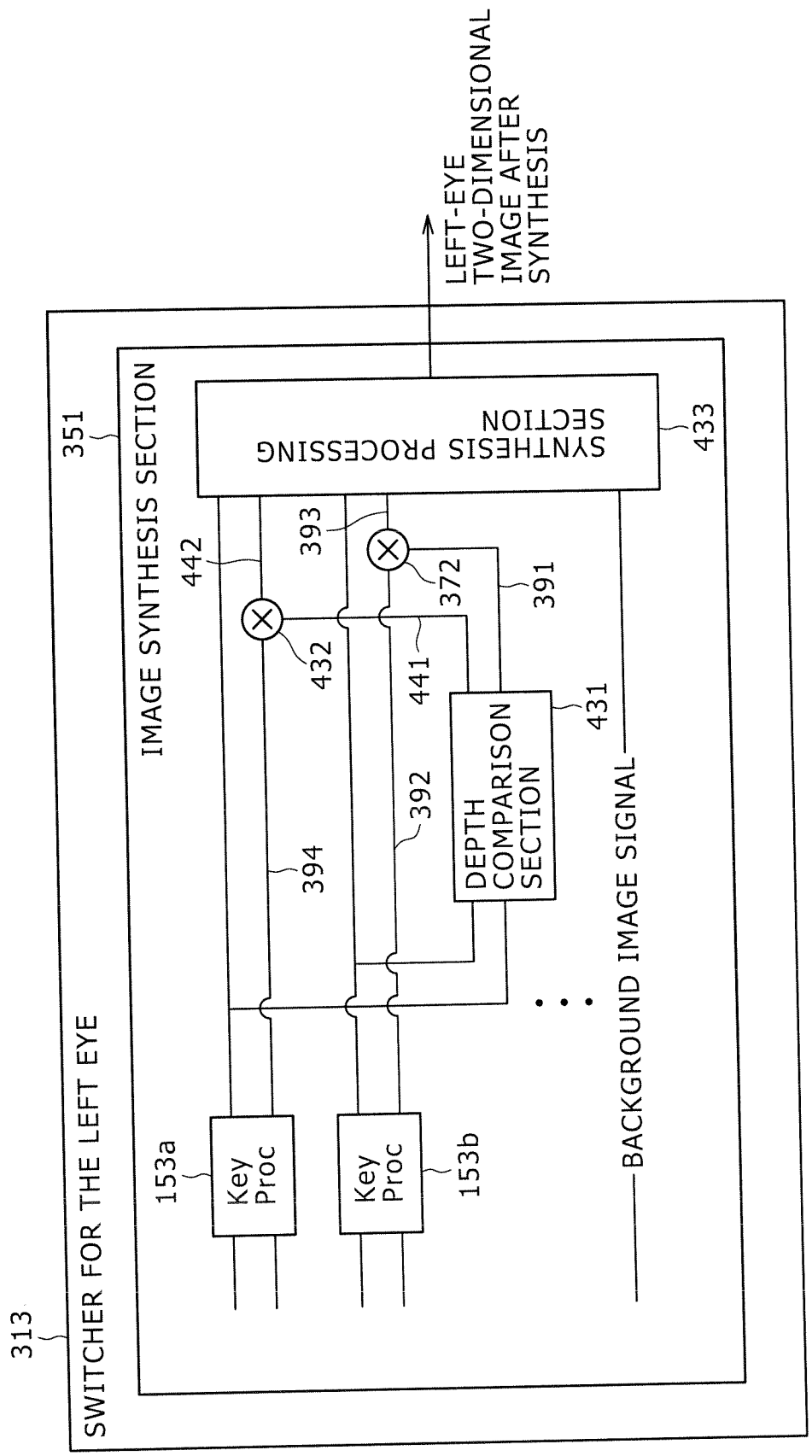
FIG. 26 is a block diagram showing another example of a configuration of the image synthesis section of the switcher for the left eye of FIG. 23.

FIG. 26 shows another example of a configuration of the image synthesis section 351 of the switcher 313 for the left eye.

It is to be noted that the image synthesis section 351 includes several common components to those of the image synthesis section 351 of FIG. 23, and overlapping description of the common components is omitted herein to avoid redundancy.

In particular, the image synthesis section 351 of FIG. 26 is configured similarly to the image synthesis section 351 of FIG. 23 except that it includes a depth comparison section 431 and a synthesis processing section 433 in place of the depth comparison section 371 and the synthesis processing section 373 and additionally includes a multiplication section 432.

To the depth comparison section 431, a parallax mount of the three-dimensional image 291 is supplied from the key signal processing section 153a and a parallax amount of the three-dimensional image 292 is supplied from the key signal processing section 153b.

The depth comparison section 431 compares, based on the parallax amount of the three-dimensional image 291 from the key signal processing section 153a and the parallax amount of the three-dimensional image 292 from the key signal processing section 153b, the depths z of the physical solid 291a in the three-dimensional image 291 and the physical solid 292a in the three-dimensional image 292 with each other.

Then, the depth comparison section 431 detects, based on a result of the comparison, a portion 292a' of the physical solid 292a in the three-dimensional image 292 which exists on the nearer side than the physical solid 291a in the three-dimensional image 291, and generates and supplies a key signal 391 representative of a region in which the portion 292a' exists to the multiplication section 372.

Further, the depth comparison section 431 detects, based on the result of the comparison, a portion 291a' of the physical solid 291a in the three-dimensional image 291 which exists on the nearer side than the physical solid 292a in the three-dimensional image 292, and generates and supplies a key signal 441 representative of a region in which the portion 291a' exists to the multiplication section 432.

To the multiplication section 432, a key signal 394 from the key signal processing section 153a is supplied in addition to the key signal 441 from the depth comparison section 431. The multiplication section 432 multiplies the key signal 441 from the depth comparison section 371 by the key signal 394 from the key signal processing section 153a and supplies a key signal 442 obtained by the multiplication and representative of a region in which the portion 291a' exists to the synthesis processing section 433.

The synthesis processing section 433 detects the portion 291a' of the physical solid 291a based on the key signal 442 from the key signal 441. Further, the synthesis processing section 433 detect the portion 292a' of the physical solid 292a which is to be displayed on the nearer side than the physical solid 291a based on the key signal 393 from the multiplication section 372 similarly to the synthesis processing section 373.

Then, the synthesis processing section 433 synthesizes the two-dimensional image for the left eye from the key signal processing section 153a and the two-dimensional image for the left eye from the key signal processing section 153b such that the detected portion 291a' of the physical solid 291a is displayed on the nearer side than the physical solid 292a and the detected portion 292a' of the physical solid 292a is displayed on the nearer side than the physical solid 291a.

It is to be noted that, while the synthesis processing section 433 uses the key signal 442 from the multiplication section 432, since the key signal 442 outputted from the multiplication section 432 and the key signal 441 outputted from the depth comparison section 431 become the same key signal depending upon a generation method of the key signals, the key signal 441 outputted from the depth comparison section 431 may be used in place of the key signal 442 from the multiplication section 432. In this instance, the image synthesis section 351 may be configured omitting the multiplication section 432. It is to be noted that the synthesis processing section 433 and so forth which receive various key signals after multiplication may be configured such that working of images is carried out based on the key signals so that the synthesis is managed so as to provide an image having a good appearance (with the Artifact reduced).

While synthesis of two three-dimensional images selected by a selection operation of a user is described in the foregoing description of the first to third embodiments of the present invention, the number of three-dimensional images to be synthesized is not limited to two.

In particular, for example, the number of three-dimensional images to be synthesized may be four as seen from FIGS. 27A to 27D and 28.

FIGS. 27A to 27D illustrate an example of four three-dimensional images selected by a selection operation of a user from among a plurality of three-dimensional images.

Referring to FIGS. 27A to 27D, four three-dimensional images 451 to 454 selected by a selection operation of a user are shown on the lower side.

It is to be noted that a physical solid 451a is displayed in the three-dimensional image 451, and a physical solid 452a is displayed in the three-dimensional image 452. Further, physical solids 453a and 453b are displayed in the three-dimensional image 453, and physical solids 454a and 454b are displayed in the three-dimensional image 454.

Figure 27:
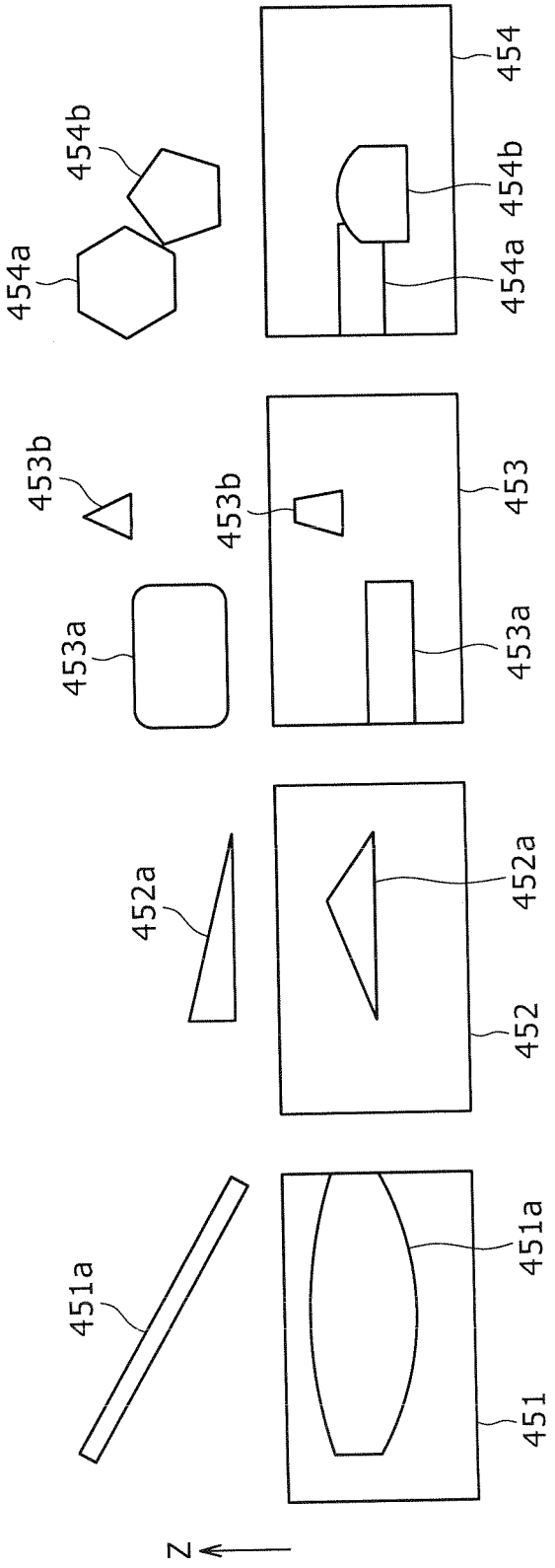
FIGS. 27A to 27D and 28 are schematic views illustrating an example of a case in which four three-dimensional images are synthesized.

Further, on the upper side in FIG. 27A, a view of the physical solid 451a as viewed from above is shown, and on the upper side in FIG. 27B, a view of the physical solid 452a as viewed from above is shown. Further, on the upper side in FIG. 27C, a view of the physical solids 453a and 453b as viewed from above is shown, and on the upper side in FIG. 27D, a view of the physical solids 454a and 454b as viewed from above is shown.

Figure 28:
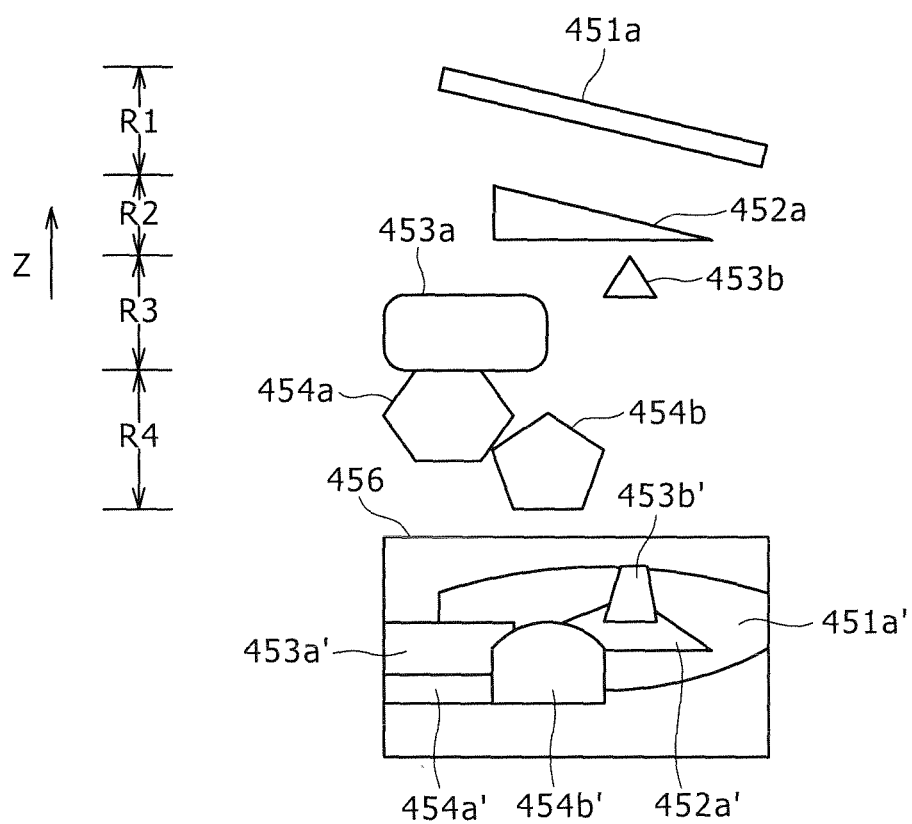

FIG. 28 shows an example of a three-dimensional image 456 obtained by synthesis of the four three-dimensional images 451 to 454.

On the upper side in FIG. 28, the depth z of the physical solids 451a to 454b displayed in the three-dimensional image 456 obtained by synthesis is indicated. In other words, a view of the physical solids 451a to 454b as viewed from above is shown. In the physical solids 451a to 454b, a physical solid existing on the upper side in FIG. 28 exhibits a greater depth z, that is, looks positioned more remotely.

On the lower side in FIG. 28, a three-dimensional image 456 is shown. In the three-dimensional image 456, portions 451a' to 454b' of the physical solids 451a to 454b which are displayed on the nearest side are shown.

In any of the first to third embodiments, a three-dimensional image 456 after the synthesis obtained by synthesis of the three-dimensional images 451 to 454 can be outputted as seen in FIG. 28.

It is to be noted that, in the case where the parallax amounts of the three-dimensional images 451 to 454 in the second and third embodiments are adjusted, ranges R1 to R4 of the depth z corresponding to the parallax amounts are changed by the adjustment of the parallax amounts of the three-dimensional images 451 to 454 as seen on the upper side in FIG. 28.

In particular, for example, if the priority order is designated in the order of the three-dimensional images 451, 452, 453 and 454 from the interior side, the ranges R1 to R4 are changed such that the depth z increases in the priority order. Then, the ranges R1 to R4 after the change are expanded or reduced to widths determined in advance.

In particular, for example, in the case where the parallax amounts of the three-dimensional images 451 to 454 are adjusted so that they correspond to the priority order, if the ranges of the depth z of the three-dimensional images 451 to 454 are changed to the ranges R1 to R4, respectively, then the ranges R1 to R4 after the change are expanded or reduced to widths determined in advance.

The range R1 after the change is a range smaller than a depth z11 but equal to or greater than a depth z12. Meanwhile, the range R2 after the change is smaller than a depth z21 (=z12) but equal to or greater than a depth z22. Further, the range R3 after the change is smaller than a depth z31 (=z22) but equal to or greater than a depth z32. Further, the range R4 after the change is smaller than a depth z41 (=z32) but equal to or greater than a depth z42.

Accordingly, the width or magnitude z1w of the range R1 is |z11−z12|; the width z2w of the range R2 is |z21−z22|; the width z3w of the range R3 is |z31−z32|; and the width z4w of the range R4 is |z41−z42|.

In the second and third embodiments, for example, the overall range of the ranges R1 to R4 after the change, that is, the width |z11−z42|, is expanded or reduced to the range smaller than a depth zA but equal to or greater than a depth zB, that is, the width |zA−zB|.

In particular, for example, in the second and third embodiments, r=|zA−zB|/|z1w+z2w+z3w+z4w| is calculated and is multiplied by the widths z1w to z4w of the ranges R1 to R4 before the expansion or reduction. By this, the width z1v (=z1w×r) of the range R1 after the expansion or reduction, width z2v (=z2w×r) of the range R2 after the expansion or reduction, width z3v (=z3w×r) of the range R3 after the expansion or reduction, and width z1v (=z4w×r) of the range R4 after the expansion or reduction are calculated.

Consequently, the range R1 after the expansion is smaller than the depth zB but equal to or greater than the depth (zB+z1v), and the range R2 after the expansion is smaller than the depth (zB+z1v) but equal to or greater than the depth (zB+z1v+z2v). Further, the range R3 after the expansion is smaller than the depth (zB+z1v+z2v) but equal to or greater than the depth (zB+z1v+z2v+z3v), and the range R4 after the expansion is smaller than the depth (zB+z1v+z2v+z3v) but equal to or greater than zA.

In particular, for example, the range R1 before the expansion, which is smaller than the depth z11 but equal to or greater than the depth z12, is mapped such that the range R1 after the expansion becomes smaller than the depth zB but becomes equal to or greater than the depth (zB+z1v). This similarly applies also to the ranges R2 to R4. It is to be noted that, although usually to reduce the depth of the contents of an image does not make a burden on a watching person, to expand the depth sometimes gives rise to fatigue or the like of a watching person and generally is not preferable. Therefore, the process described above is applied only in the case where reduction is required, but in the case where expansion is required, that is, where r is greater than 1, it is preferable to suppress such multiplication by r. Therefore, whether or not multiplication by r should be carried out may be decided depending upon the value of r.

Further, the image synthesis section 351 of FIG. 26 includes the two multiplication sections 372 and 432 which output a key signal to be used for synthesis regarding two two-dimensional images for the left eye in order to synthesize two two-dimensional images for the left eye individually corresponding to two three-dimensional images. However, such a configuration that four two-dimensional images for the left eye individually corresponding to four three-dimensional images are synthesized may be adopted.

Figure 29:
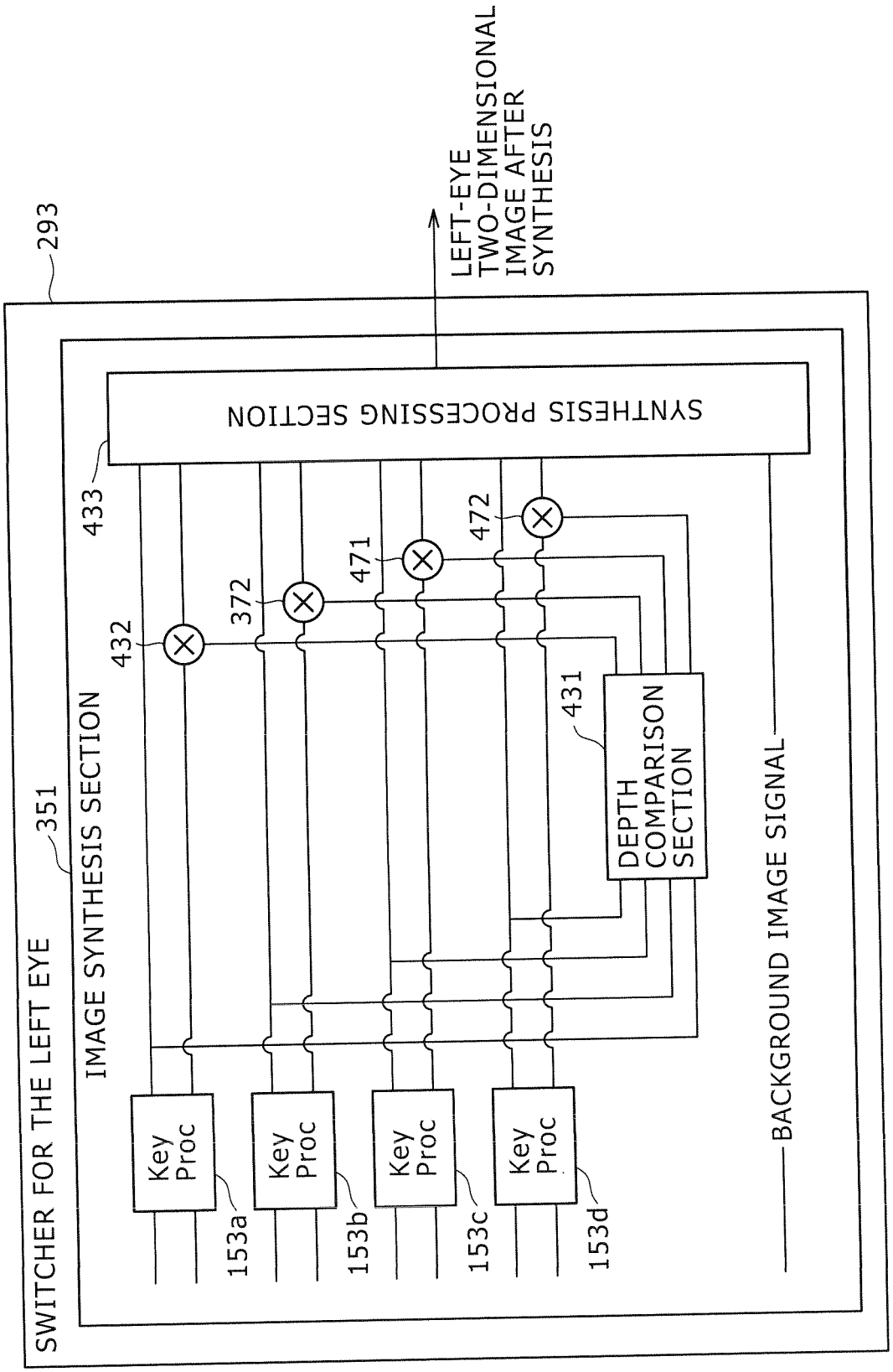
FIG. 29 is a block diagram showing an example of a configuration of a switcher for the left eye in which an image synthesis section is provided in the case where four two-dimensional images for the left eye are synthesized in response to a fader value.

In particular, if four multiplication sections 372 and 432, 471 and 472 which output key signals to be used for synthesis of four two-dimensional images for the left eye are provided as seen in FIG. 29, then four images for the left eye can be synthesized.

In this instance, the key signal processing section 153c and the multiplication section 471 carry out processing similar to that of the key signal processing section 153a and the multiplication section 432, respectively. This similarly applies to the key signal processing section 153d and the multiplication section 472.

It is to be noted that, as described hereinabove, in the first embodiment, the priority order determination sections 87a to 87d having functions similar to those of the priority order determination section 87 are provided in the switcher 182 for the left eye as seen in FIG. 9 while the terminals from the SDI terminal 83 to the SDI terminal 86, the priority order determination section 87 and the terminals from the SDI terminal 88 to the SDI terminal 91 in the image synthesis apparatus 22 are omitted.

Figure 30:
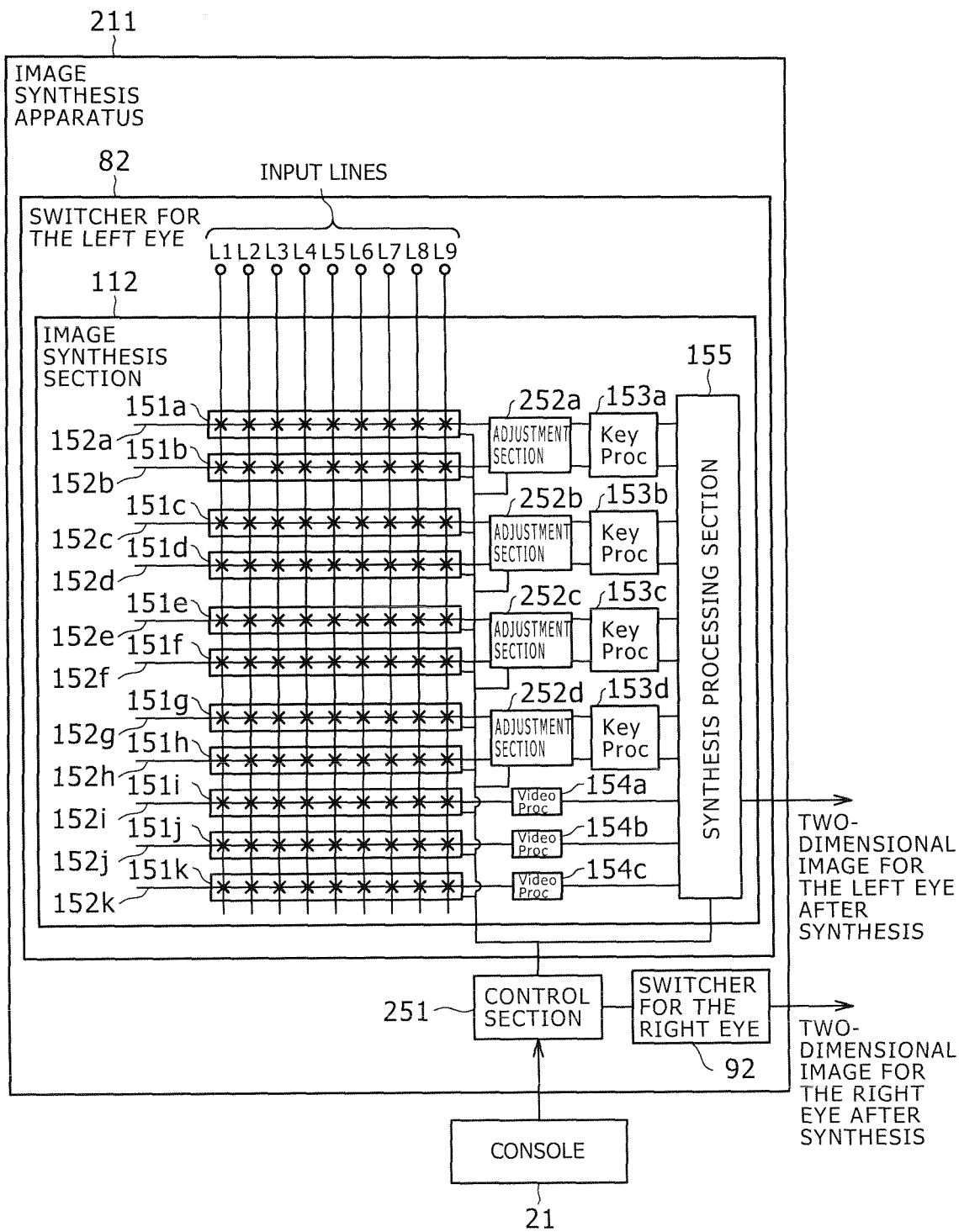
FIG. 30 is a block diagram showing an example of a configuration of a switcher for the left eye in which an adjustment section is provided.

Similarly, also in the second embodiment, if adjustment sections 252a to 252d having functions similar to those of the adjustment section 252 are provided in the switcher 82 for the left eye of the image synthesis apparatus 211 as shown in FIG. 30, then the terminals from the SDI terminal 83 to the SDI terminal 86, the adjustment section 252, and the terminals from the SDI terminal 88 to the SDI terminal 91 provided in the image synthesis apparatus 211 of FIG. 14 can be omitted. This similarly applies also to the third embodiment. In this instance, also it is similar that the adjustment section 252 communicates and cooperates with the relevant section of the switcher for the right eye to operate. It is to be noted that an adjustment section may further be provided between the video signal processing sections 154a to 154c and the synthesis processing section 155 shown in FIG. 30 such that also the relationship in depth between an image for the background and an image to be synthesized as a key image is processed in a similar manner as described above. Since it is a concept that an image for the background is disposed on the most interior side, it is preferable to make an adjustment so as to coincide with this.

Figure 31:
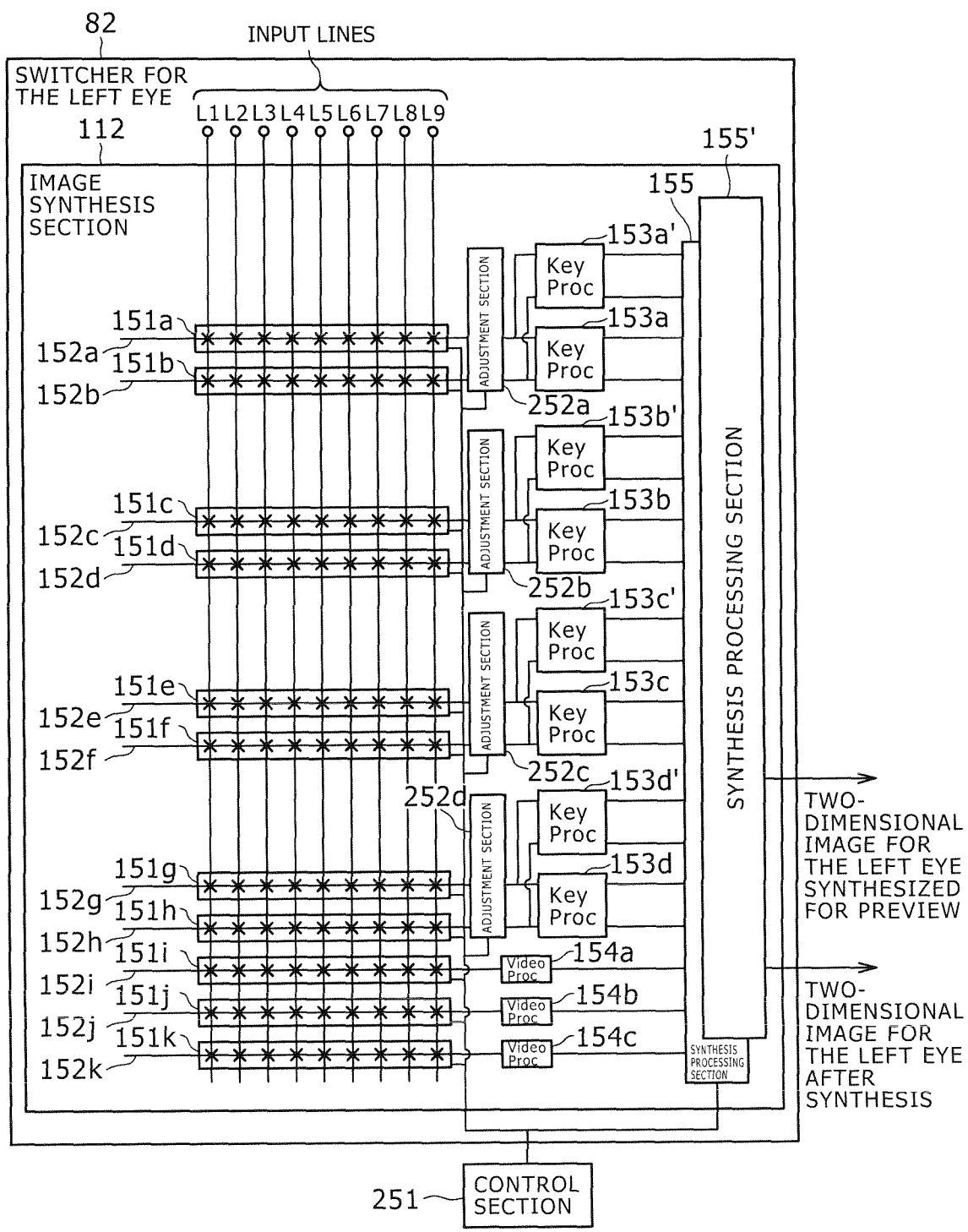
FIG. 31 is a block diagram showing an example of a configuration of a switcher for the left eye in which a preview function is provided.

Further, in the second embodiment, the image synthesis apparatus 211 of FIG. 30 may be modified such that, as shown in FIG. 31, the image synthesis section 112 additionally includes key signal processing sections 153a' to 153d' having functions similar to those of the key signal processing sections 153a to 153d and a synthesis processing section 155' having functions similar to those of the synthesis processing section 155.

Further, the image synthesis section 112 can be configured such that a two-dimensional image for the left eye for preview when a synthesized two-dimensional image for the left eye is to be confirmed is produced by the key signal processing sections 153a' to 153d' and the synthesis processing section 155' and outputted to a preview output line for outputting a two-dimensional image for the left eye for preview.

In this instance, if a user suitably confirms a two-dimensional image for the left eye after the synthesis outputted for preview and displayed on the display section and is satisfied with the two-dimensional image for the left eye after the synthesis outputted and displayed for preview, then the key signal processing sections 153a to 153d and the synthesis processing section 155 may generate a two-dimensional image for the left eye after final synthesis and outputted as a synthesis result by final synthesis. This similarly applies also to the switcher 92 for the right eye.

It is to be noted that, also in the first and third embodiments, if the key signal processing sections 153a' to 153d' and the synthesis processing section 155' for preview are provided additionally, then a two-dimensional image for the left eye for preview can be generated.

Further, while, in the first embodiment, the priority order determination section 87 of FIG. 7 is configured from the parallax amount measuring section 171 and the order determination section 172, it may be configured, for example, only from the order determination section 172 while the parallax amount measuring section 171 is omitted.

In particular, for example, in the case where the three-dimensional image 41, particularly at least one of a two-dimensional image for the left eye and a two-dimensional image for the right eye which configures the three-dimensional image 41, includes a parallax amount of the three-dimensional image 41 and the three-dimensional image 42 includes a parallax amount of the three-dimensional image 42, the order determination section 172 can acquire the three-dimensional images 41 and 42 and extract the parallax amounts of the three-dimensional images 41 and 42 from the acquired three-dimensional images 41 and 42, respectively, similarly to the parallax amount measuring section 171.

Further, the order determination section 172 can carry out processing similar to that of the order determination section 172 shown in FIG. 7 such as to determine a priority order based on the detected parallax amounts of the three-dimensional images 41 and 42.

This similarly applies also to the second and third embodiments. Accordingly, if three-dimensional images of an object of synthesis include parallax amounts of the three-dimensional images, then it is possible to extract and acquire the parallax amounts included in the three-dimensional images without measuring the parallax amounts. Therefore, also in the second and third embodiments, the parallax amount measuring section 272 can be omitted. Or, since originally the range of the parallax of all three-dimensional images inputted is normally restricted like a quasi-standard, the overall range may be reduced for synthesis. For example, in the case where five images are to be synthesized, if the range of the standard parallax is reduced to ⅕ with regard to the images and then the images of the reduced ranges are synthesized, then the range of the parallax also of a three-dimensional image obtained by the synthesis fits in the standard range of the parallax.

Further, as the image synthesis apparatus according to the first to third embodiments, for example, a computer or the like which synthesizes three-dimensional images or synthesizes or superimposes a character string or the like with a three-dimensional image. In this instance, the image of the character string is generated by a computer graphics apparatus, and it is easy to designate or acquire the parallax of the image of the character string in advance. Therefore, although, in the first to third embodiments, the parallax is adjusted with respect to an inputted image, a similar effect can be achieved by designating a parallax or a position on the z axis to the computer graphics apparatus.

While the series of processes described above can be executed by dedicated hardware, it may otherwise be executed by software. Where the series of processes is executed by software, a program which constructs the software is installed from a recording medium into a computer of the embedded type or, for example, a personal computer for universal use which can execute various functions by installing various programs.

Configuration of a Personal Computer

FIG. 32 is a block diagram showing an example of a configuration of a personal computer which executes the series of processes described hereinabove in accordance with a program.

Referring to FIG. 32, a central processing unit (CPU) 531 executes various processes in accordance with a program stored in a read only memory (ROM) 532 or a storage section 538. A program to be executed by the CPU 531, data and so forth are suitably stored into a random access memory (RAM) 533. The CPU 531, ROM 532 and RAM 533 are connected to one another by a bus 534.

Also an input/output interface 535 is connected to the CPU 531 through the bus 534. An inputting section 536 including a keyboard, a mouse, a microphone and so forth and an outputting section 537 including a display unit, a speaker and so forth are connected to the input/output interface 535. The CPU 531 executes various processes in accordance with an instruction inputted from the inputting section 536. Then, the CPU 531 outputs a result of the processes to the outputting section 537.

The storage section 538 is connected to the input/output interface 535 and formed of, for example a hard disk. The storage section 538 stores the programs executed by the CPU and various data. A communication section 539 communicates with external apparatuses through the networks such as the Internet and a local area network.

A program may be acquired through the communication section 539 and stored into the storage section 538.

A drive 540 is connected to the input/output interface 535. When a removable medium 541 such as a magnetic disk, an optical disk, a magneto-optical disk, a semiconductor memory or the like is suitably loaded into the drive 540, the drive 540 drives the removable medium 541. Thereupon, the drive 540 acquires a program, data and so forth recorded on the removable medium 541. The acquired program or data are transferred to and stored into the storage section 538 as occasion demands.

The program recording medium on which a program to be installed into a computer and placed into an executable condition by the computer is recorded may be, for example, as shown in FIG. 32, a removable medium 541 in the form of a package medium formed from a magnetic disk (including a floppy disc), an optical disk (including a CD-ROM (Compact Disc-Read Only Memory) and a DVD (Digital Versatile Disc)), a magneto-optical disk (including a MD (Mini-Disc)), or a semiconductor memory. Else, the program recording medium may be formed as the ROM 532, a hard disk included in the storage section 538 or the like in which the program is recorded temporarily or permanently. Recording of the program into the program recording medium is performed, as occasion demands, through the communication section 539 which is an interface such as a router and a modem, making use of a wired or wireless communication medium such as a local area network, the Internet or a digital satellite broadcast.

It is to be noted that, in the present specification, the steps which describe the program recorded in a program recording medium may be but need not necessarily be processed in a time series in the order as described, and include processes which are executed in parallel or individually without being processed in a time series.

While preferred embodiments of the present invention are not limited to the first to third embodiments above, and have been described using specific terms, such description is for illustrative purpose only, and it is to be understood that changes and variations may be made without departing from the spirit or scope of the following claims.

The present application contains subject matter related to that disclosed in Japanese Priority Patent Application JP 2010-088465 filed in the Japan Patent Office on Apr. 7, 2010, and Japanese Priority Patent Application JP 2010-088466 filed in the Japan Patent Office on Apr. 7, 2010, the entire contents of which are hereby incorporated by reference.

What is claimed is:

1. An image synthesis comprising:
   image selection means for selecting two or more three-dimensional images for synthesis from among a plurality of three-dimensional images;
   order determination means for determining, based on parallax amounts of the selected three-dimensional images, a synthesis order representative of an order in which the selected three-dimensional images are synthesized;
   image synthesis means for synthesizing the selected three-dimensional images in accordance with the synthesis order; and control means for controlling said image selection means, said order determination means and said image synthesis means in response to an operation of a user, wherein said control means controls, when a selection operation of the user for selecting predetermined ones of the three-dimensional images so that the predetermined three-dimensional images may be synthesized in a predetermined synthesis order, said order determination means to determine a synthesis order of the predetermined three-dimensional images, and handles, when the synthesis order of the predetermined three-dimensional images determined by said order determination means does not become the predetermined synthesis order, the selection operation of the user as not having been carried out.

2. An image synthesis comprising:

image selection means for selecting two or more three-dimensional images for synthesis from among a plurality of three-dimensional images;

order determination means for determining, based on parallax amounts of the selected three-dimensional images, a synthesis order representative of an order in which the selected three-dimensional images are synthesized;

image synthesis means for synthesizing the selected three-dimensional images in accordance with the synthesis order; and control means for controlling said image selection means, said order determination means and said image synthesis means in response to an operation of a user, wherein said control means handles, when a changing operation of the user for changing the synthesis order is carried out, the changing operation of the user as not having been carried out.

3. An image synthesis comprising:

image selection means for selecting two or more three-dimensional images for synthesis from among a plurality of three-dimensional images;

order determination means for determining, based on parallax amounts of the selected three-dimensional images, a synthesis order representative of an order in which the selected three-dimensional images are synthesized;

image synthesis means for synthesizing the selected three-dimensional images in accordance with the synthesis order; and control means for controlling said image selection means, said order determination means and said image synthesis means in response to an operation of a user, wherein said control means controls, when a canceling operation of the user to cancel selection of any of the selected three-dimensional images is carried out, said order determination means to determine a new synthesis order which excludes the three-dimensional image whose selection is canceled from the synthesis order.

4. An image synthesis apparatus comprising:

image selection means for selecting two or more three-dimensional images for synthesis from among a plurality of three-dimensional images;

order determination means for determining, based on parallax amounts of the selected three-dimensional images, a synthesis order representative of an order in which the selected three-dimensional images are synthesized;

image synthesis means for synthesizing the selected three-dimensional images in accordance with the synthesis order;

control means for controlling said image selection means, said order determination means and said image synthesis means in response to an operation of a user; and parallax amount measuring means for measuring parallax amounts of the selected three-dimensional images, said order determination means determining the synthesis order based on the measured parallax amounts.

5. An image synthesis method for an image synthesis apparatus for synthesizing three-dimensional images, the image synthesis apparatus including image selection means, order determination means, image synthesis means and control means, the image synthesis method comprising:

a step carried out by the image selection means of selecting two or more three-dimensional images to be synthesized from among a plurality of three-dimensional images;

a step carried out by the order determination means of determining, based on parallax amounts of the selected three-dimensional images, a synthesis order representative of an order in which the selected three-dimensional images are to be synthesized;

a step carried out by the image synthesis means of synthesizing the selected three-dimensional images in accordance with the synthesis order; and a step carried out by the control means of controlling said image selection means, said order determination means and said image synthesis means in response to an operation of a user, wherein said control means controls, when a selection operation of the user for selecting predetermined ones of the three-dimensional images so that the predetermined three-dimensional images may be synthesized in a predetermined synthesis order, said order determination means to determine a synthesis order of the predetermined three-dimensional images, and handles, when the synthesis order of the predetermined three-dimensional images determined by said order determination means does not become the predetermined synthesis order, the selection operation of the user as not having been carried out.

6. An image synthesis apparatus comprising:

image selection means for selecting two or more three-dimensional images from among a plurality of three-dimensional images;

order acquisition means for acquiring a synthesis order representative of an order in which the selected three-dimensional images are synthesized;

parallax amount adjustment means for adjusting parallax amounts of the selected three-dimensional images based on the synthesis order;

image synthesis means for synthesizing the selected three-dimensional images after the adjustment in accordance with the synthesis order; and fader acquisition means for acquiring fader information representative of a progressing situation when the parallax amounts of the selected three-dimensional images are adjusted from original parallax amounts to parallax amounts which correspond to the synthesis order;

said parallax amount adjustment means adjusting the parallax amounts of the selected three-dimensional images based on the fader information;

said image synthesis means synthesizing the three-dimensional images adjusted based on the fader information.

7. The image synthesis apparatus according to claim 6, further comprising comparison generation means for comparing the parallax amounts of the three-dimensional images adjusted based on the fader information with each other and generating, based on a result of the comparison, region information representative of a region in which the three-dimensional image after the synthesis is to be displayed from within an overall region on the three-dimensional regions adjusted based on the fader information;
said image synthesis means synthesizing the three-dimensional images adjusted based on the fader information based on the region information.

8. The image synthesis apparatus according to claim 6, wherein said order acquisition means acquires, in response to a designation operation by the user to designate the synthesis order, the synthesis order designated by the designation operation of the user.

9. An image synthesis apparatus comprising:
image selection means for selecting two or more three-dimensional images from among a plurality of three-dimensional images;
order acquisition means for acquiring a synthesis order representative of an order in which the selected three-dimensional images are synthesized;
parallax amount adjustment means for adjusting parallax amounts of the selected three-dimensional images based on the synthesis order;
image synthesis means for synthesizing the selected three-dimensional images after the adjustment in accordance with the synthesis order;
measuring means for measuring parallax amounts of the selected three-dimensional images; and
adjustment amount calculation means for calculating, based on the synthesis order, adjustment amounts for adjusting the measured parallax amounts to parallax amounts corresponding to the synthesis order;
said parallax amount adjustment means adjusting the parallax amounts using the adjustment amounts calculated based on the synthesis order,
wherein said order acquisition means acquires, in response to a designation operation by the user to designate the synthesis order, the synthesis order designated by the designation operation of the user.

10. The image synthesis apparatus according to claim 9, further comprising adjustment amount retaining means for temporarily retaining the adjustment amounts;
said parallax amount adjustment means adjusting the parallax amounts using the adjustment amounts retained in said adjustment amount retaining means in response to an instruction operation carried out for the instruction to carry out the synthesis in the synthesis order designated by the designation operation of the user;
said image synthesis means synthesizing the three-dimensional images after the adjustment in accordance with the synthesis order designated by the designation operation of the user.

11. The image synthesis apparatus according to claim 6, wherein said parallax amount adjustment means carries out adjustment regarding the parallax amounts of the selected three-dimensional images only when the parallax amounts of the three-dimensional images after the adjustment are lower than a threshold value determined in advance.

12. An image synthesis apparatus comprising:
image selection means for selecting two or more three-dimensional images from among a plurality of three-dimensional image;
order acquisition means for acquiring a synthesis order representative of an order in which the selected three-dimensional images are synthesized;
parallax amount adjustment means for adjusting parallax amounts of the selected three-dimensional images based on the synthesis order;
first outputting means for outputting a synthesized three-dimensional image obtained by the synthesis of said image synthesis means so as to be displayed as a preview confirmation image for the confirmation of the user; and
second outputting means for outputting the synthesized three-dimensional image as a final synthesized three-dimensional image.

13. An image synthesis apparatus comprising:
image selection means for selecting two or more three-dimensional images from among a plurality of three-dimensional images;
order acquisition means for acquiring a synthesis order representative of an order in which the selected three-dimensional images are synthesized; and
parallax amount adjustment means for adjusting parallax amounts of the selected three-dimensional images based on the synthesis order,
wherein said order acquisition means acquires, as the synthesis order, an order in which the selected three-dimensional images are to be displayed on the near side when the selected three-dimensional images are synthesized.

14. An image synthesis method for an image synthesis apparatus for synthesizing a plurality of three-dimensional images, the image synthesis apparatus including image selection means, order acquisition means, parallax amount adjustment means and image synthesis means, the image synthesis method comprising:
a step carried out by the image selection means of selecting two or more three-dimensional images from among the plural three-dimensional images;
a step carried out by the order acquisition means of acquiring a synthesis order representative of an order in which the selected three-dimensional images are to be synthesized;
a step carried out by the parallax amount adjustment means of adjusting parallax amounts of the selected three-dimensional images based on the synthesis order;
a step carried out by the image synthesis means of synthesizing the selected three-dimensional images after the adjustment in accordance with the synthesis order;
acquiring fader information representative of a progressing situation when the parallax amounts of the selected three-dimensional images are adjusted from original parallax amounts to parallax amounts which correspond to the synthesis order;
adjusting the parallax amounts of the selected three-dimensional images based on the fader information; and
said image synthesis means synthesizing the three-dimensional images adjusted based on the fader information.

15. An image synthesis apparatus, comprising:
an image selection section adapted to select two or more three-dimensional images to be synthesized from among a plurality of three-dimensional images;
an order determination section adapted to determine, based on parallax amounts of the selected three-dimensional images, a synthesis order representative of an order in which the selected three-dimensional images are to be synthesized;
an image synthesis section adapted to synthesize the selected three-dimensional images in accordance with the synthesis order; and
a control section adapted to control said image selection section, said order determination section and said image synthesis section in response to an operation of a user,
wherein said control section controls, when a selection operation of the user for selecting predetermined ones of the three-dimensional images so that the predetermined three-dimensional images may be synthesized in a predetermined synthesis order, said order determination section to determine a synthesis order of the predetermined three-dimensional images, and handles, when the synthesis order of the predetermined three-dimensional images determined by said order determination section does not become the predetermined synthesis order, the selection operation of the user as not having been carried out.

16. An image synthesis apparatus, comprising:

an image selection section adapted to select two or more three-dimensional images from among a plurality of three-dimensional images;

an order acquisition section adapted to acquire a synthesis order representative of an order in which the selected three-dimensional images are to be synthesized;

a parallax amount adjustment section adapted to adjust parallax amounts of the selected three-dimensional images based on the synthesis order; and an image synthesis section adapted to synthesize the selected three-dimensional images after the adjustment in accordance with the synthesis order; and a fader acquisition section for acquiring fader information representative of a progressing situation when the parallax amounts of the selected three-dimensional images are adjusted from original parallax amounts to parallax amounts which correspond to the synthesis order;

said parallax amount adjustment section adjusting the parallax amounts of the selected three-dimensional images based on the fader information;

said image synthesis section synthesizing the three-dimensional images adjusted based on the fader information.

* * * * *